(12) United States Patent
Shoap

(10) Patent No.: US 7,942,350 B2
(45) Date of Patent: May 17, 2011

(54) METHOD AND SYSTEM FOR FLUID TRANSMISSION ALONG SIGNIFICANT DISTANCES

(76) Inventor: Stephen D. Shoap, Wakefield, MA (US)

( * ) Notice: Subject to any disclaimer, the term of this patent is extended or adjusted under 35 U.S.C. 154(b) by 0 days.

(21) Appl. No.: 12/800,172

(22) Filed: May 10, 2010

(65) Prior Publication Data

US 2010/0288366 A1  Nov. 18, 2010

Related U.S. Application Data

(63) Continuation-in-part of application No. 12/211,517, filed on Sep. 16, 2008, now Pat. No. 7,819,345.

(60) Provisional application No. 61/215,876, filed on May 11, 2009, provisional application No. 61/284,291, filed on Dec. 16, 2009, provisional application No. 61/337,646, filed on Feb. 11, 2010.

(51) Int. Cl.
*B05B 15/08* (2006.01)

(52) U.S. Cl. .......... 239/588; 239/69; 239/195; 239/600; 169/24; 285/120.1; 285/222.1; 439/191; 439/194; 174/47

(58) Field of Classification Search .................. 239/67, 239/69, 171, 195, 450, 525, 588, 600; 169/24, 169/52; 285/120.1, 222.1; 439/191, 192, 439/194; 174/47
See application file for complete search history.

(56) References Cited

U.S. PATENT DOCUMENTS

| | | | |
|---|---|---|---|
| 746,110 A | 12/1903 | Lasher | |
| 1,694,574 A | 12/1928 | Witter et al. | |
| 2,014,288 A | * 9/1935 | Noschang | 439/191 |
| 2,817,205 A | 12/1957 | Muller | |
| 2,890,532 A | 6/1959 | Ellison | |
| 3,054,198 A | 9/1962 | George et al. | |
| 3,176,773 A | 4/1965 | Headrick et al. | |
| 3,193,017 A | 7/1965 | Walker | |
| 3,273,651 A | 9/1966 | Andrews | |
| 3,330,602 A | 7/1967 | Riley et al. | |
| 3,372,875 A | 3/1968 | Torrey | |
| 3,593,804 A | 7/1971 | Snider | |
| 3,763,581 A | 10/1973 | Wolfston | |
| 3,964,182 A | 6/1976 | Pomeret et al. | |
| 3,975,843 A | 8/1976 | Ellison | |
| 4,095,752 A | 6/1978 | Pomeret et al. | |
| D287,367 S | 12/1986 | Woods | |

(Continued)

FOREIGN PATENT DOCUMENTS

JP  2001149498 A  6/2001

(Continued)

*Primary Examiner* — Steven J Ganey
(74) *Attorney, Agent, or Firm* — Hayes Soloway P.C.

(57) ABSTRACT

A supply line system for conveying a fluid is provided. First and a second conduit segment have at least one inner conduit surface and an outer conduit surface. At least one fluid chamber is within the conduit segments and is formed by the at least one inner conduit surface. At least one electric wire is located between the at least one inner conduit surface and the outer conduit surface. A conduit connection element is connecting the first and second conduit segments, thereby mating the fluid chamber and the electric wire of the first conduit segment with the fluid chamber and the electric wire of the second conduit segment. At least a portion of the quantity of fluid and the electric signals is passed from the first to the second conduit segment. A control system is connected to the electric wire and in communication with at least one device.

23 Claims, 60 Drawing Sheets

U.S. PATENT DOCUMENTS

| | | |
|---|---|---|
| 4,757,622 A | 7/1988 | Morris |
| 4,799,320 A | 1/1989 | West et al. |
| 4,843,743 A | 7/1989 | Durieux |
| 4,993,665 A | 2/1991 | Sparling |
| 5,044,445 A | 9/1991 | Kayahara |
| 5,109,534 A * | 4/1992 | Naito et al. .................. 169/24 |
| 5,165,482 A | 11/1992 | Smagac et al. |
| 5,909,983 A | 6/1999 | McGee, Jr. |
| 6,079,501 A | 6/2000 | Schmidt |
| 6,250,570 B1 | 6/2001 | Starr et al. |
| 6,431,465 B1 | 8/2002 | Yie |
| 6,651,900 B1 | 11/2003 | Yoshida |
| 6,685,104 B1 | 2/2004 | Float et al. |
| 6,772,562 B1 | 8/2004 | Dadamo |
| 6,834,813 B1 | 12/2004 | Nobi |
| 6,904,977 B2 | 6/2005 | Zerrer et al. |
| 7,275,604 B1 | 10/2007 | Wall |
| 7,819,345 B2 * | 10/2010 | Shoap ......................... 239/588 |
| 2002/0096339 A1 | 7/2002 | Yen |
| 2004/0050556 A1 | 3/2004 | Baker et al. |
| 2004/0244996 A1 | 12/2004 | Kravkov |
| 2005/0247362 A1 | 11/2005 | Harcourt et al. |
| 2006/0180321 A1 | 8/2006 | Yoshida |
| 2006/0252292 A1 | 11/2006 | Sonderegger et al. |
| 2007/0056753 A1 | 3/2007 | Serrano Molina |
| 2007/0185625 A1 | 8/2007 | Pillar et al. |

FOREIGN PATENT DOCUMENTS

| | | | |
|---|---|---|---|
| KR | 10-1993-0023715 A | 12/1993 | |
| KR | 10-1997-0005611 B1 | 4/1997 | |
| KR | 10-0300458 B1 | 2/2002 | |

* cited by examiner

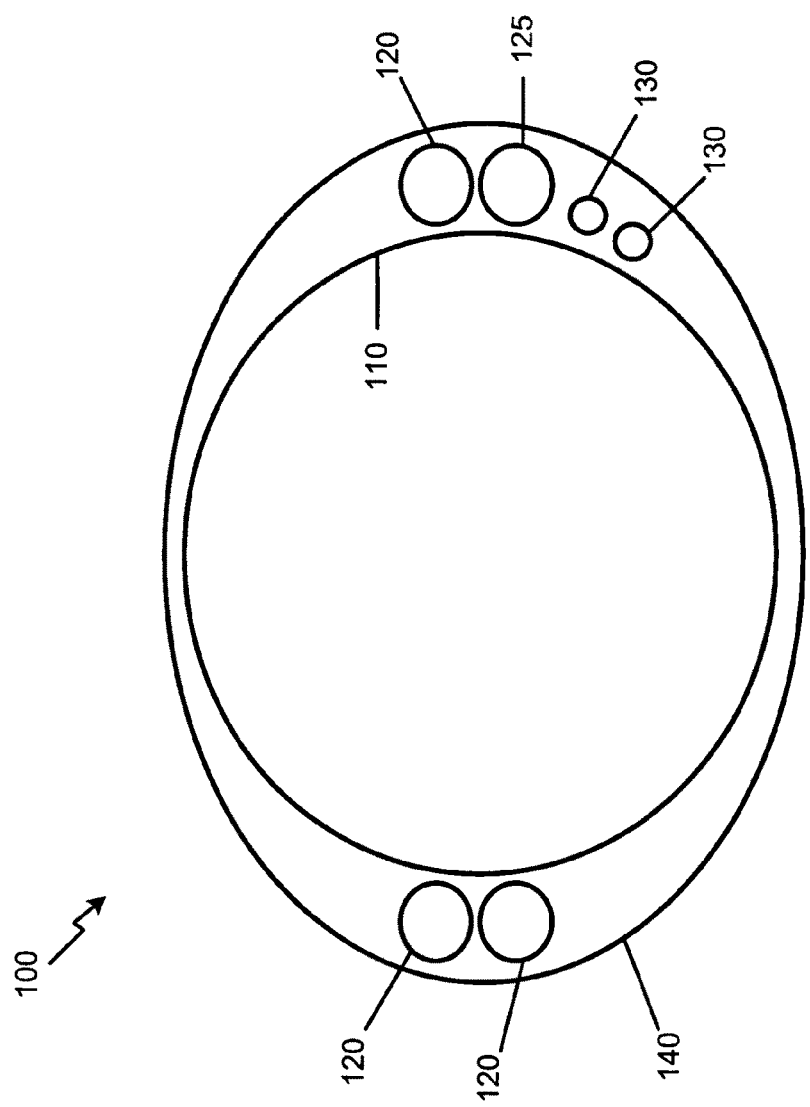

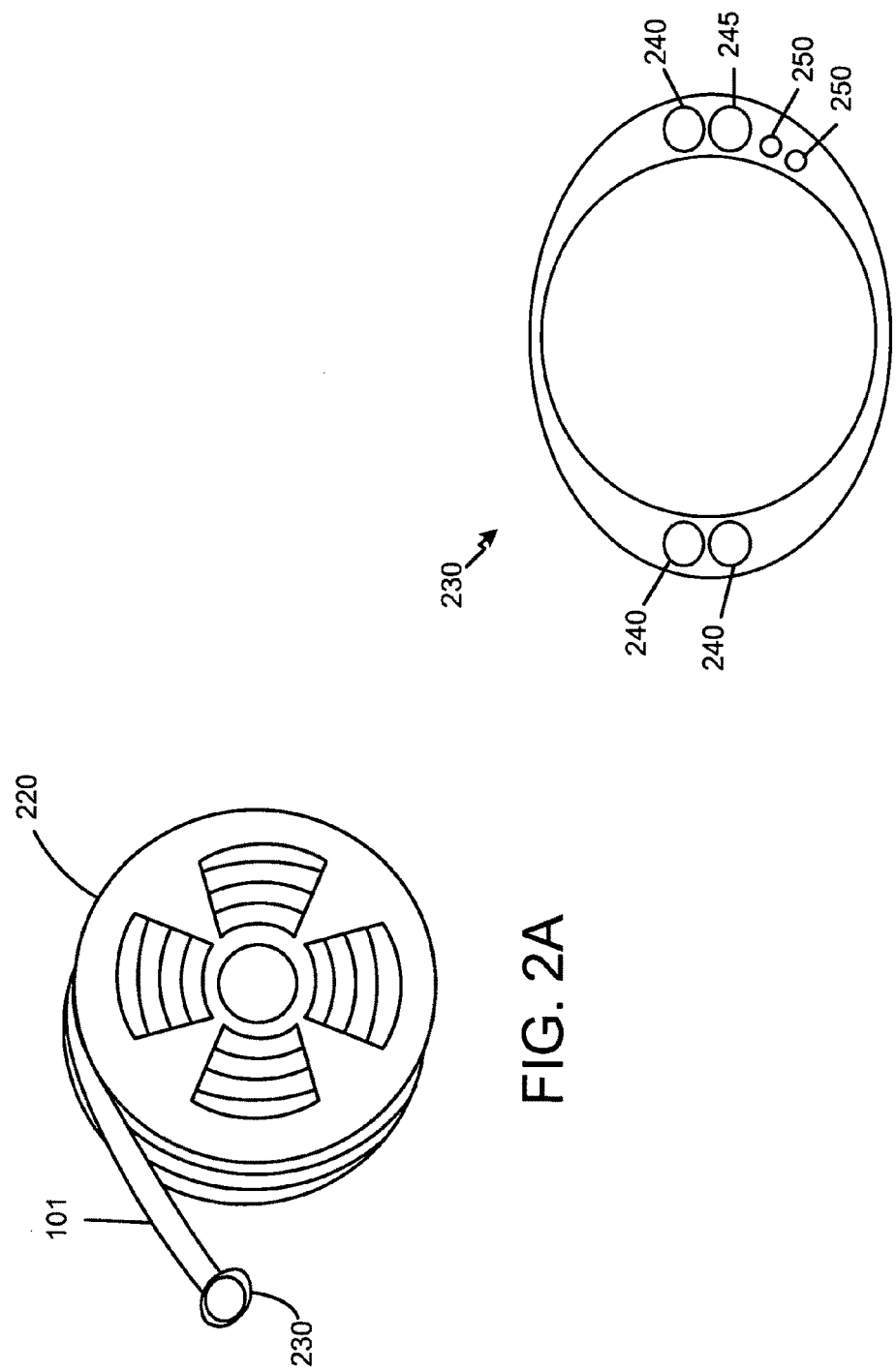

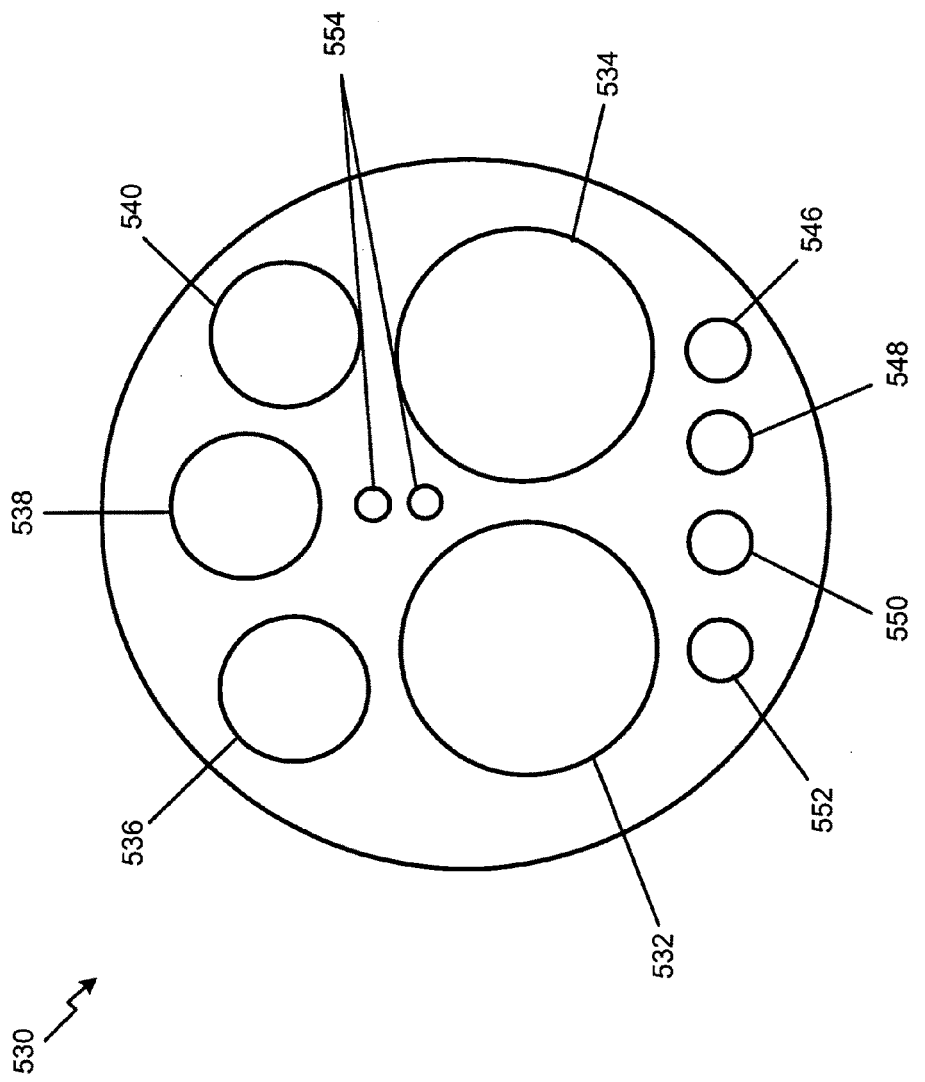

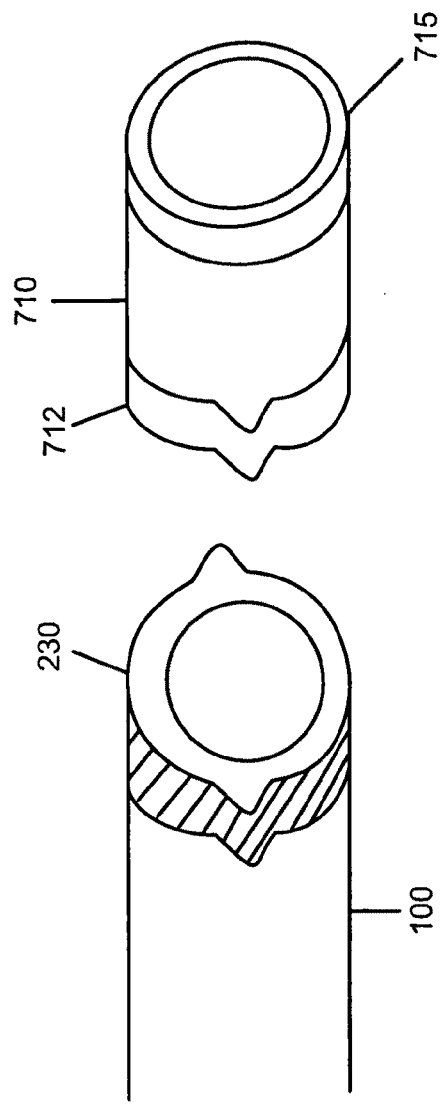
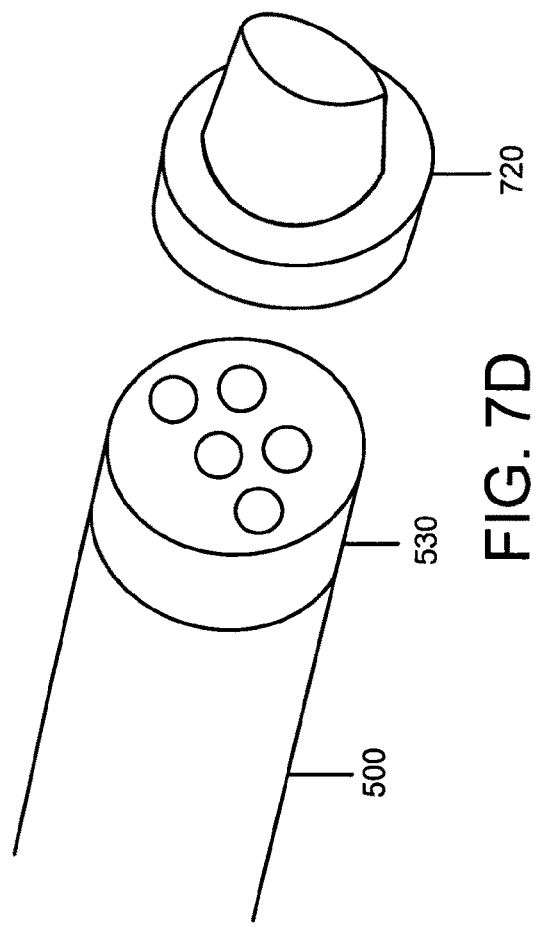
FIG. 7C
FIG. 7D

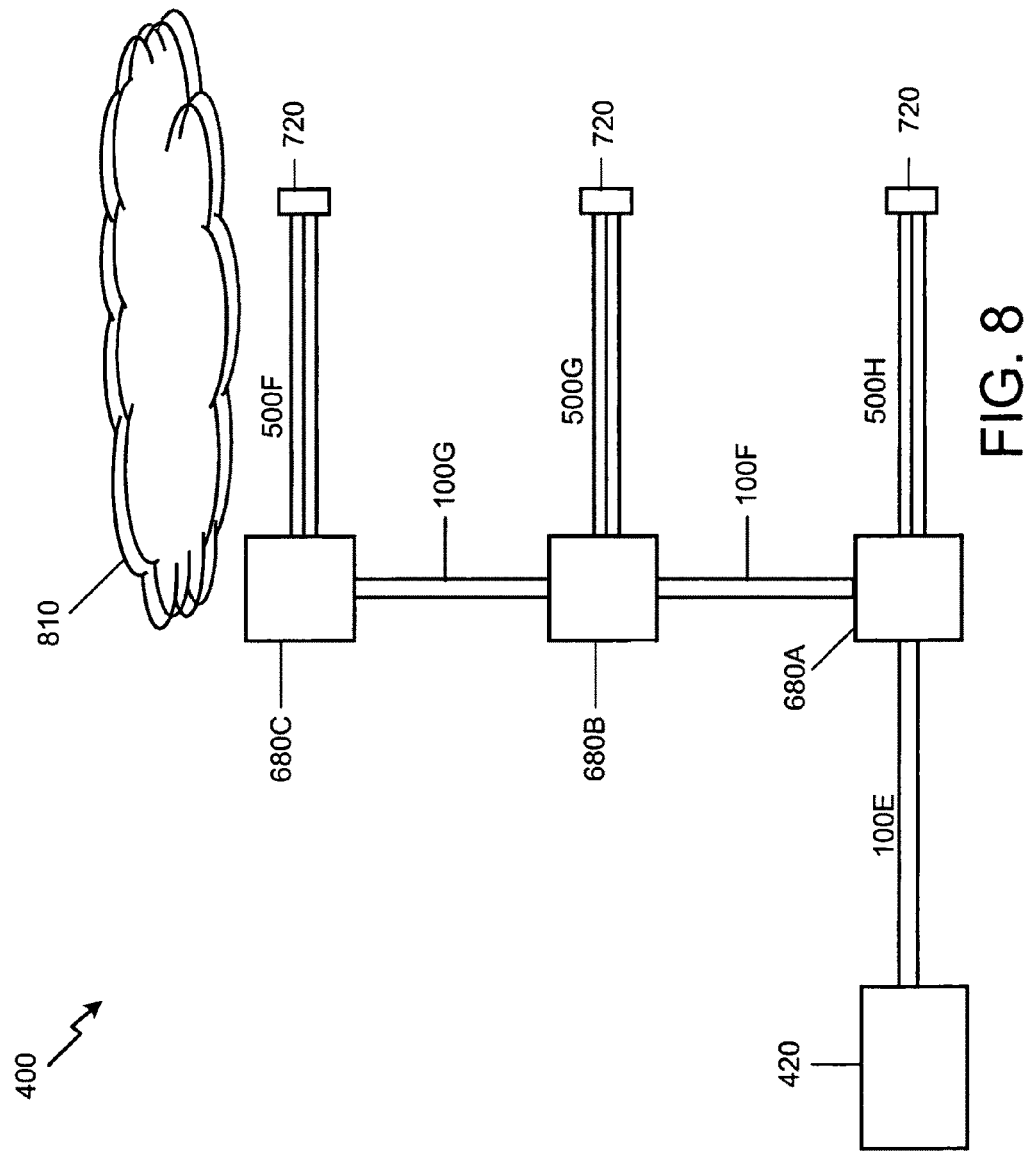

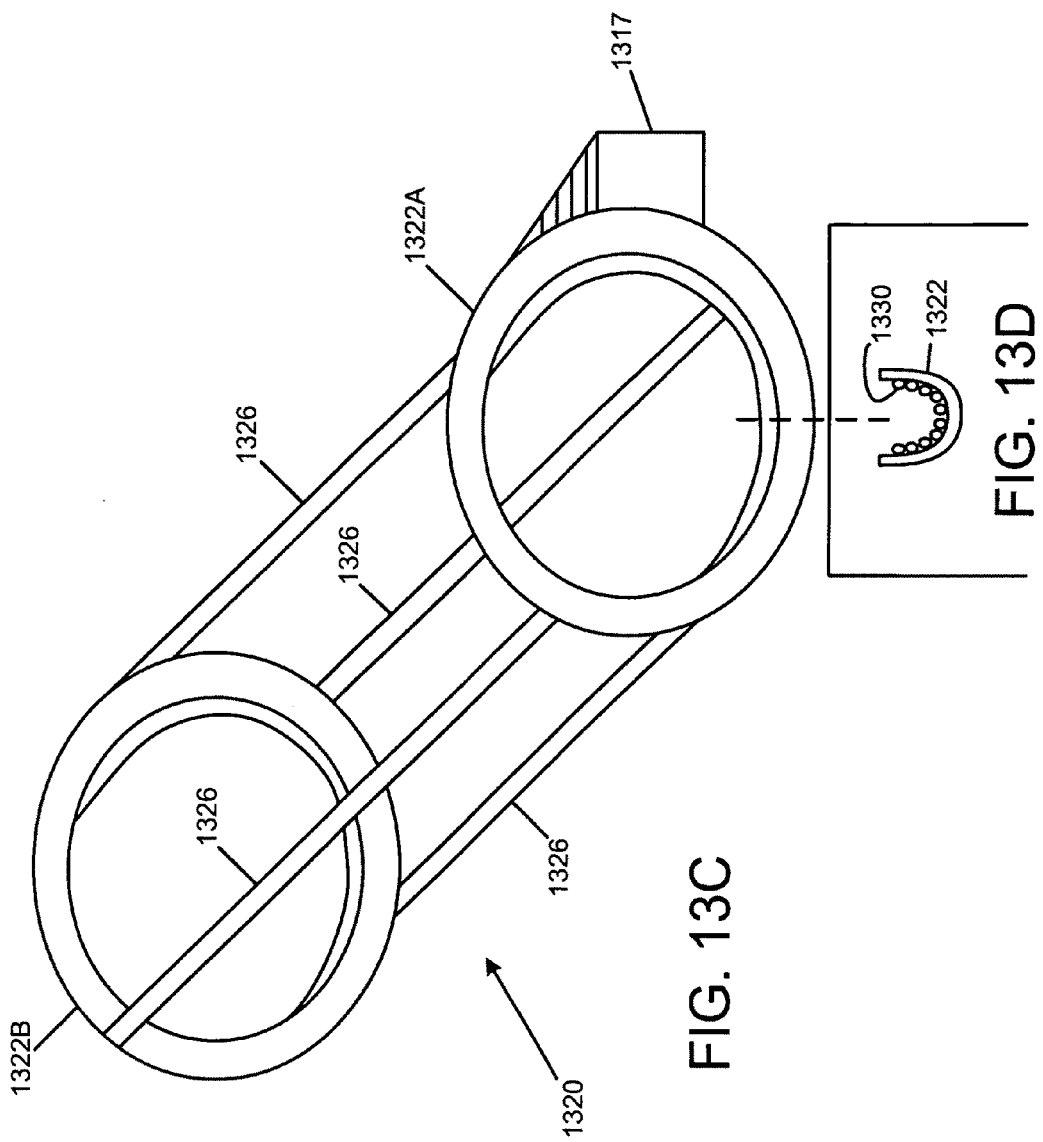

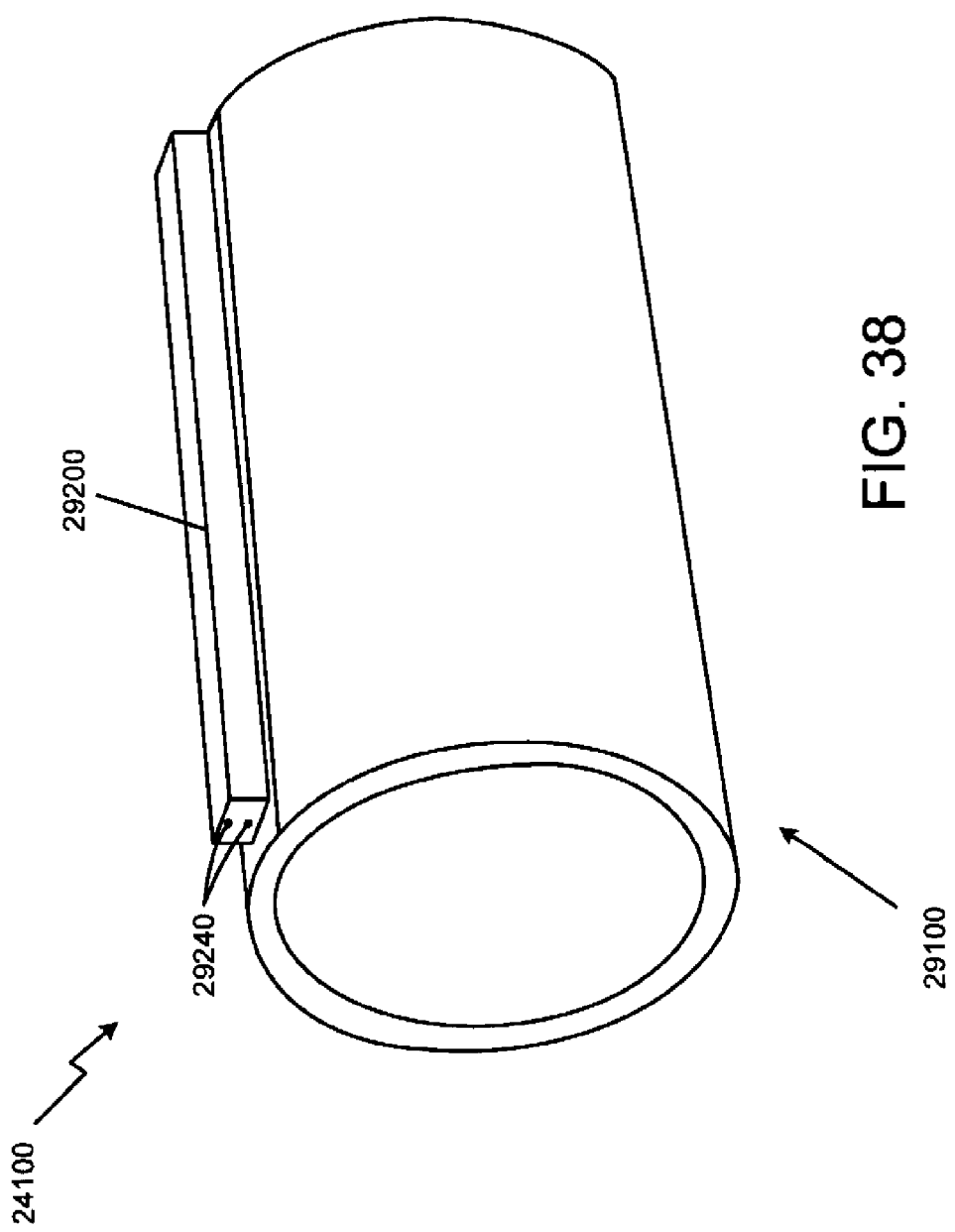

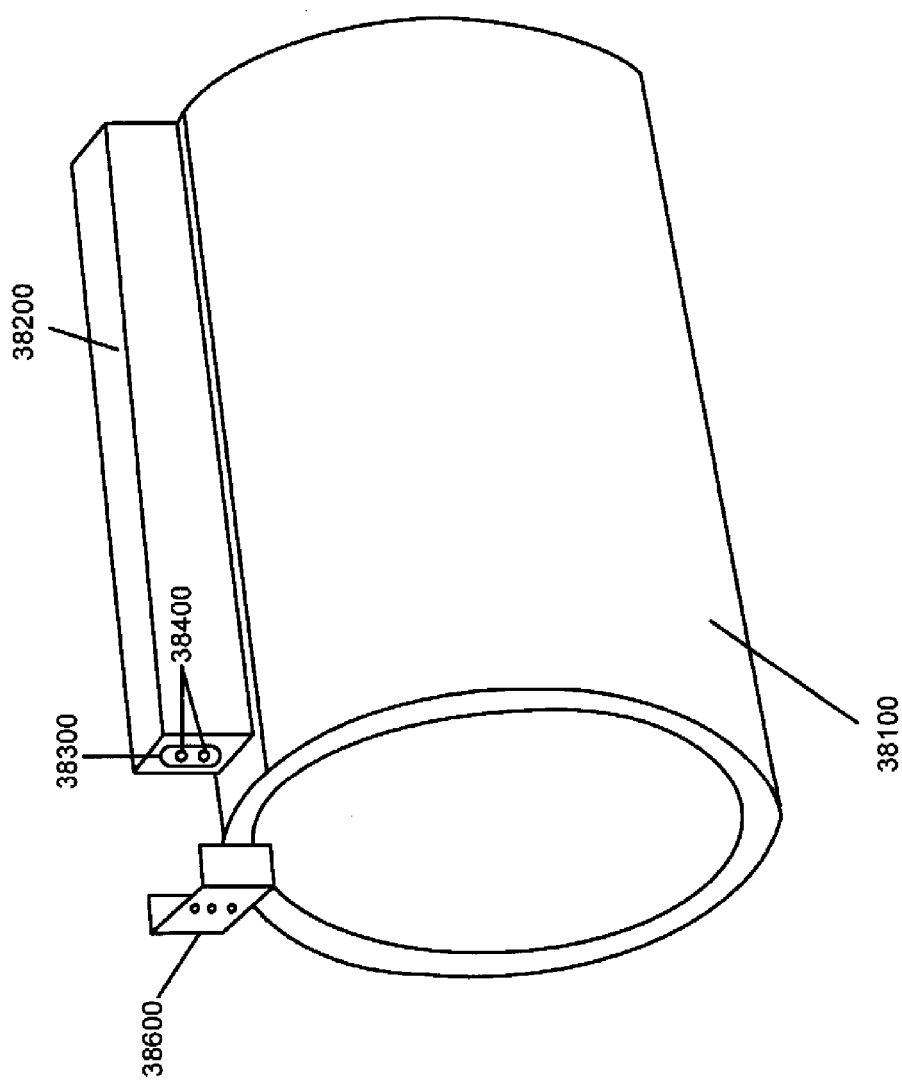

METHOD AND SYSTEM FOR FLUID TRANSMISSION ALONG SIGNIFICANT DISTANCES

CROSS-REFERENCE TO RELATED APPLICATION

This application is a Continuation-in-Part to U.S. patent application entitled, "Method and System for Fluid Transmission along Significant Distances" having Ser. No. 12/211,517 filed Sep. 16, 2008 which claims priority to U.S. Provisional Application entitled, "Alternative method of controlling fluid transmission" having Ser. No. 61/215,876 filed May 11, 2009, U.S. Provisional Application entitled, "Irrigation System" having Ser. No. 61/284,291 filed Dec. 16, 2009, U.S. Provisional Application entitled, "Additional Components for irrigation system" having Ser. No. 61/337,646 filed Feb. 11, 2010, which are entirely incorporated herein by reference.

FIELD

This disclosure is in the field of electrical and fluid distribution. More specifically, this disclosure describes the use of electrical wires associated with fluid conduit.

BACKGROUND

One related prior art device includes a pair of wires attached to a fire hose. The device allows a fireman at the output end of a hose to ring a bell at the fire truck. The bell is used to send simple signals to the fireman in control of the pumps sending water into the hose.

Another prior art device is a grounding wire embedded in a fire hose. The device is used to protect a fireman who encounters a live electric wire while fighting a fire. The ground wire is utilized by bringing the dangerous voltage down to zero volts when the tip of the hose touches the dangerous voltage.

As a fluid is pumped through a hose or pipe, the fluid pressure drops as it gets farther from the pump, eventually becoming inconsequential. A mechanical characteristic of every hose or pipe is a maximum pressure beyond which the hose or pipe will burst. Therefore, increasing pump pressure to increase downstream fluid pressure eventually becomes detrimental to the hose or pump. A common technique to affect downstream pressure in a hose or pipe is to insert booster pumps at prescribed intervals downstream.

Firefighters sometimes connect multiple pumper trucks together to extend the distance of their hoses and to increase the effective fluid pressure, when a fire is a significant distance from a source of water. The use of multiple pumper trucks is called "relay pumping".

Relay pumping is operationally challenging. The pressure and flow at each pumper truck must be monitored and adjusted and this requires a dedicated firefighter at each pumper truck to be in radio communication with corresponding dedicated firefighters at adjacent pumper trucks. Several expensive fire trucks, which are often is short supply in various jurisdictions, must be dedicated to the relay operation and are thereby not available for other firefighting tasks.

The pumper trucks use their diesel or gasoline fuel to power the pumps. If the relay must be maintained for a long time, the pumper trucks will have to be supplied with more fuel. This requires even more manpower and vehicles to transport fuels to the fire trucks.

Wildfires are often located in areas that are far from roadways and large volumes of water. In many wildfires, relay pumping cannot be implemented because large fire trucks or pump trucks cannot be driven off road into difficult terrain. Special fire trucks that carry water tanks can go off road, but they can supply only a very limited quantity of water, inadequate for fighting most wildfires. Helicopters and planes are often used to drop water or flame retardant material on the fire because no other source of water is nearby.

For non-firefighting situations, there are alternative means available for transporting water. Irrigation canals require enormous amounts of earth moving, and they can suffer from excessive water loss due to evaporation. Pipelines, which do not have to be dug into the ground and they don't have evaporation problems, may be adopted. However, pipelines require spatially distributed pumping stations to keep their fluids moving over long distances. Where possible, a pumping station hooks into a local power grid to power the pumps. Where no local power grid is available, tanker trucks haul diesel fuel to supply the fuel for the pumping stations. With tanker trucks, there are high transportation costs and a risk of vehicle accidents and fuel spills.

Golf course type irrigation systems typically have a central water pumping station, which sends the water through buried pipes to the far reaches of the golf course. Because of pressure drops, booster pumps are often required at the farther ends of the pipes. Electric power is required at these booster pumps and the distribution of the electric power is often a separate system of buried wires, or wires on poles. Sometimes, a booster pump may not be needed, but electric power is needed to power a remote electric sprinkler controller which might be used to determine when the local terrain is dry and in need of water. One proposal has been to add a small turbine in the flow of the water at the far end. The electric power generated by the turbine is used to power the electric sprinkler controller. The turbine is used to preclude the need for constructing a separate electric power distribution system.

Most farmers use either electricity or diesel engines to supply power for their irrigation systems. A few use propane, natural gas or gasoline. Large irrigation systems can require more electric power than is available on single phase wiring systems. If three-phase power is not available on or near the farm, the cost to construct power lines may be prohibitive. If the farmer's fields are far from the source of electricity, then diesel powered booster pumps will be required. The cost and effort of delivering the diesel fuel to the diesel generators can be a burden. Alternatively, the farmer must construct electric power lines that run across his property to the locations of the electric booster pumps.

Many prior art irrigation systems consist of a single pump, which supplies water to a network of pipes. These pipes deliver water to an array of sprinkler heads connected to the pipes. When the system is controlled by a single wire pair, they are called Two-Wire Irrigation Systems. These systems use a spatially separate network of low voltage wires to send power and commands to valves that control the sprinklers. The wires also provide a means for moisture sensors to be read in order to determine if sprinkling is necessary in a particular location. This separate network of wires is often placed in a separate conduit. If they are not placed in a separate conduit, the wires are at risk of being eaten by rodents or being cut by shovels. The wires must be carefully connected to the valves, which control the sprinkler heads. These connections must be made in the field, and they must be waterproof. The installers must be well trained to properly install the irrigation system.

Thus, a heretofore unaddressed need exists in the industry to address the aforementioned deficiencies and inadequacies.

SUMMARY

Embodiments of the present disclosure provide a supply line system for conveying a fluid. Briefly described, in architecture, one embodiment of the system, among others, can be implemented as follows. The system includes a first and a second conduit segment each having at least one inner conduit surface and an outer conduit surface. At least one fluid chamber is within each of the first and second conduit segments and formed at least partially by the at least one inner conduit surface, thereby transporting a quantity of fluid along the length of each of said conduit segments. At least one electric wire is located between the at least one inner conduit surface and the outer conduit surface and extending approximately the length of each of the first and second conduit segments. The electric wire sized to carry at least one electric current. A conduit connection element is connecting the first and second conduit segments, the conduit connection element is mating the fluid chamber and the at least one electric wire of the first conduit segment with the fluid chamber and the at least one electric wire of the second conduit segment, wherein at least a portion of the quantity of fluid and the electric signals is passed from the first conduit segment to the second conduit segment, wherein said conduit connection element is at least one of a conduit adapter, a conduit coupler assembly and a conduit multi-port device. A control system is connected to the at least one electric wire and in communication with at least one device.

Another embodiment may include a fluid distribution system, which can be implemented as follows: The system includes a network of interconnected fluid conduits having at least a first and a second fluid conduit each having at least one inner conduit surface and an outer conduit surface, the first and the second fluid conduits having at least one fluid chamber within each of the first and second conduit segments and housed at least partially by the at least one inner conduit surface, thereby transporting a quantity of fluid along the length of each of said conduit segments and at least one electric wire located between the at least one inner conduit surface and the outer conduit surface and extending approximately the length of each of the first and second conduit segments, the electric wire sized to carry at least one electric current. At least one fluid pump is supplying a quantity of fluid to at least one of the first and second fluid conduits. At least one multiport adapter is in fluid communication with the network of interconnected fluid conduits, the multiport adapter having at least one valve element, wherein the at least one valve element controls a flow rate of the quantity of fluid within at least a portion of the network of interconnected fluid conduits. At least one computerized device is in communication with at least one of the at least one fluid pump and the at least one multiport adapter over a data network, wherein the data network is at least partially enabled on the at least one electric wire.

The present disclosure can also be viewed as providing methods for conveying fluid within a supply line system. In this regard, one embodiment of such a method, among others, can be broadly summarized by the following steps: providing a first and a second conduit segment each having at least one inner conduit surface and an outer conduit surface; transporting a quantity of fluid along the length of each of said conduit segments in at least one fluid chamber within each of the first and second conduit segments and formed at least partially by the at least one inner conduit surface; carrying at least one electric current within at least one electric wire located between the at least one inner conduit surface and the outer conduit surface of the first and second conduit segments and extending approximately the length of each of the first and second conduit segments; connecting the first and second conduit segments with a conduit connection element, the conduit connection element mating the fluid chamber and the at least one electric wire of the first conduit segment with the fluid chamber and the at least one electric wire of the second conduit segment; and passing at least a portion of the quantity of fluid and the electric current from the first conduit segment to the second conduit segment.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1A is an illustration of a cross-section of a conduit, in accordance with a first exemplary embodiment of the present disclosure.

FIG. 2A is a perspective illustration of the conduit of FIG. 1A on a storage reel, in accordance with the first exemplary embodiment of the present disclosure.

FIG. 2B is an illustration of a perspective view of a connector for the conduit of FIG. 1A, in accordance with the first exemplary embodiment of the present disclosure.

FIG. 5B is an illustration of a perspective view of a connector for the conduit of FIG. 5A, in accordance with the fourth exemplary embodiment of the conduit shown in FIG. 1A.

Figure 1B:
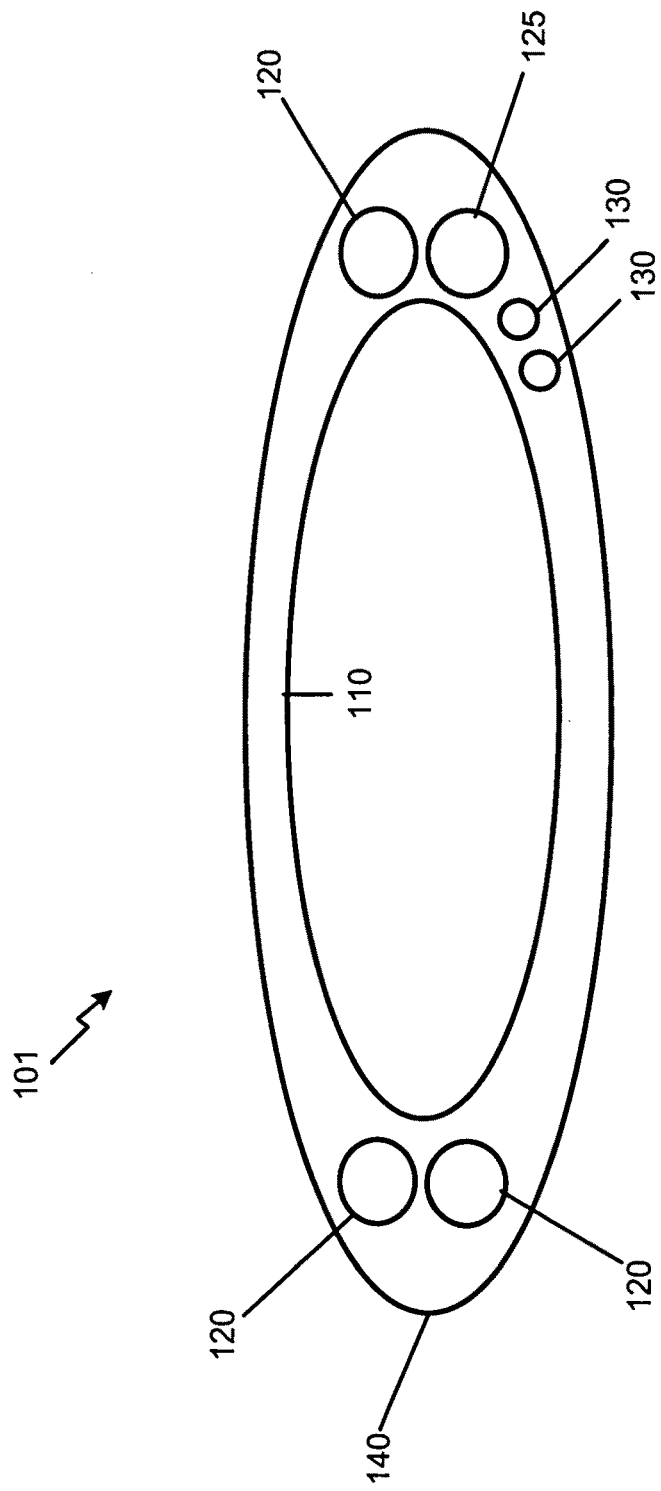
FIG. 1B is an illustration of a cross-section of a conduit, in accordance with a second exemplary embodiment of the conduit shown in FIG. 1A.
Figure 1C:
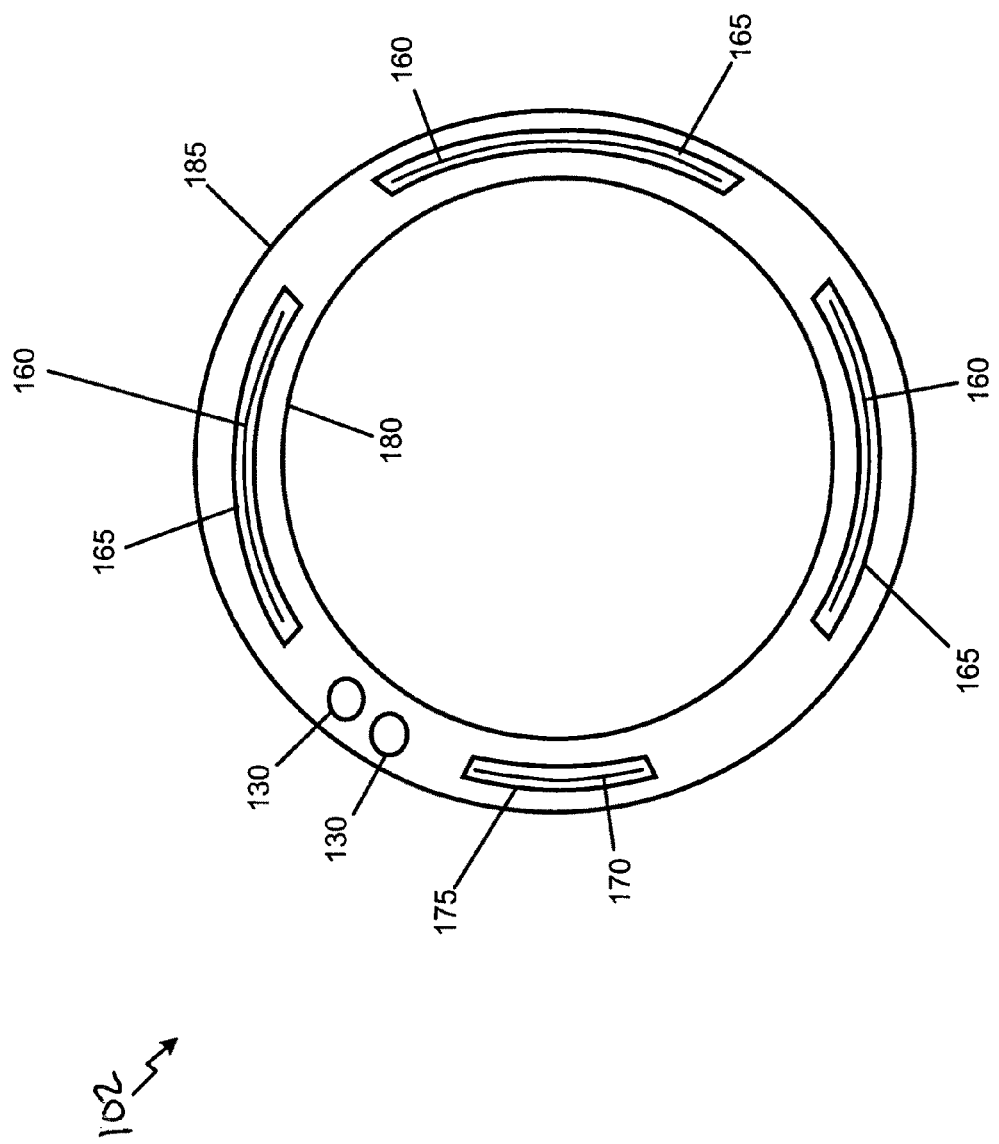
FIG. 1C is an illustration of a cross-section of a conduit, in accordance with a third exemplary embodiment of the conduit shown in FIG. 1A.
Figure 5A:
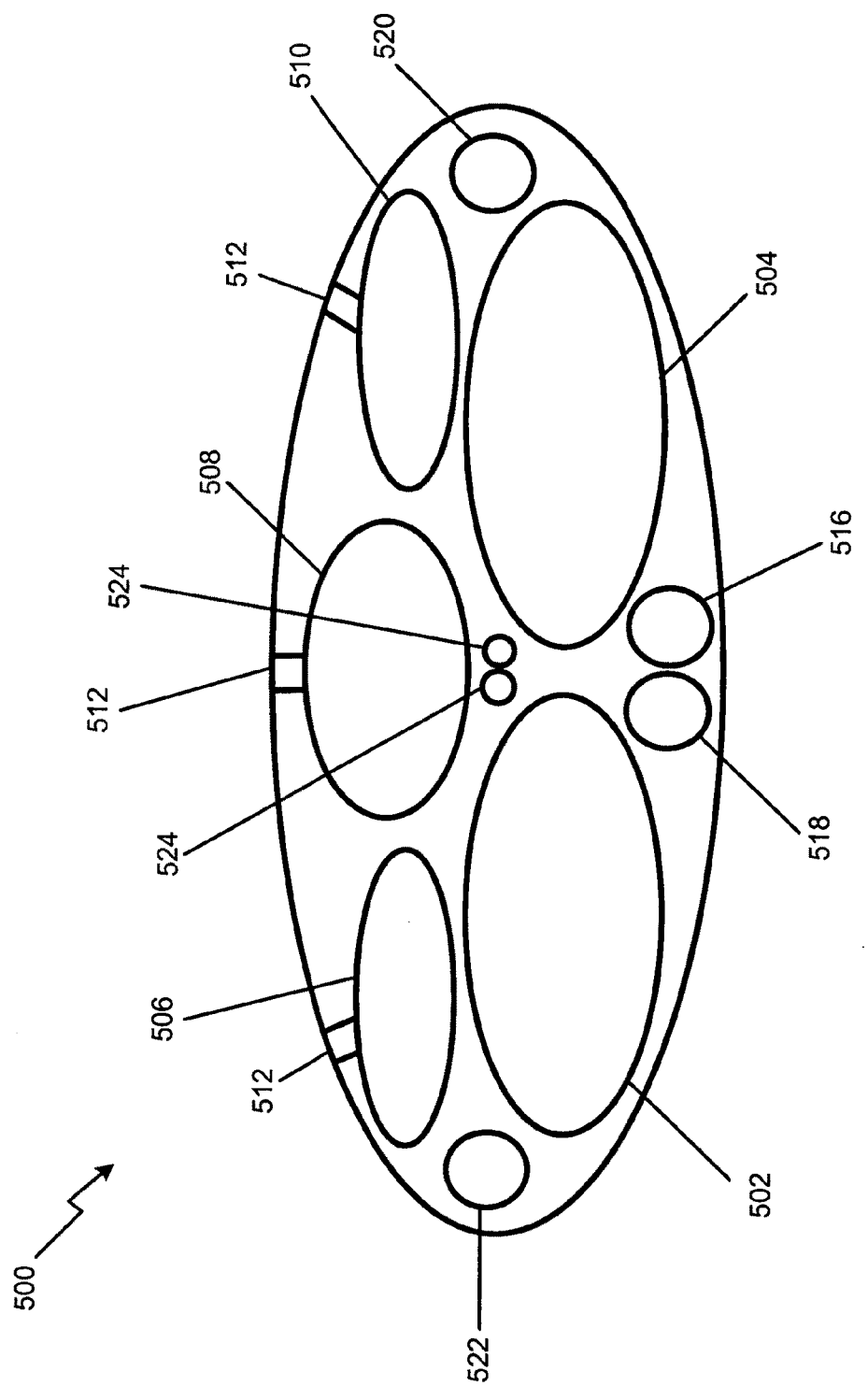
FIG. 5A is an illustration of a cross-section of a conduit, in accordance with a fourth exemplary embodiment of the conduit shown in FIG. 1A.

1B, FIG. 1C, and FIG. 5A, in accordance with the first exemplary embodiment of the present disclosure.

Figure 7A:
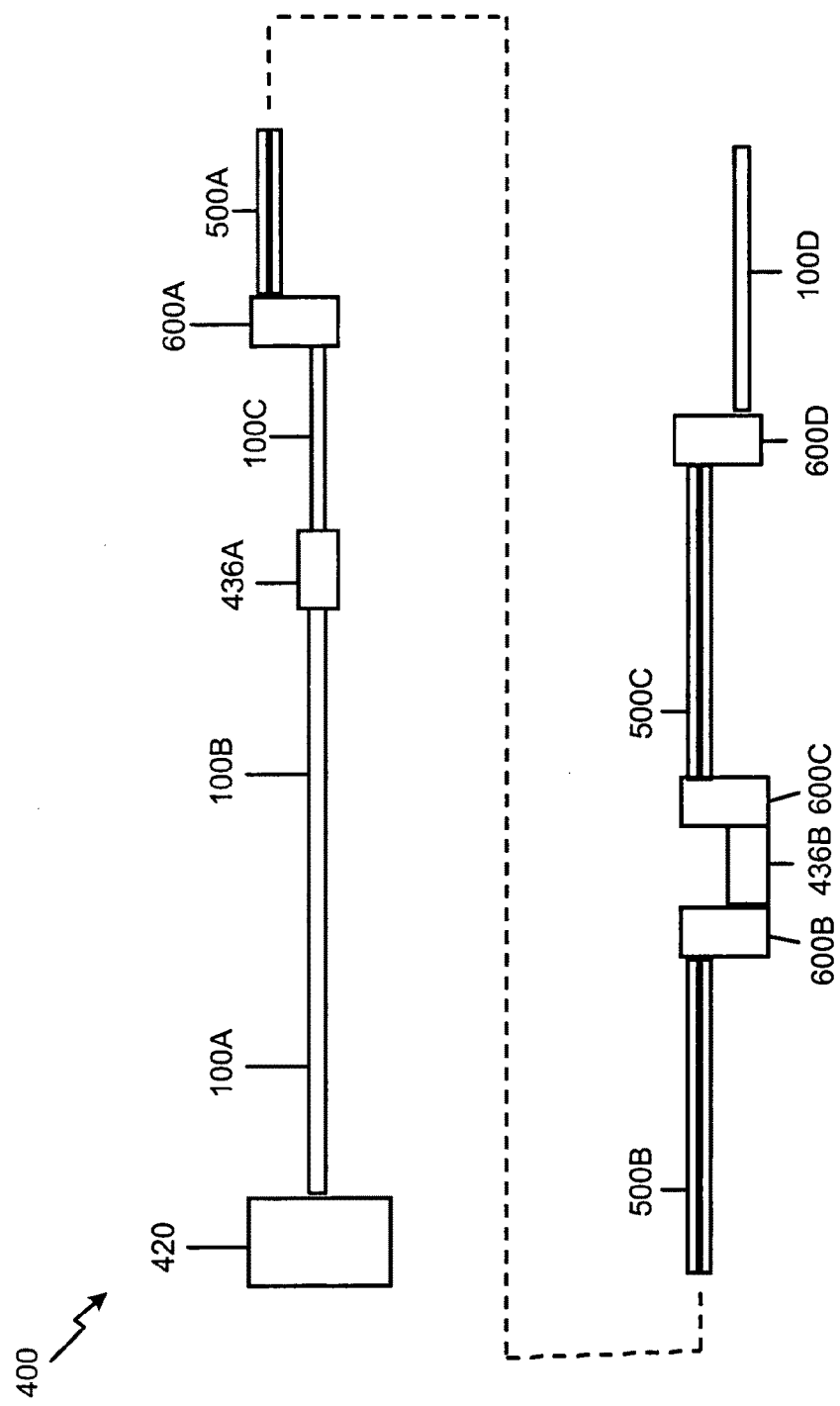

FIG. 7A is an illustration of a pipeline, in accordance with the first exemplary embodiment of the present disclosure.

Figure 7B:
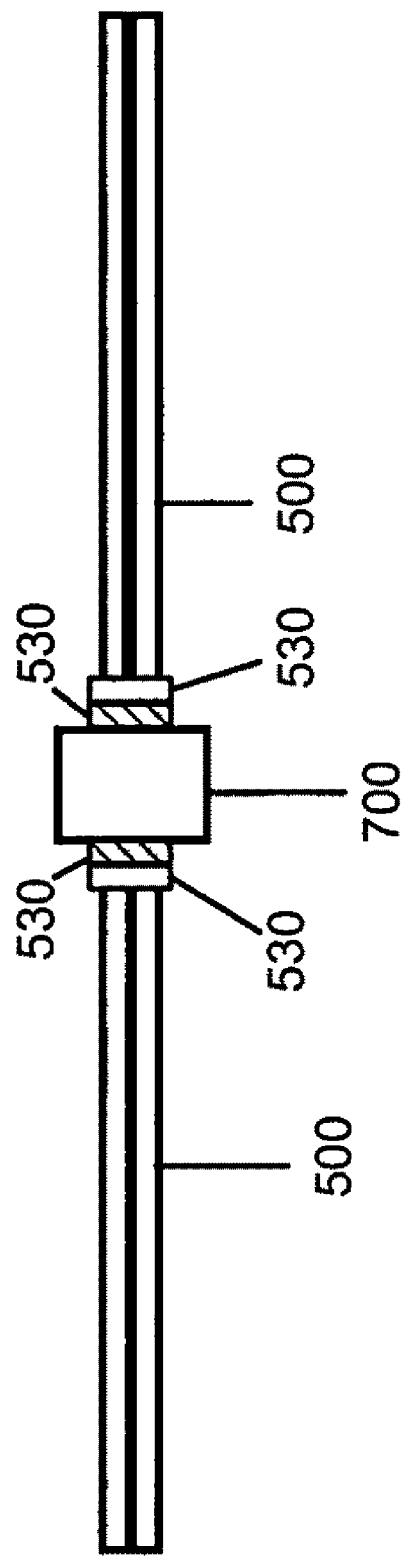

FIG. 7B is an illustration of an exploded view of an interconnection of the conduit of FIG. 5A and a pump, in accordance with the first exemplary embodiment of the present disclosure.

FIG. 7C is an illustration of a perspective view of a fire hose adapter, in accordance with the first exemplary embodiment of the present disclosure.

FIG. 7D is an illustration of a perspective view of a stop flow, in accordance with the first exemplary embodiment of the present disclosure.

FIG. 8 is an illustration of a portion of a pipeline, in accordance with the first exemplary embodiment of the present disclosure.

Figure 9:
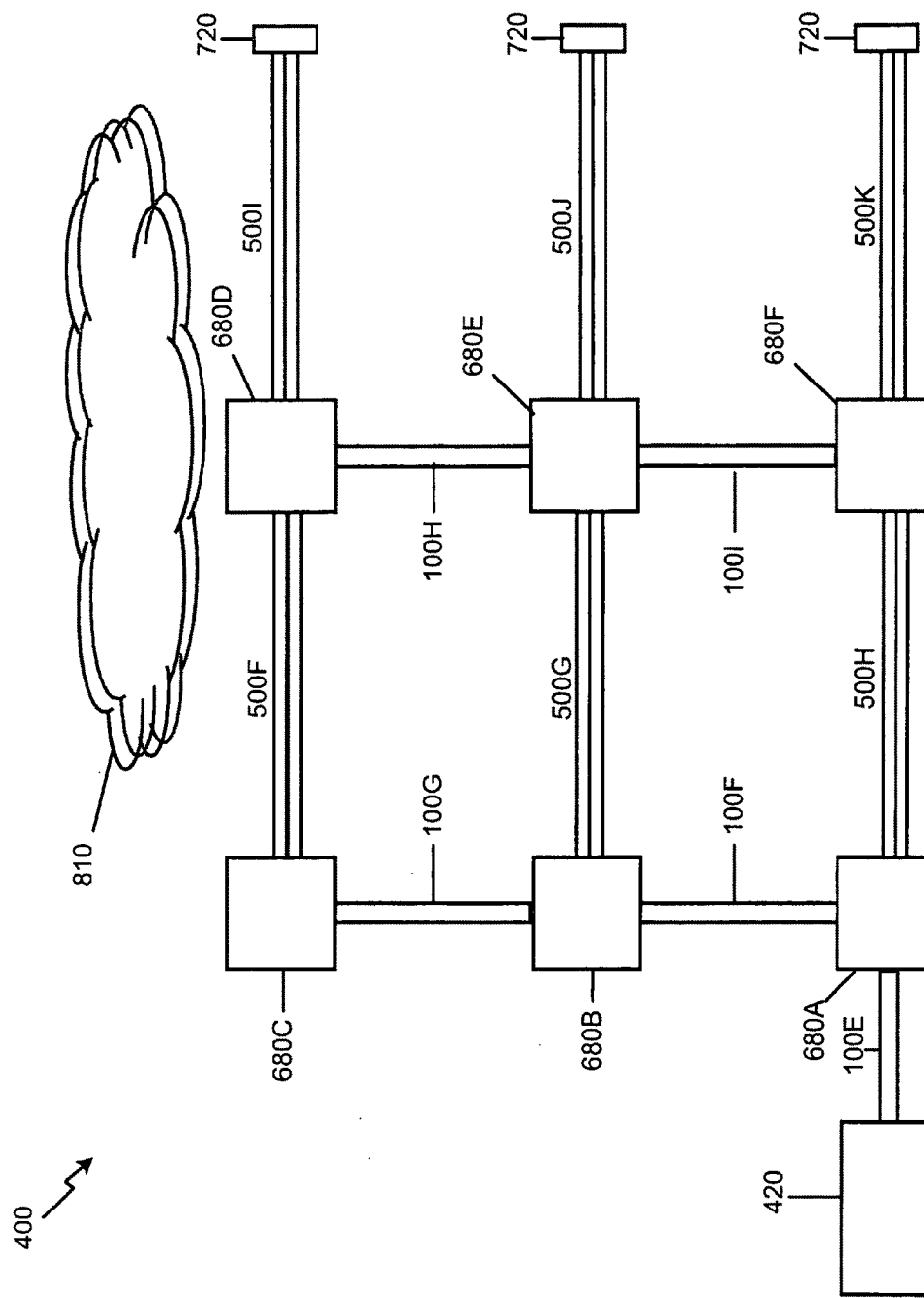

FIG. 9 is an illustration of a portion of a pipeline, in accordance with the first exemplary embodiment of the present disclosure.

Figure 10:
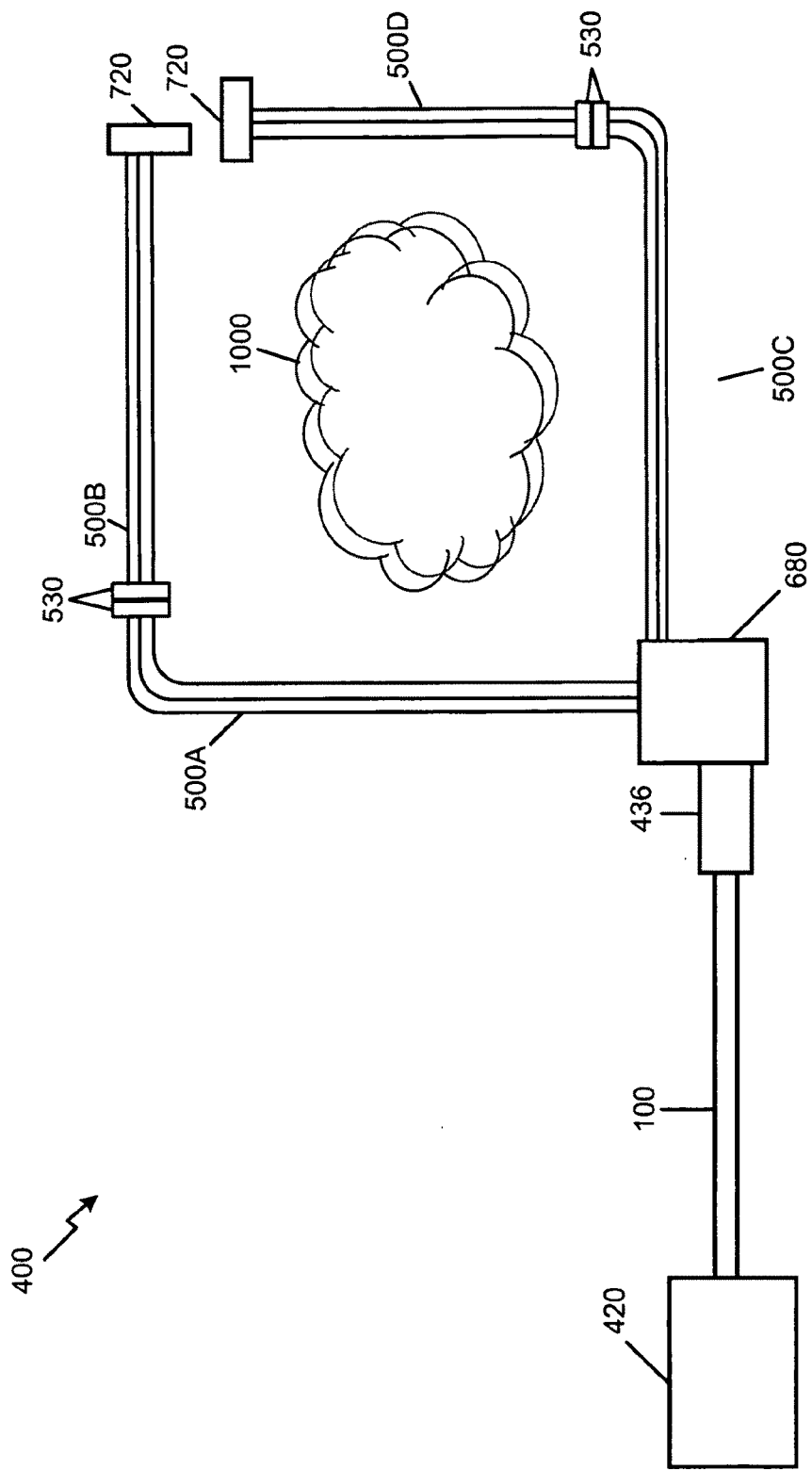

FIG. 10 is an illustration of a portion of a pipeline, in accordance with the first exemplary embodiment of the present disclosure.

Figure 11:
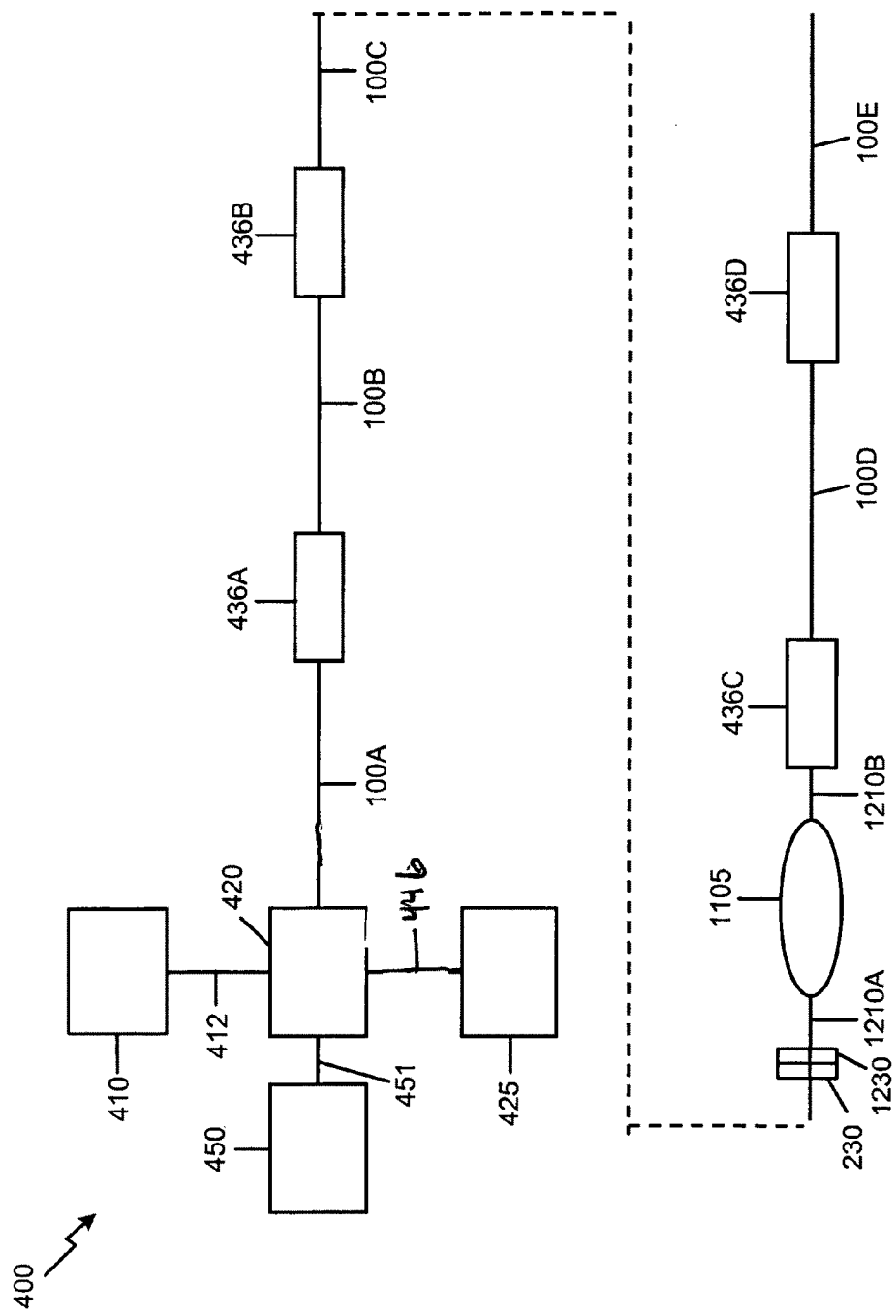

FIG. 11 is an illustration of a portion of a pipeline, in accordance with the first exemplary embodiment of the present disclosure.

Figure 12:
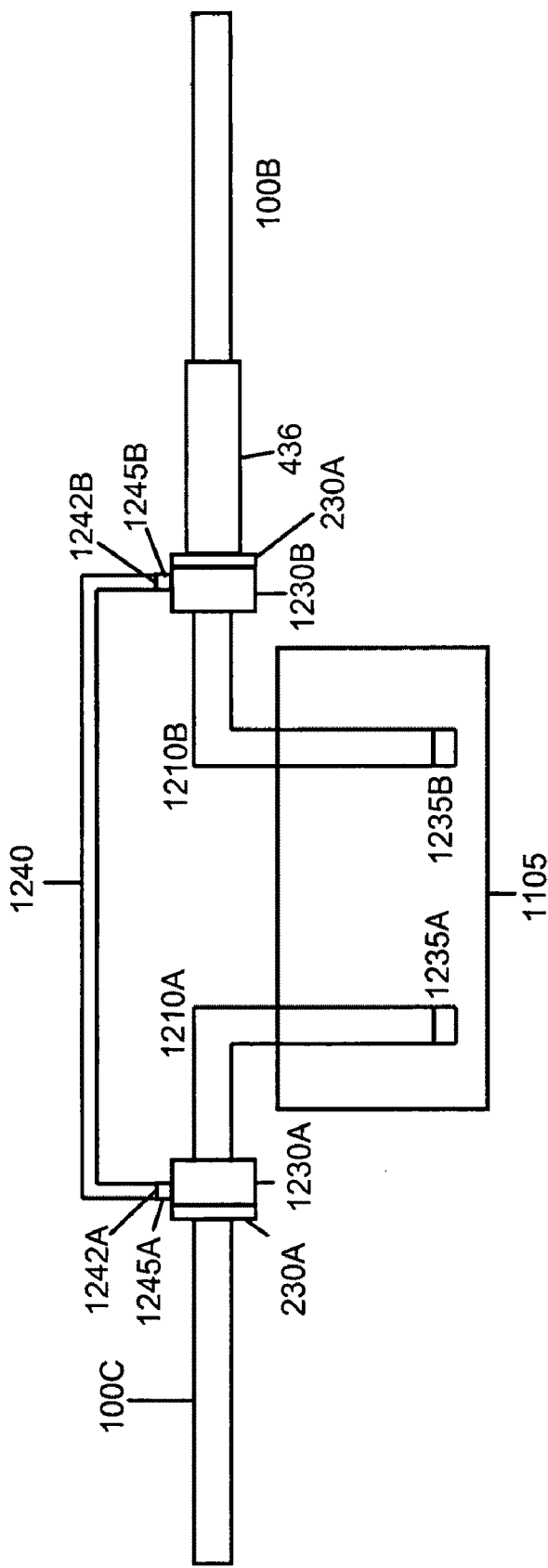

FIG. 12 is an illustration of a perspective view of a detail of the pipeline of FIG. 11, in accordance with the first exemplary embodiment of the present disclosure.

Figure 13A:
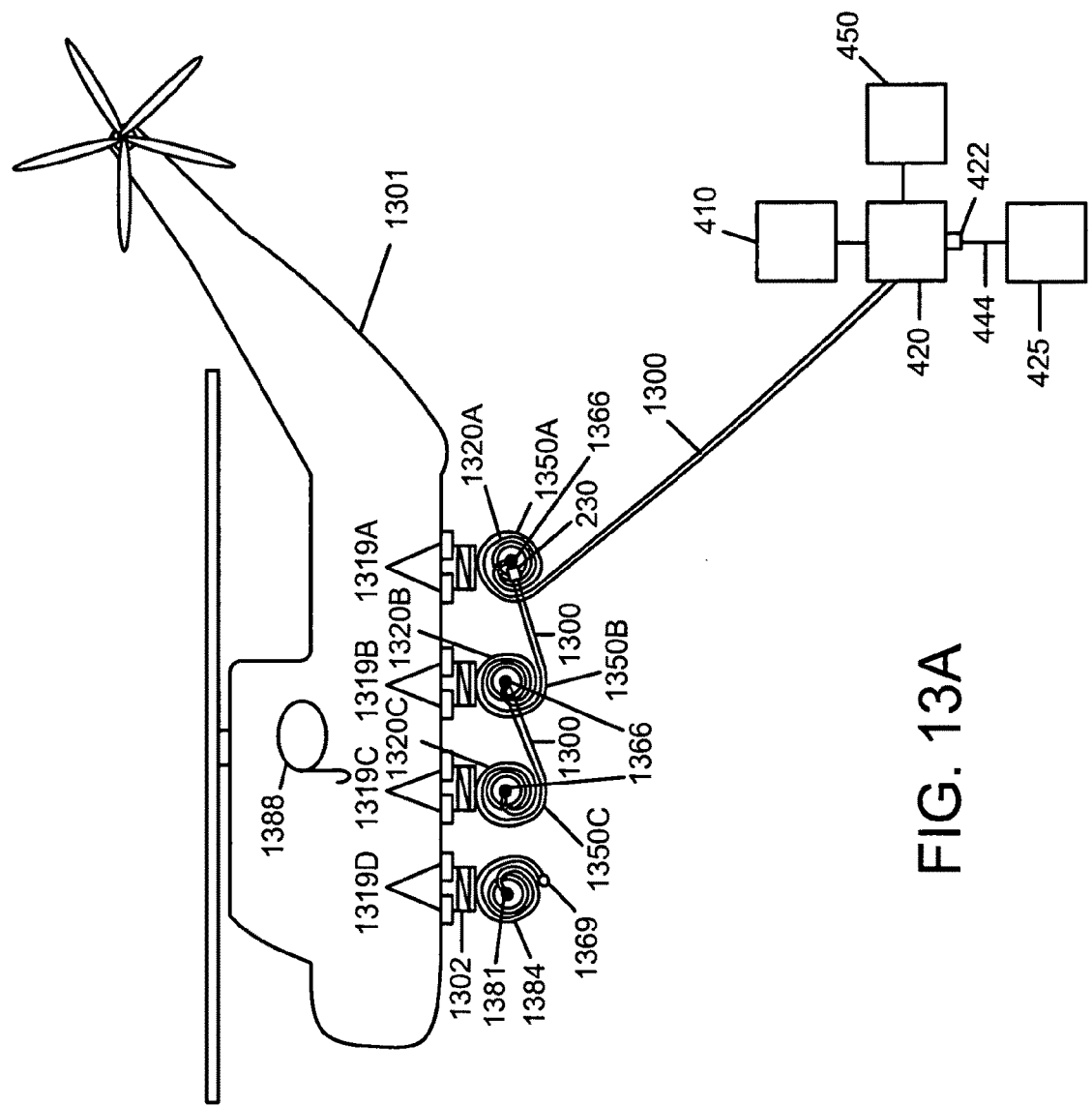

FIG. 13A is an illustration of a side view of an aerial vehicle carrying conduit, in accordance with the first exemplary embodiment of the present disclosure.

Figure 13B:
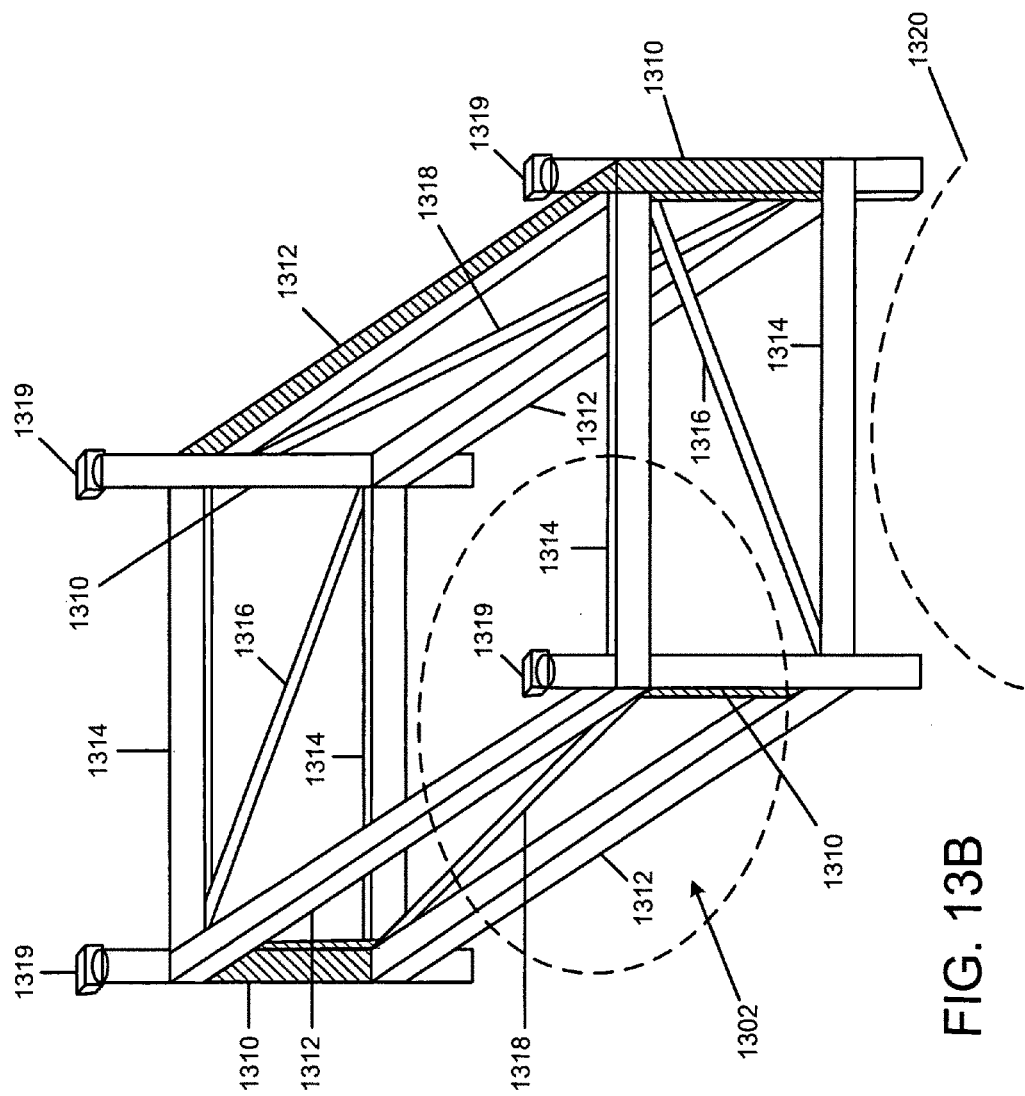

FIG. 13B is an illustration of a perspective view of a reel support bracket for supporting the reels shown in FIG. 13A, in accordance with the first exemplary embodiment of the present disclosure.

FIG. 13C is an illustration of a perspective view of a reel support device for supporting the reels shown in FIG. 13A, in accordance with the first exemplary embodiment of the present disclosure.

FIG. 13D is an illustration of a side view of a detail of the reel support device of FIG. 13C, in accordance with the first exemplary embodiment of the present disclosure.

Figure 13E:
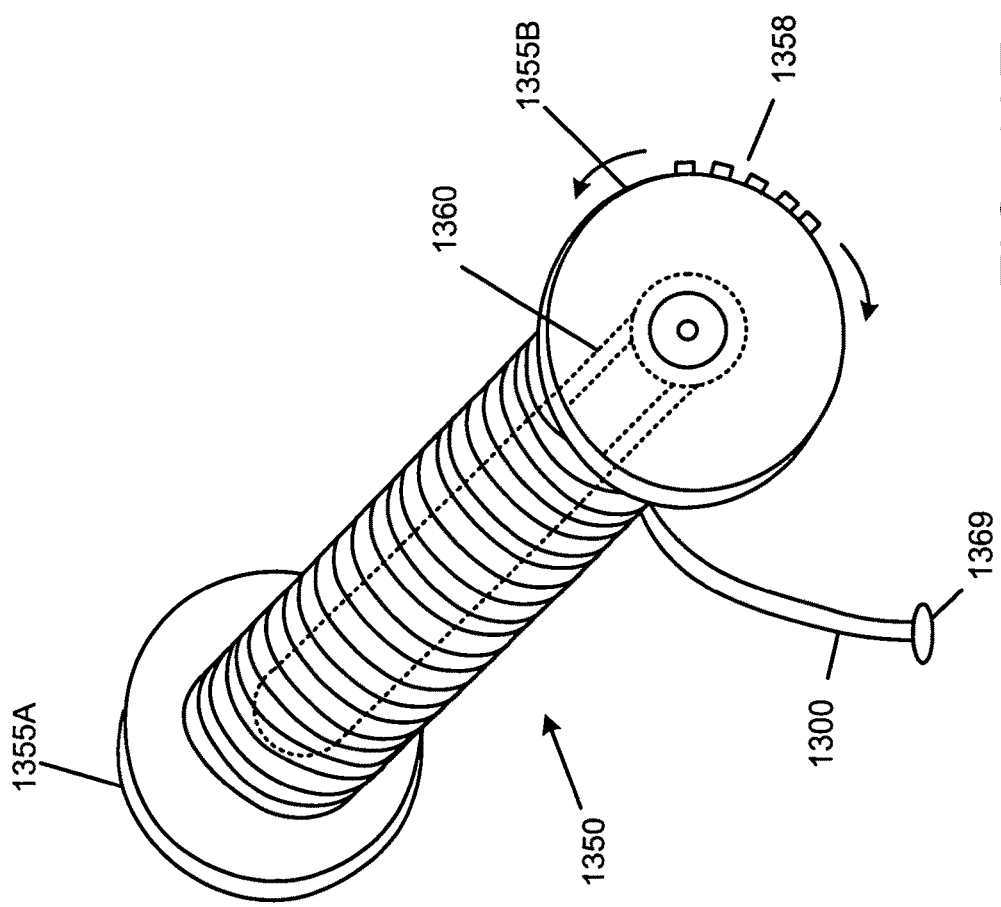

FIG. 13E is an illustration of a perspective view of the reel illustrated in FIG. 13A, in accordance with the first exemplary embodiment of the present disclosure.

Figure 13F:
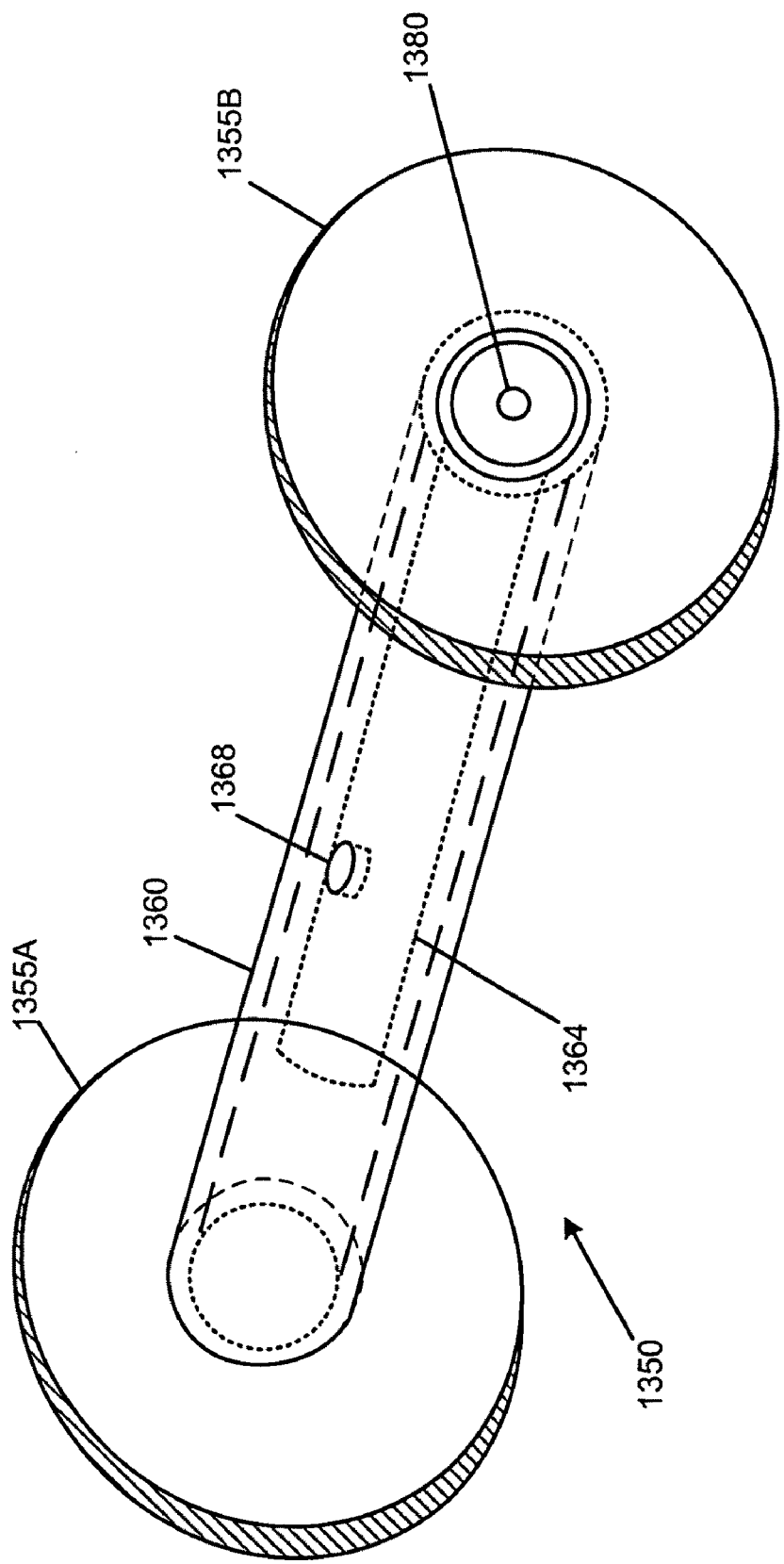

FIG. 13F is an illustration of a perspective view of a helicopter electrical booster pump, in accordance with the first exemplary embodiment of the present disclosure.

Figure 13G:
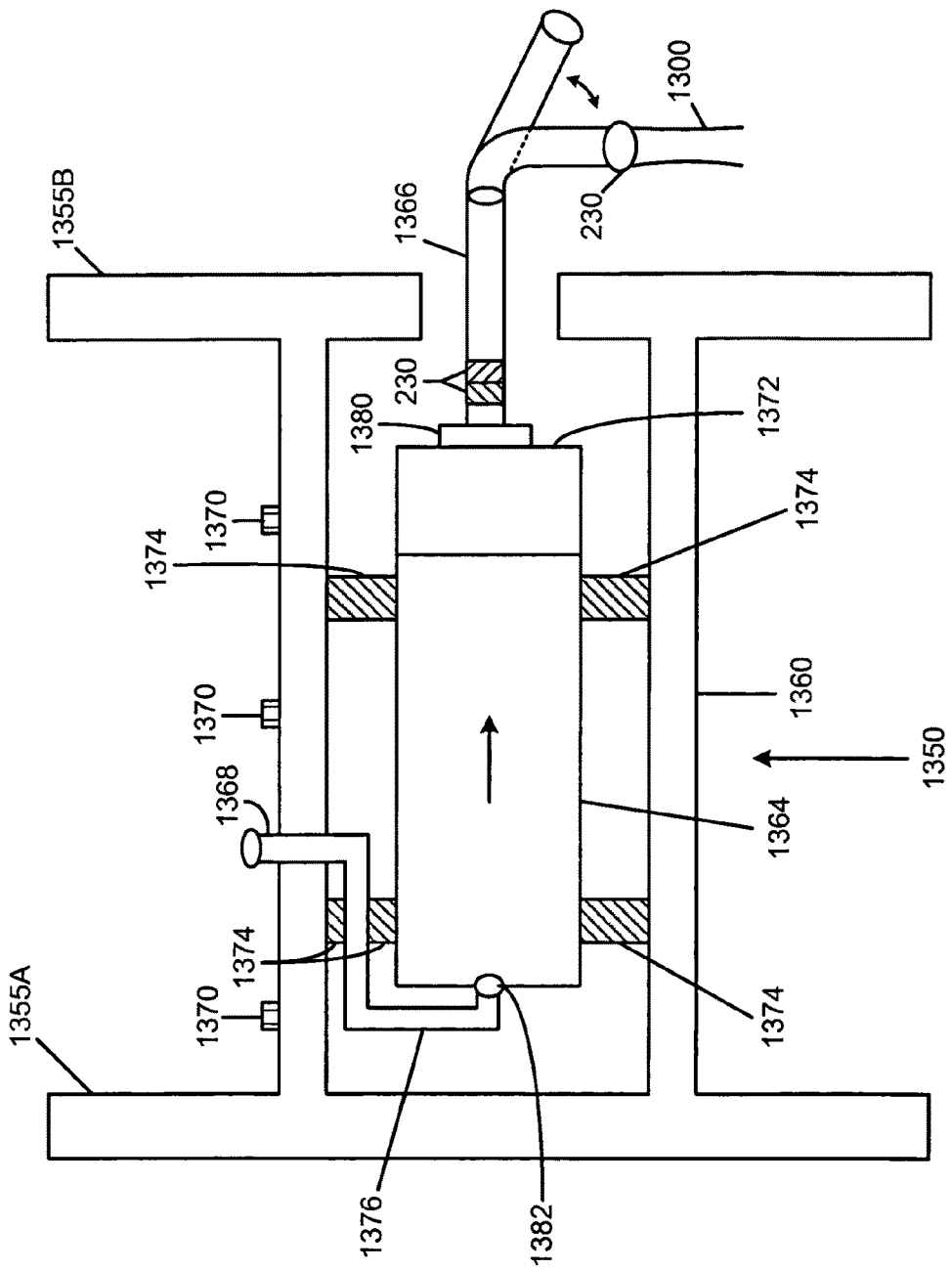

FIG. 13G is an illustration of a cross-sectional view of the aerial reel shown in FIG. 13E, in accordance with the first exemplary embodiment of the present disclosure.

Figure 14:
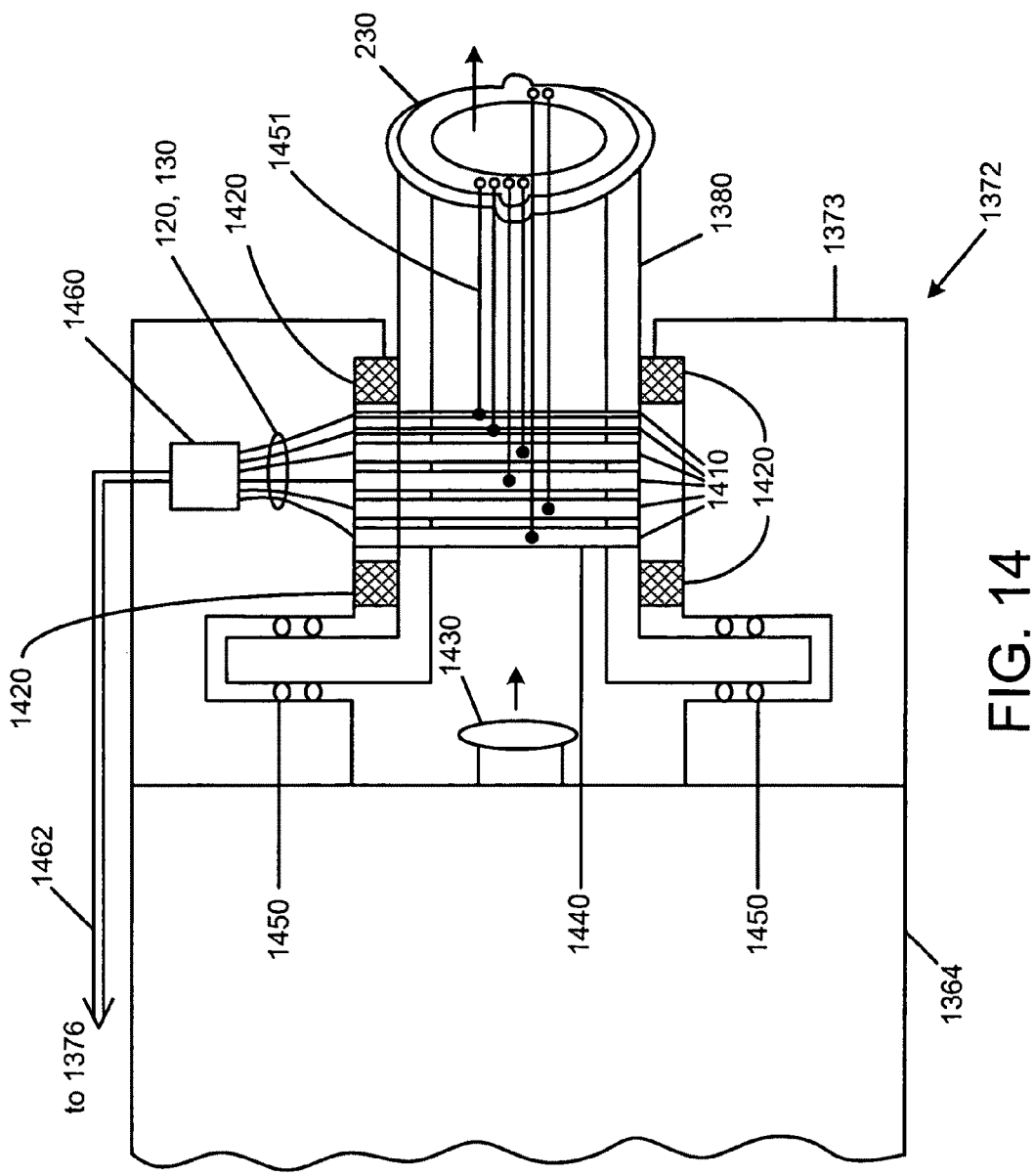

FIG. 14 is an illustration of a cross-sectional view of a slip ring assembly shown in FIG. 13G, in accordance with the first exemplary embodiment of the present disclosure.

Figure 15:
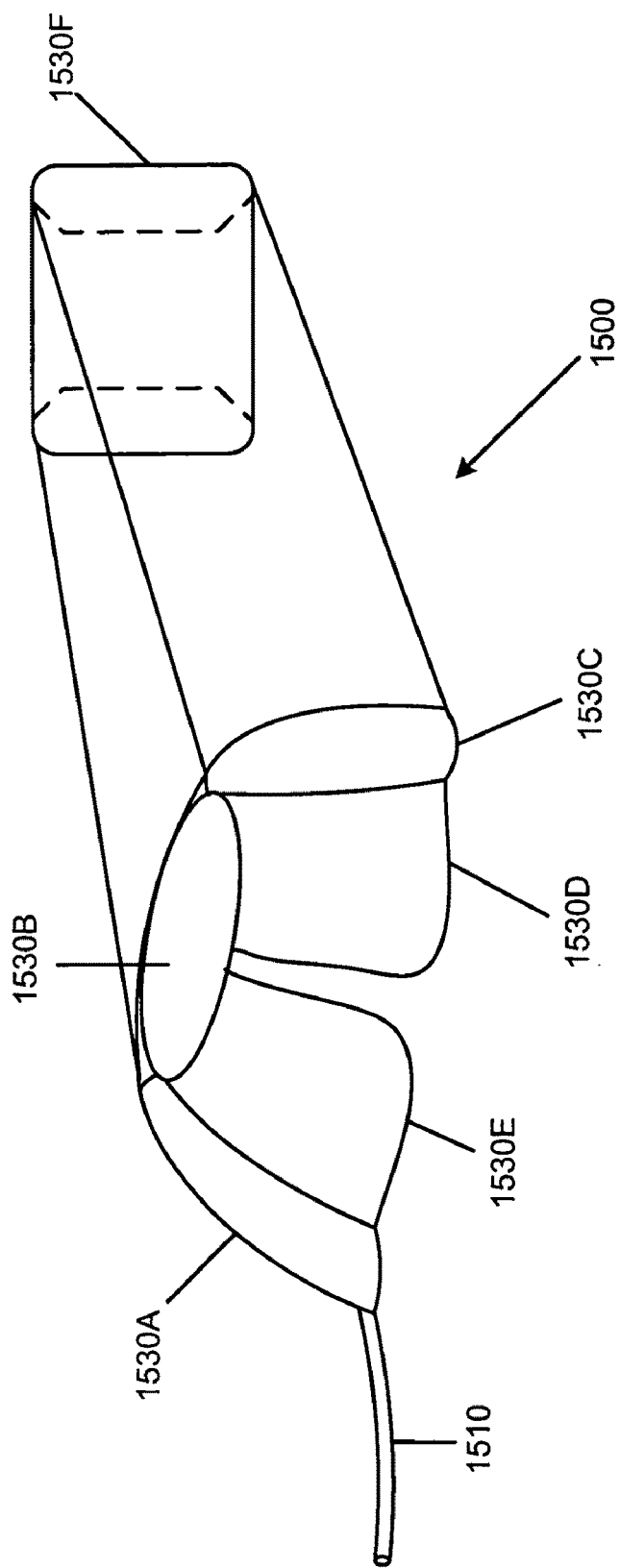

FIG. 15 is a perspective view of a portable water tent, in accordance with the first exemplary embodiment of the present disclosure.

Figure 16:
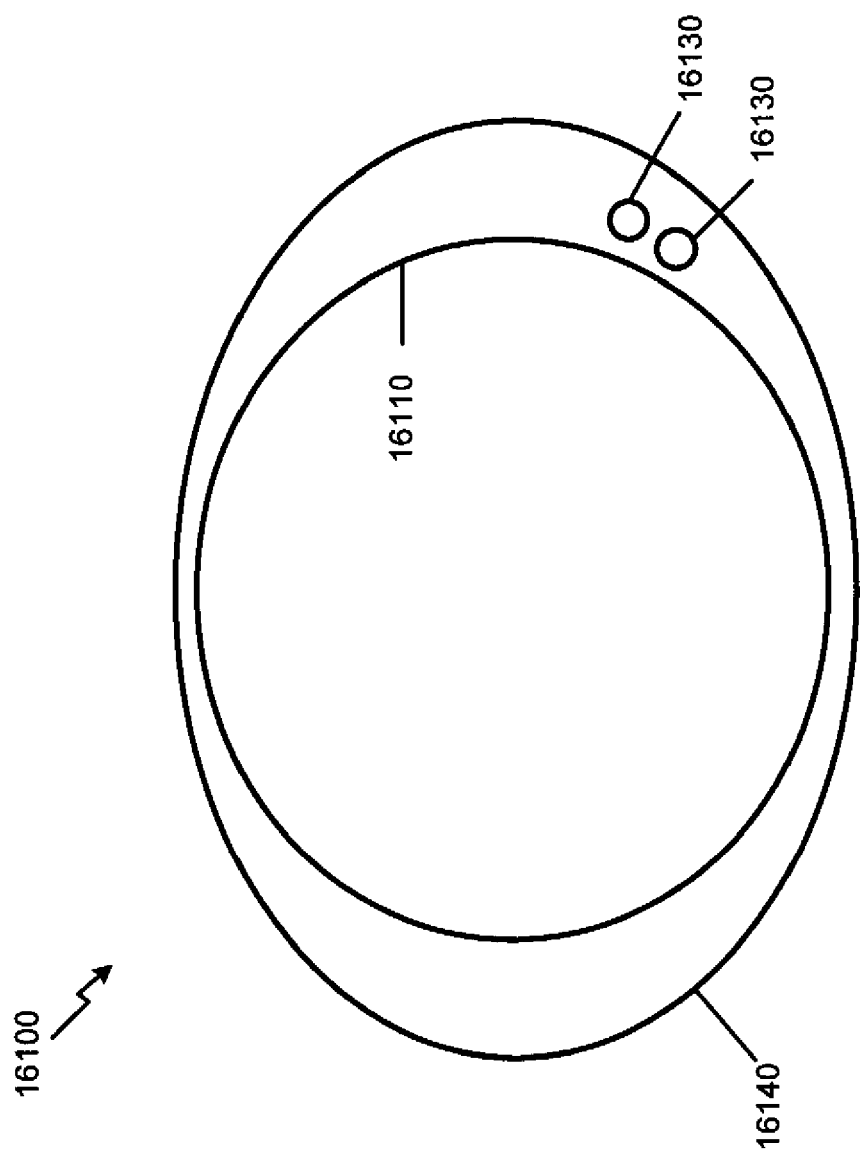

FIG. 16 is an illustration of a cross-section of the conduit, in accordance with a fifth exemplary embodiment of the present disclosure.

Figure 17:
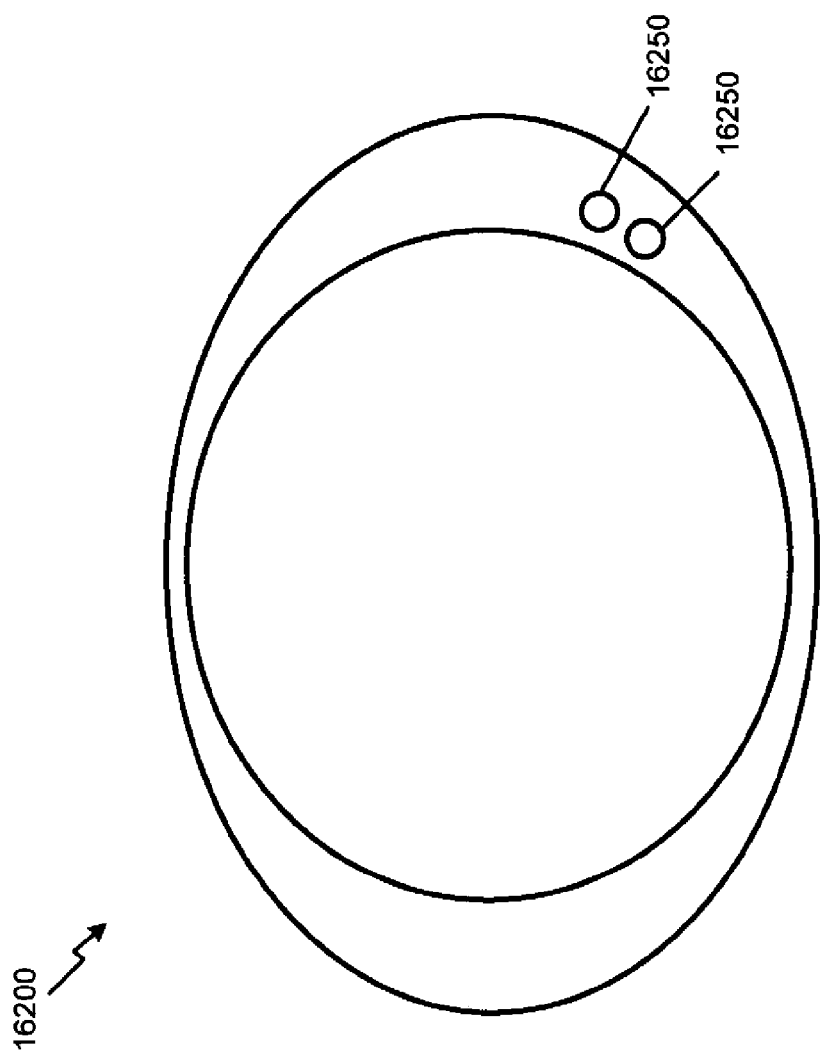

FIG. 17 is an illustration of a perspective view of a connector for the conduit shown in FIG. 16, in accordance with the fifth exemplary embodiment of the present disclosure.

Figure 18:
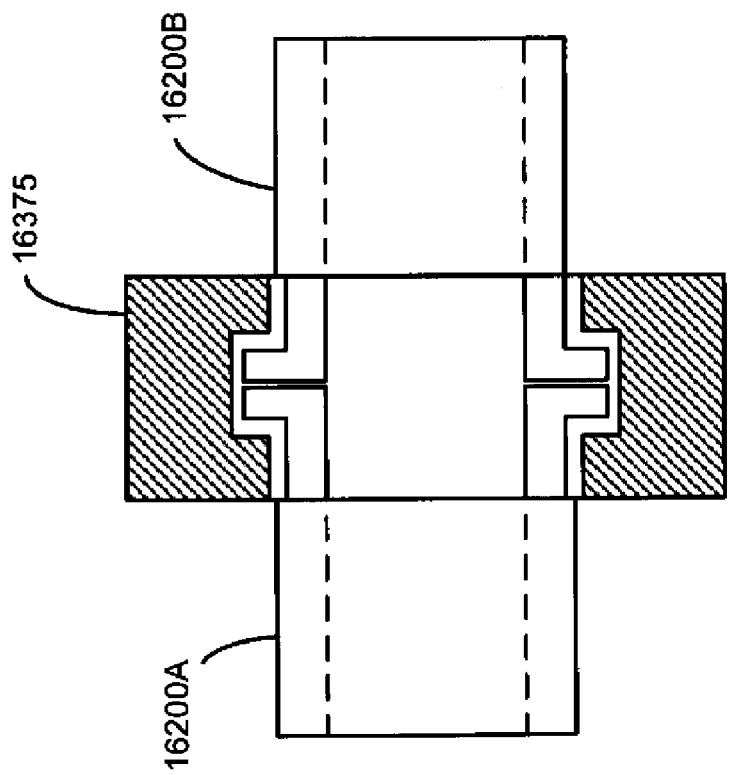

FIG. 18 is an illustration of a cross-sectional side view of two connectors mated with a clamp, in accordance with the fifth exemplary embodiment of the present disclosure.

Figure 19:
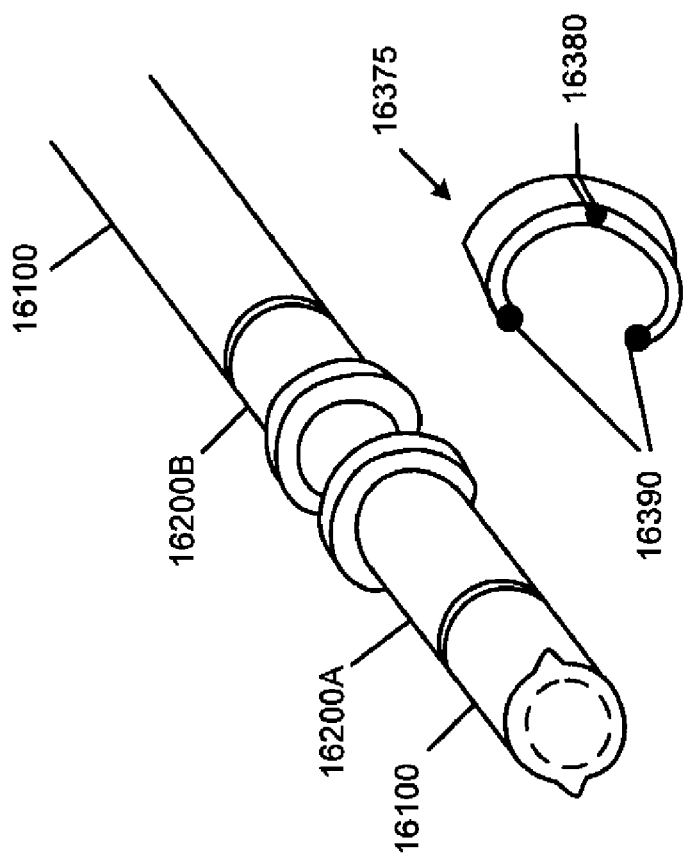

FIG. 19 is an illustration of an exploded perspective view of the mated connectors of FIG. 18, in accordance with the fifth exemplary embodiment of the present disclosure.

Figure 20:
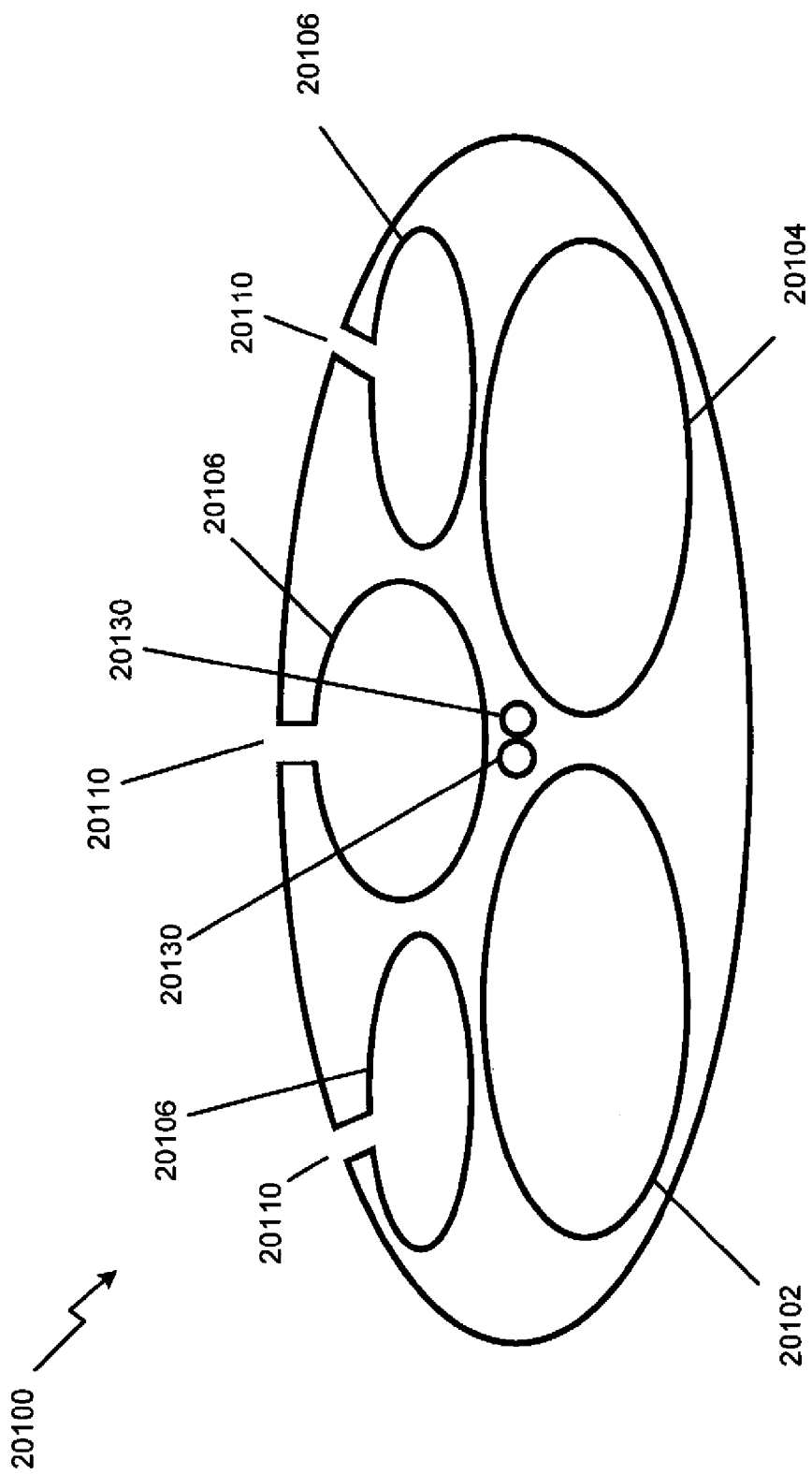

FIG. 20 is an illustration of a cross-section of a spray conduit, in accordance with a sixth exemplary embodiment of the present disclosure.

Figure 21:
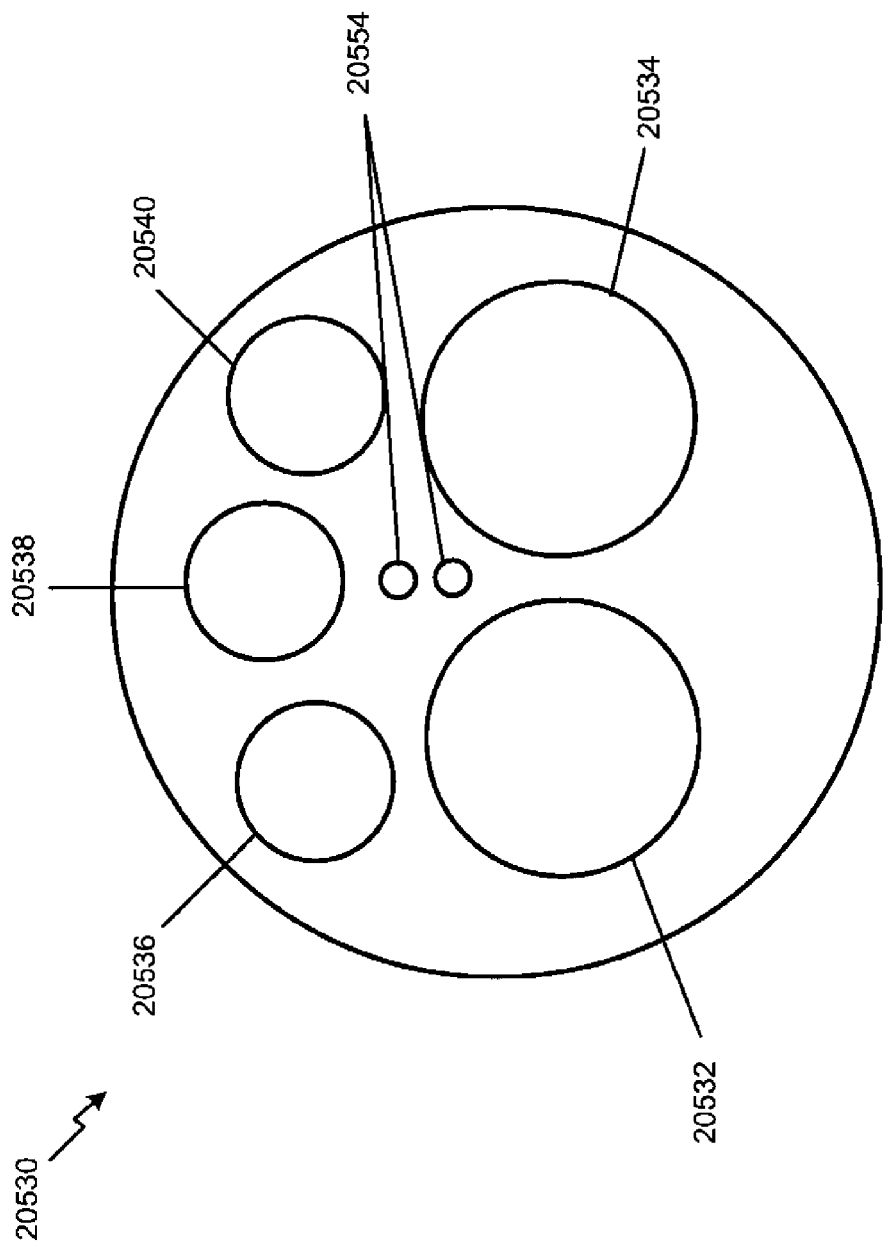

FIG. 21 is an illustration of a perspective view of a connector for the conduit of FIG. 20, in accordance with the sixth exemplary embodiment.

Figure 22:
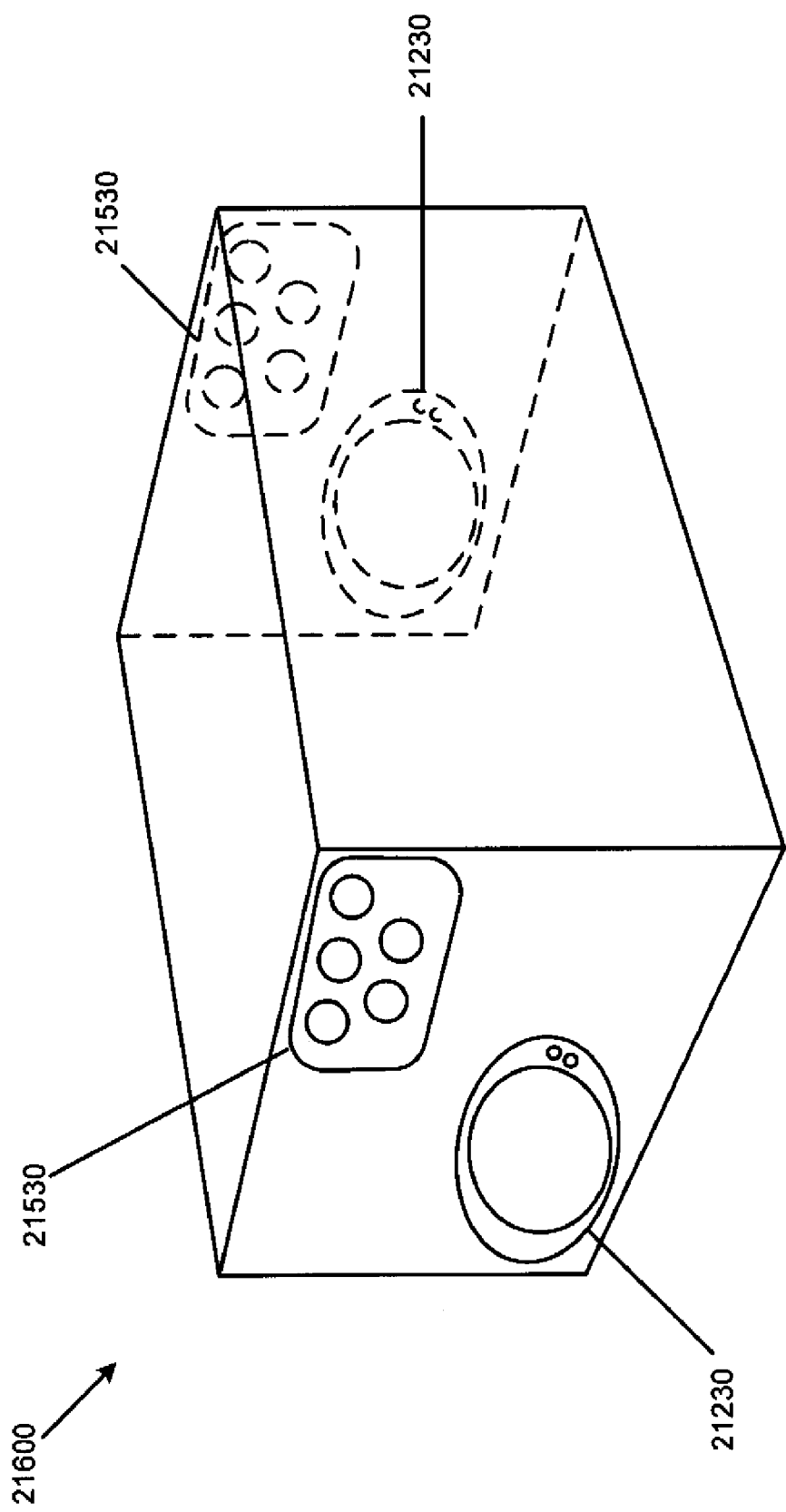

FIG. 22 is an illustration of a perspective view of an adapter for connecting conduits, in accordance with the sixth exemplary embodiment of the present disclosure.

Figure 23:
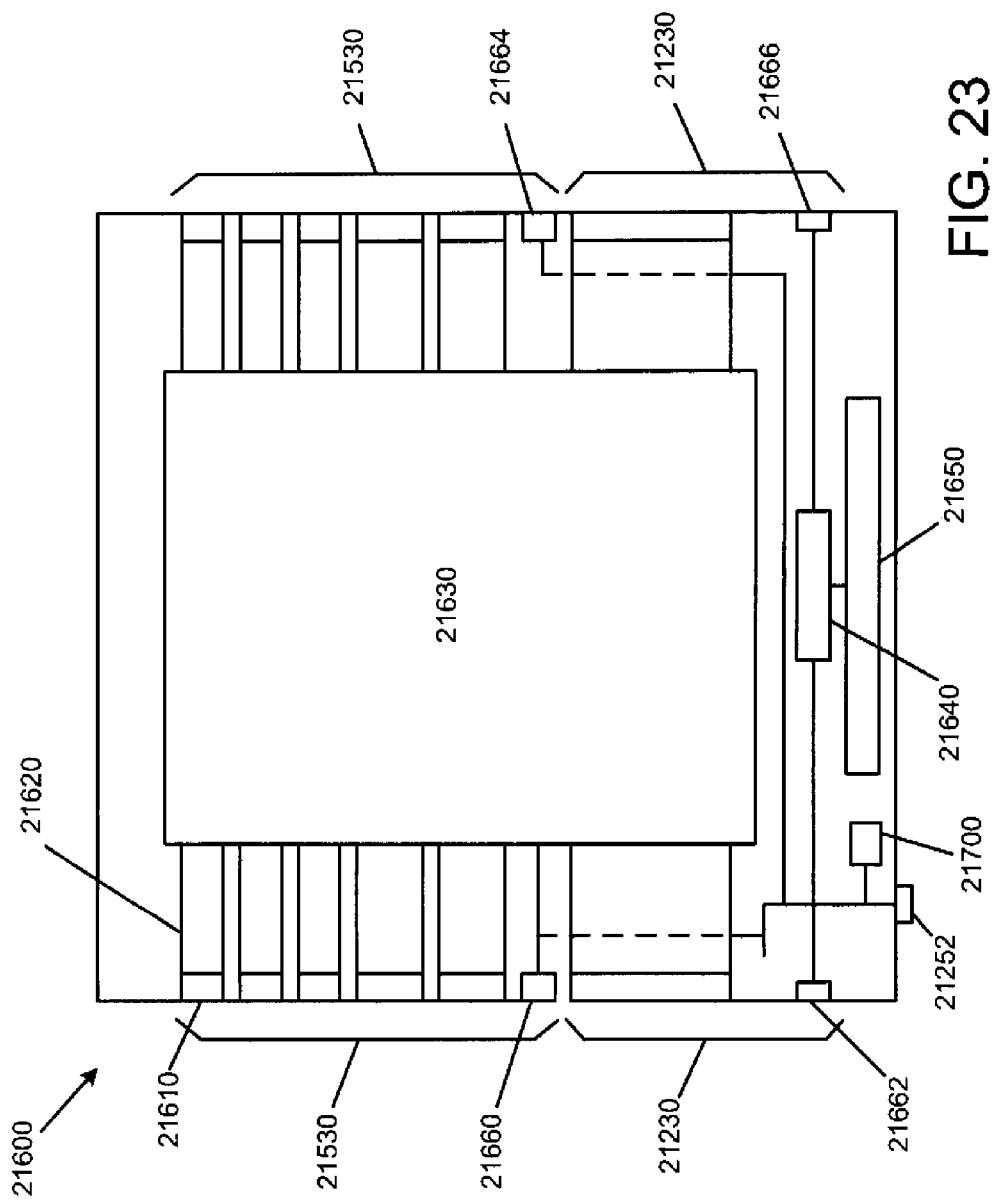

FIG. 23 is an illustration of a cross-sectional view of the adapter shown in FIG. 22, in accordance with the sixth exemplary embodiment of the present disclosure.

Figure 24:
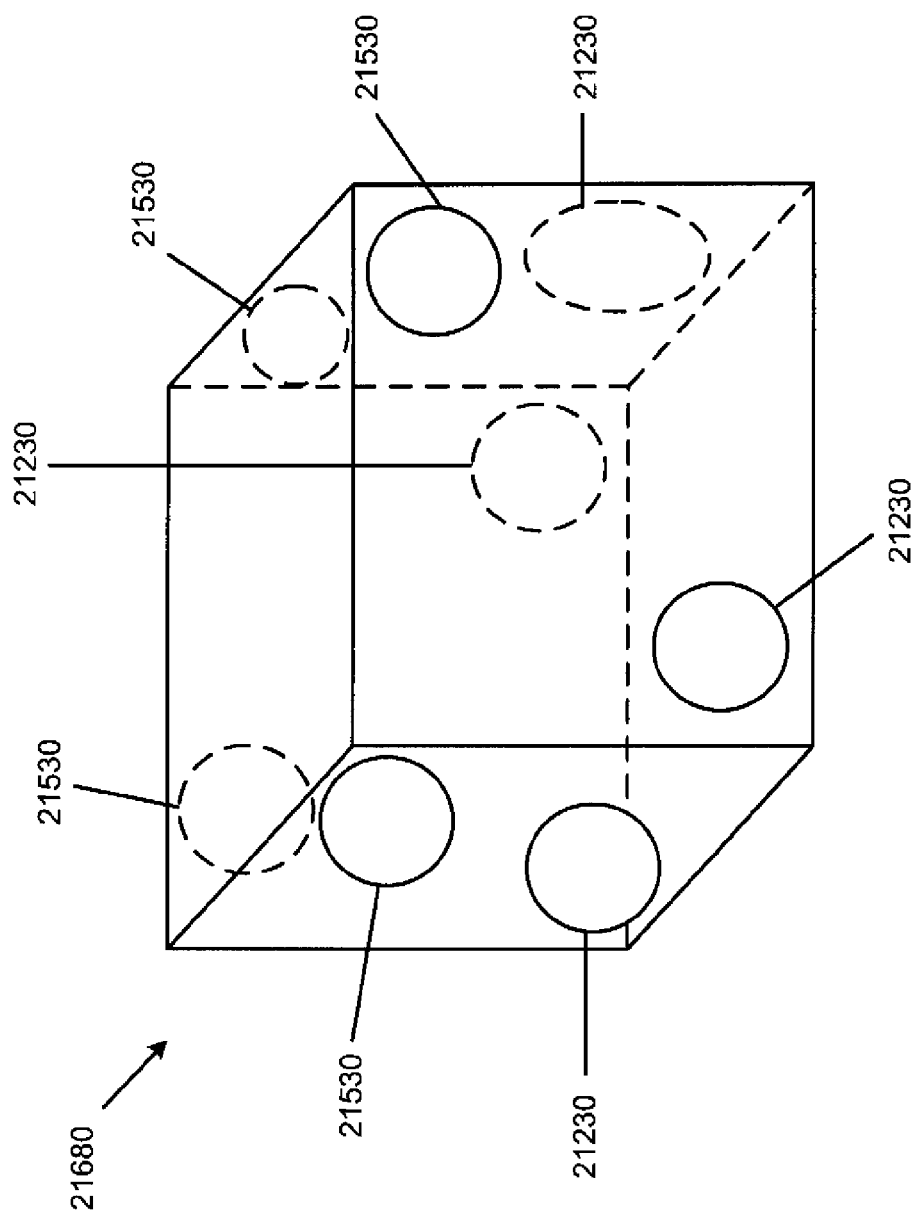

FIG. 24 is an illustration of a perspective view of a multiport adapter for connection to the conduits, in accordance with the sixth exemplary embodiment of the present disclosure.

Figure 25:
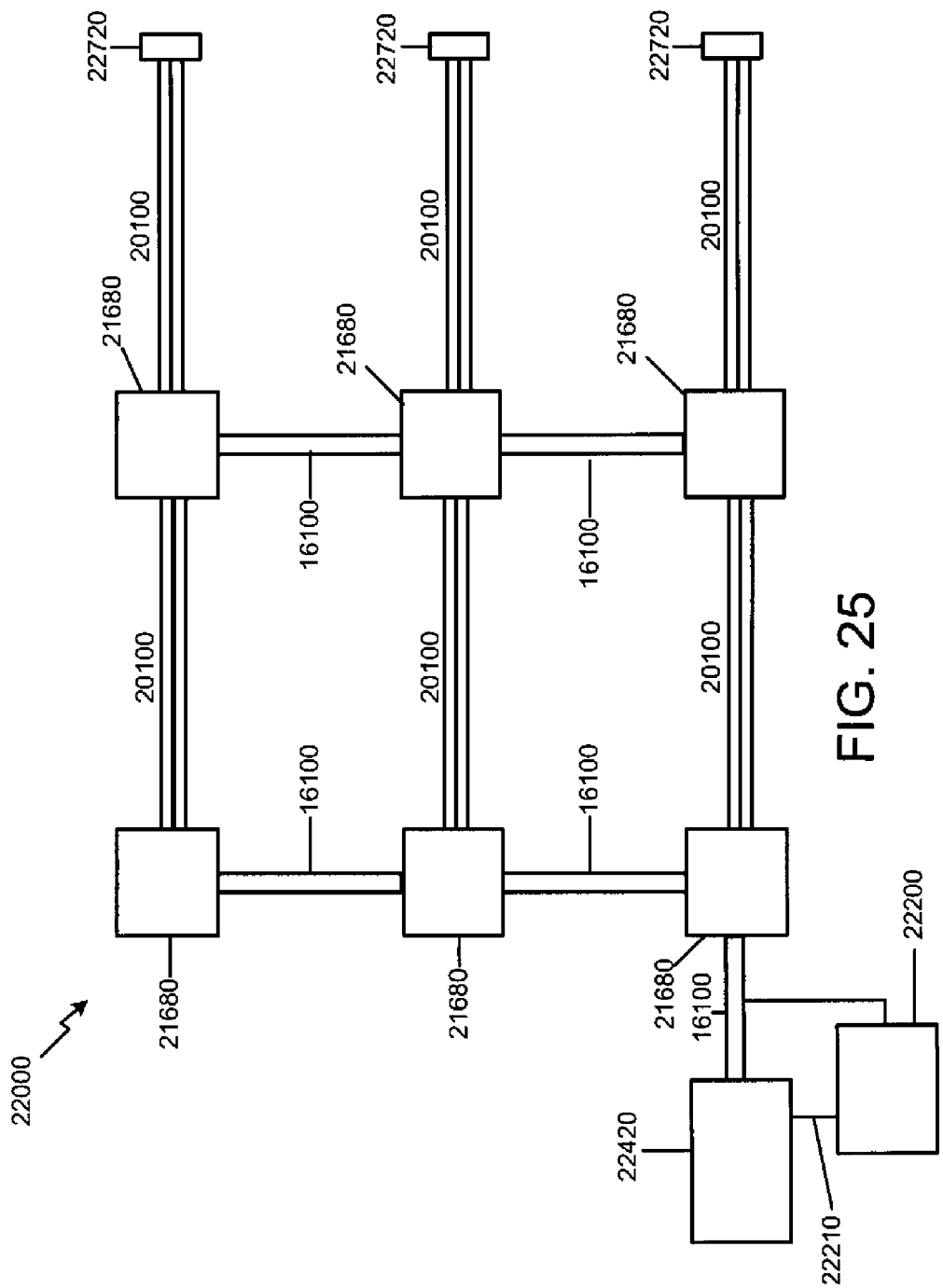

FIG. 25 is an illustration of a fluid distribution arrangement, in accordance with the first exemplary embodiment of sixth present disclosure.

Figure 26:
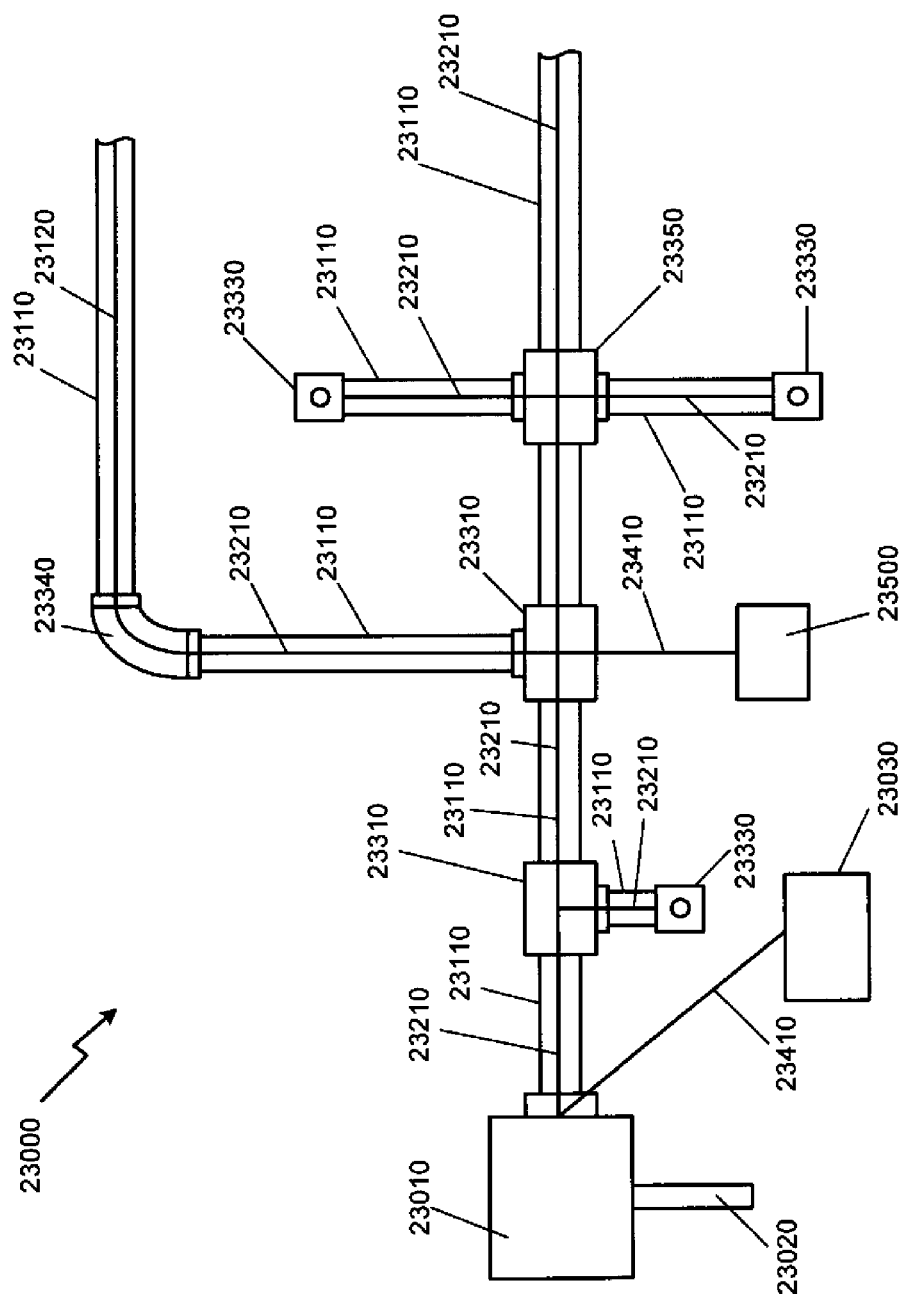

FIG. 26 is a schematic diagram of a two-wire irrigation system, in accordance with the seventh exemplary embodiment of the present disclosure.

Figure 27:
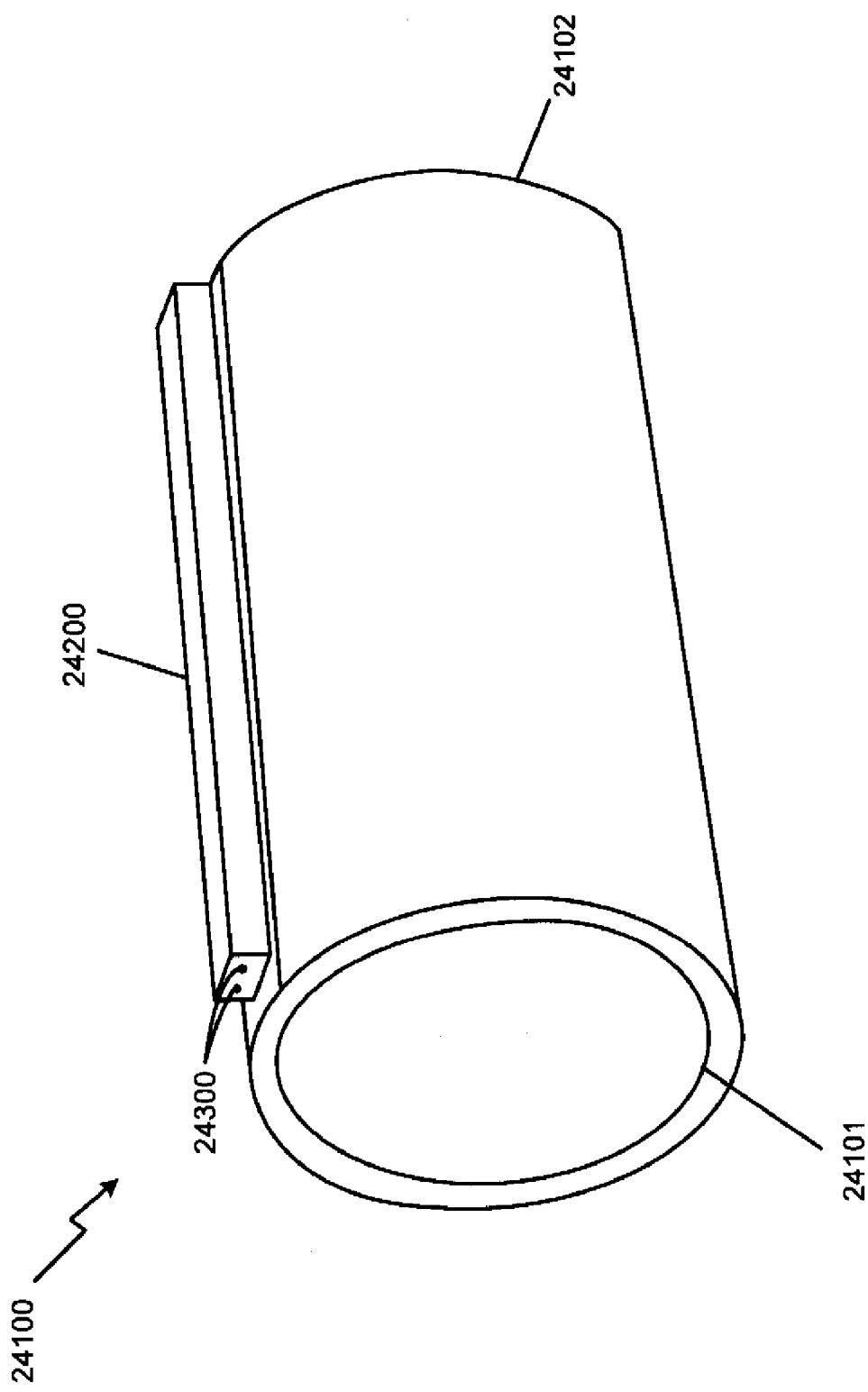

FIG. 27 illustrates a pipe with integral wires, in accordance with an eighth embodiment of the present disclosure.

Figure 27A:
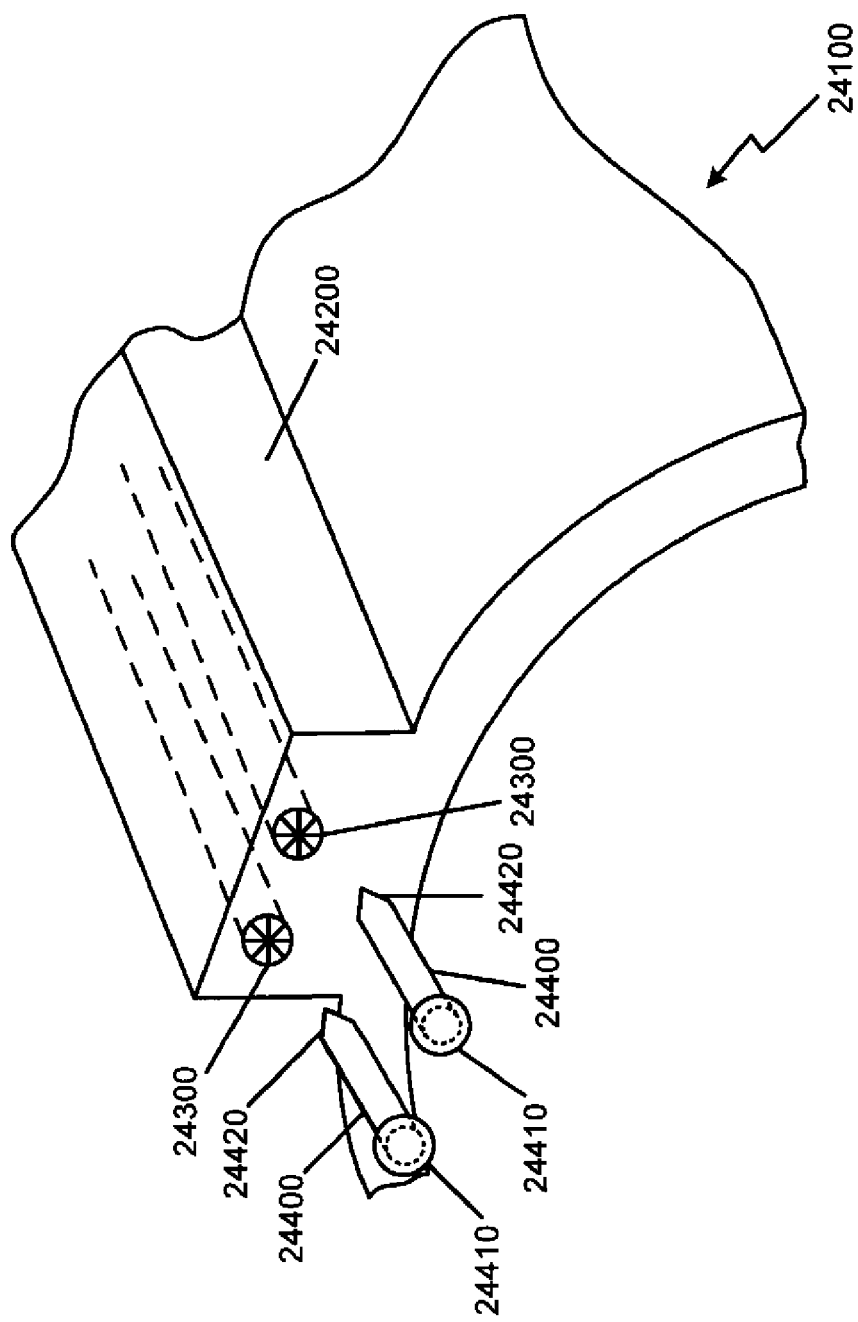

FIG. 27A is an illustration of a conductive device, in accordance with the eighth embodiment of the present disclosure.

Figure 28:
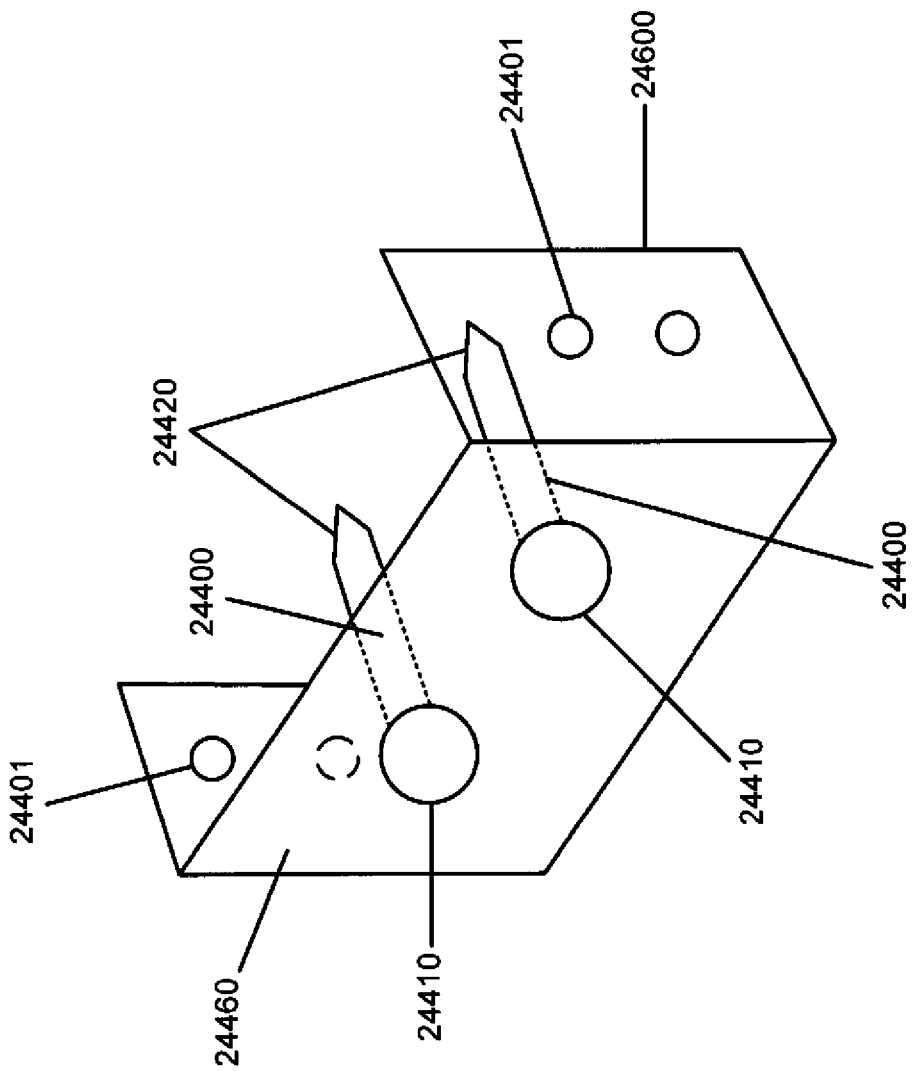

FIG. 28 is a plan view of an end piece for the pipe with integral wires of FIG. 27, in accordance with the eighth exemplary embodiment of the present disclosure.

Figure 28A:
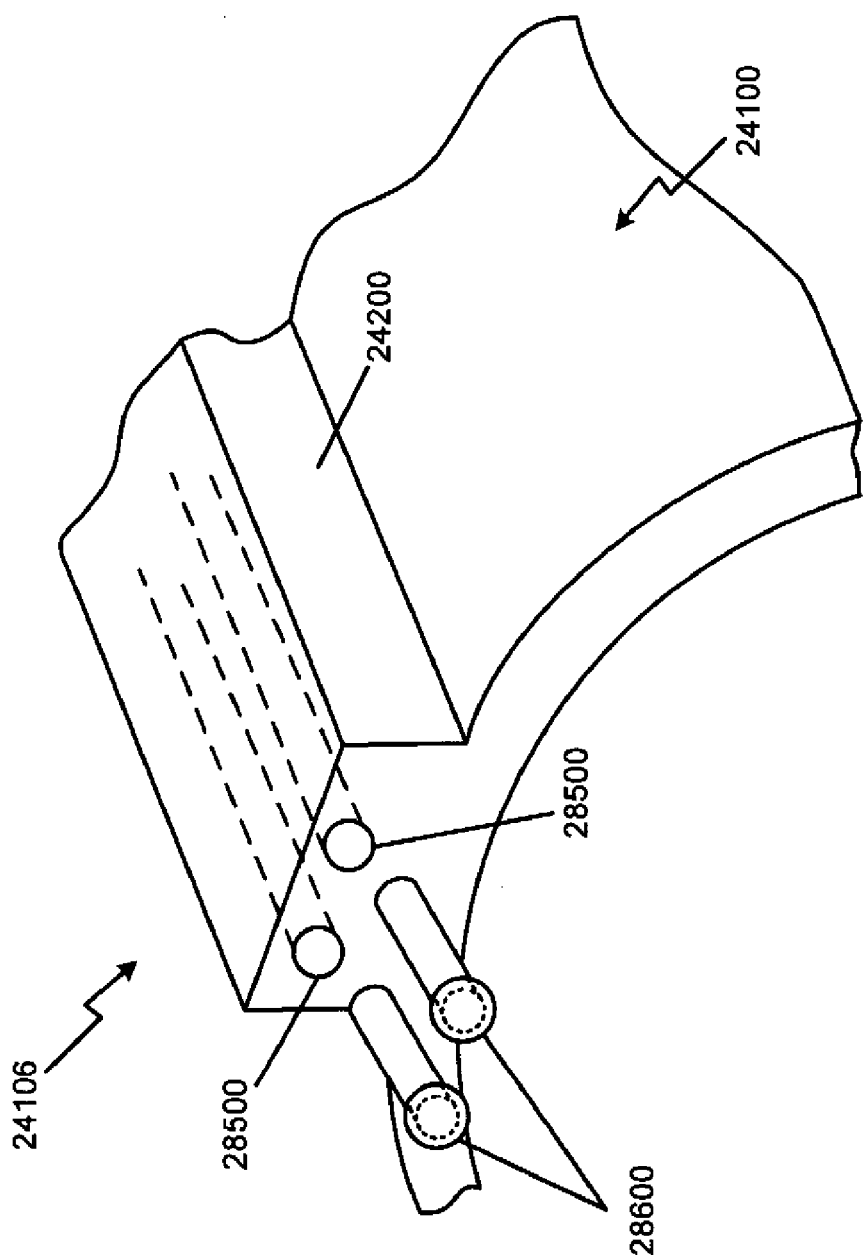

FIG. 28A is an exploded plan view of pair of solid wires embedded in the reserve portion of the pipe, in accordance with the eighth exemplary embodiment of the present disclosure.

Figure 29:
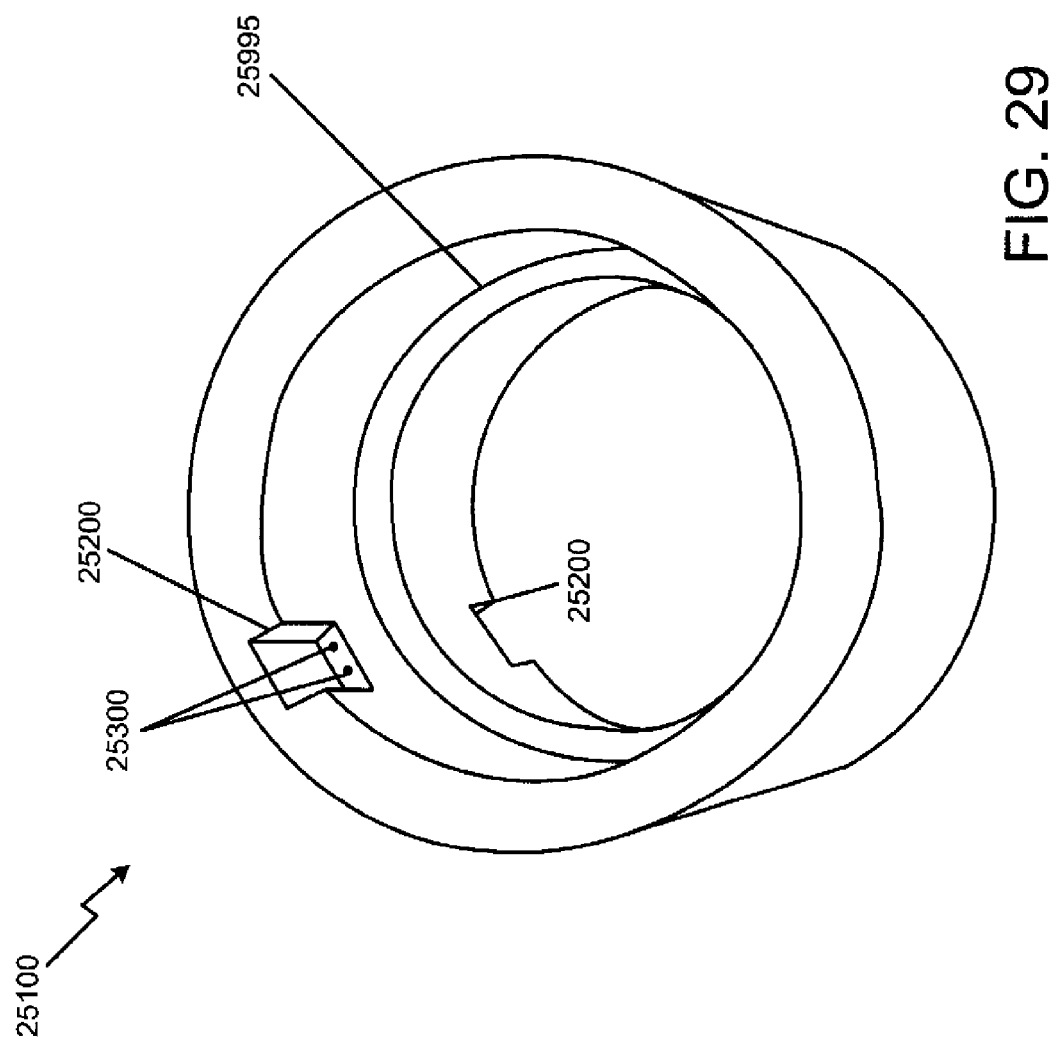

FIG. 29 is a plan view illustration of an adapter, in accordance with the eighth exemplary embodiment of the present disclosure.

Figure 30:
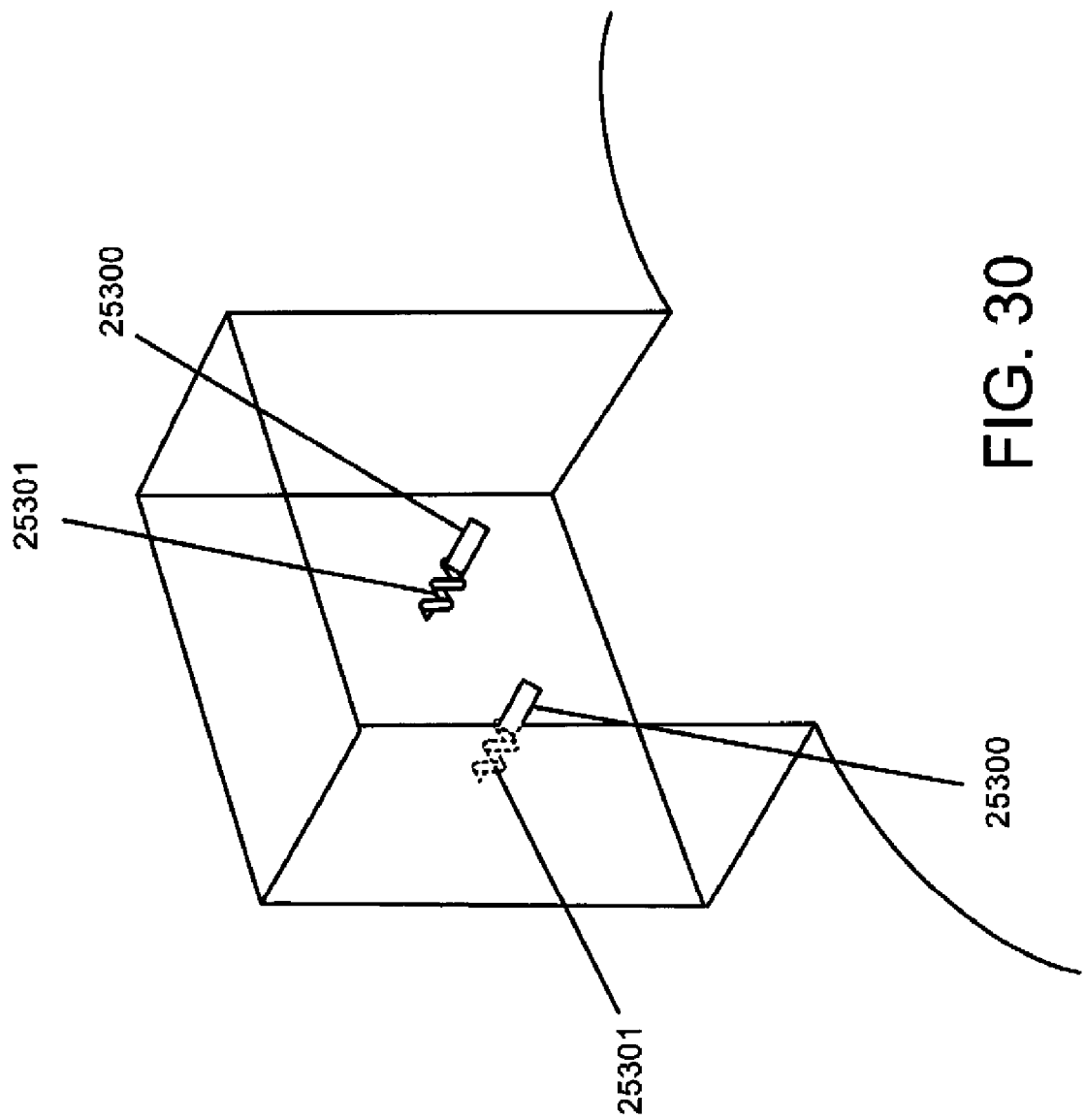

FIG. 30 is an illustration of the pins within the chamber of the adapter, in accordance with the eighth embodiment of the present disclosure.

Figure 31:
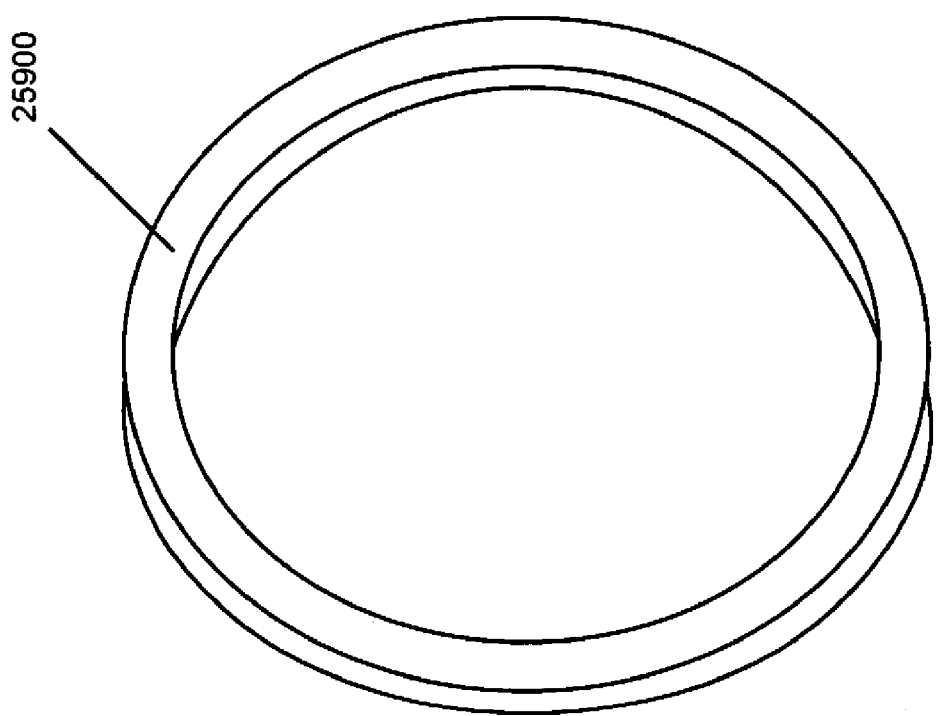

FIG. 31 is a plan view of a gasket for use in the adapter, in accordance with the eighth embodiment of the present disclosure.

Figure 32:
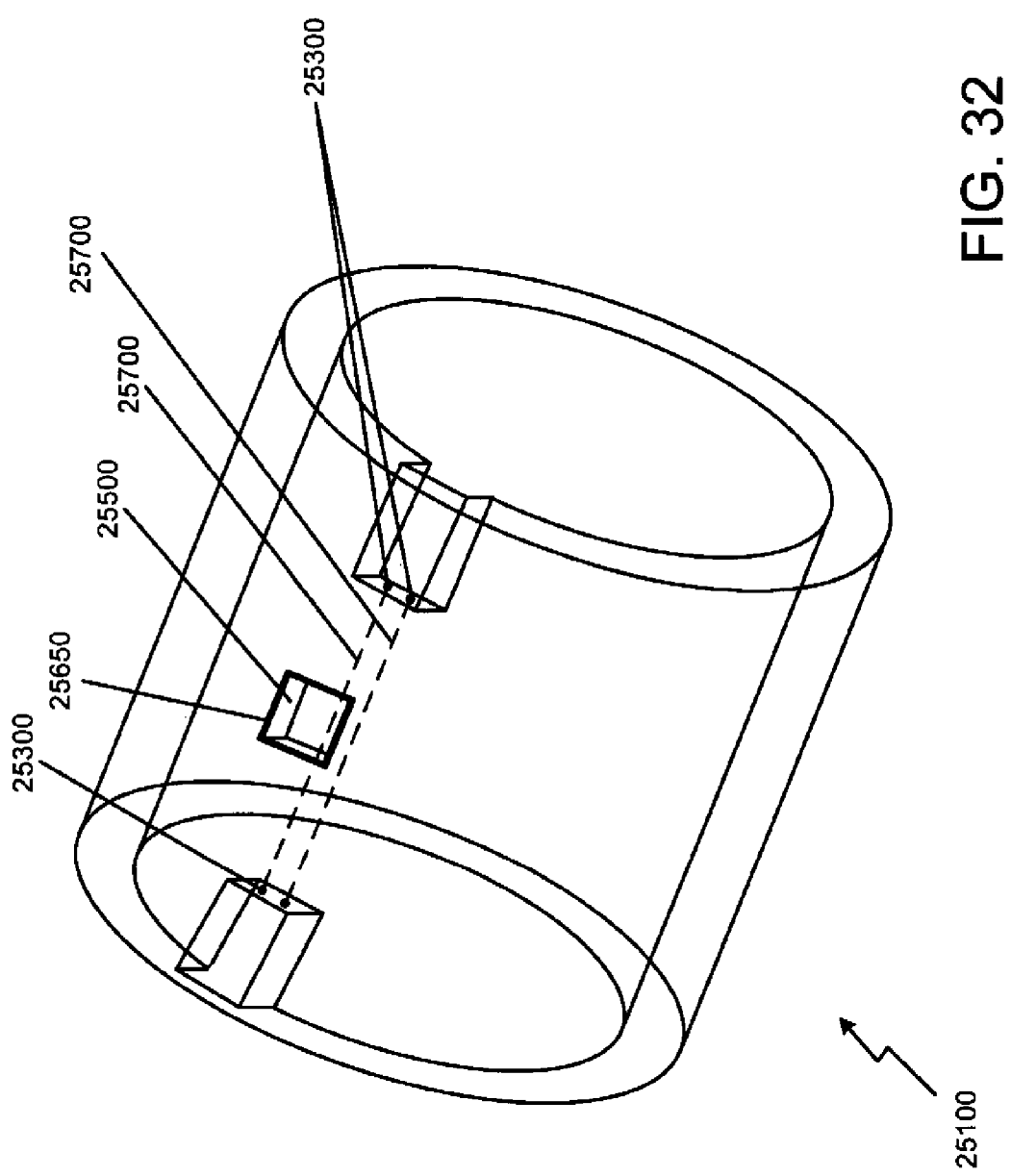

FIG. 32 is an illustration of the adapter having an internal wiring connection, in accordance with the eighth exemplary embodiment of the present disclosure.

Figure 33:
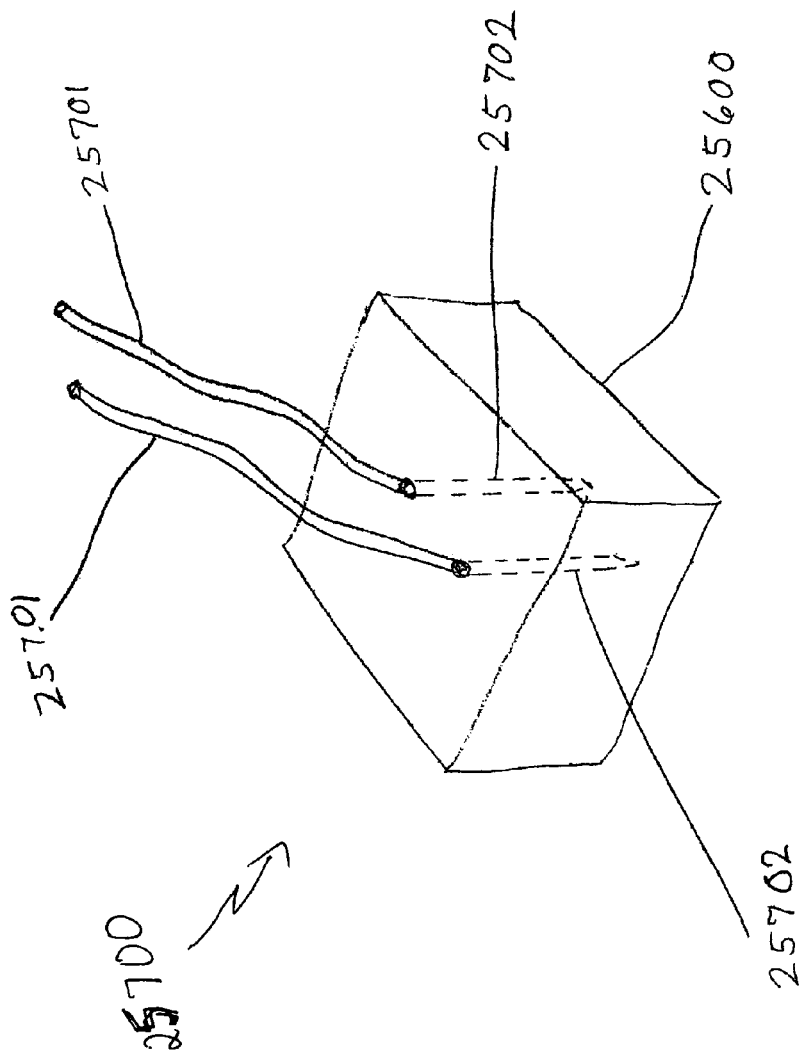

FIG. 33 is an illustration of a monitoring system connection, in accordance with the eighth embodiment of the present disclosure.

Figure 34:
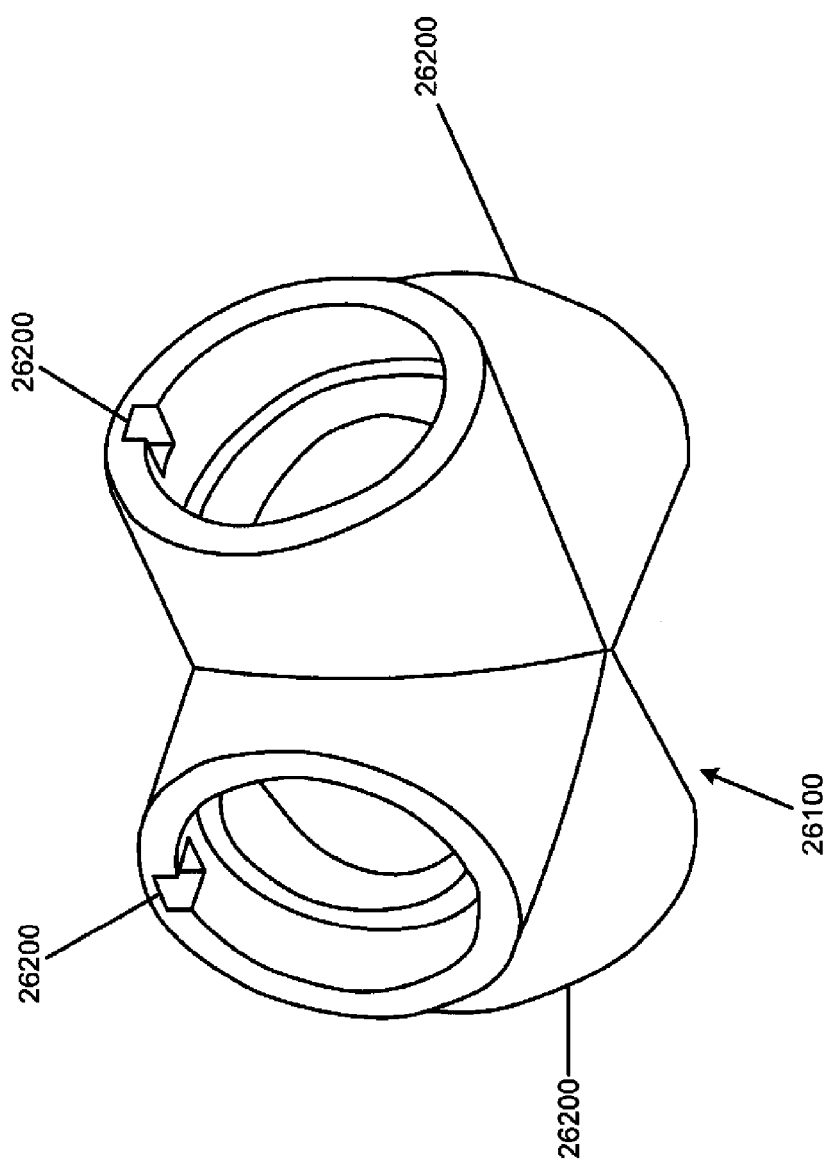

FIG. 34 is an illustration of a cross adapter, in accordance with the eighth exemplary embodiment of the present disclosure.

Figure 35:
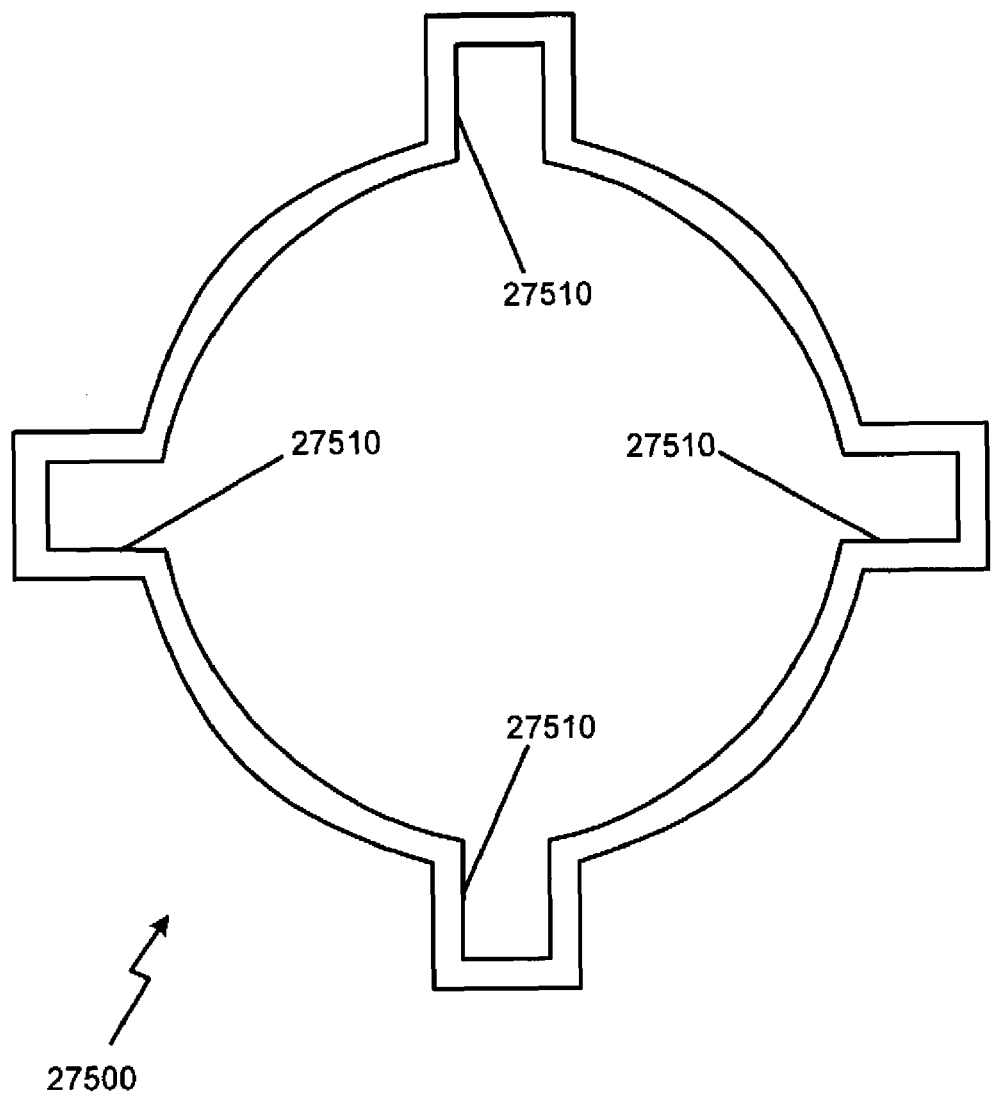

FIG. 35 is a cross-sectional illustration of a multi-chamber adaptor, in accordance with the eighth exemplary embodiment of the present disclosure.

Figure 36:
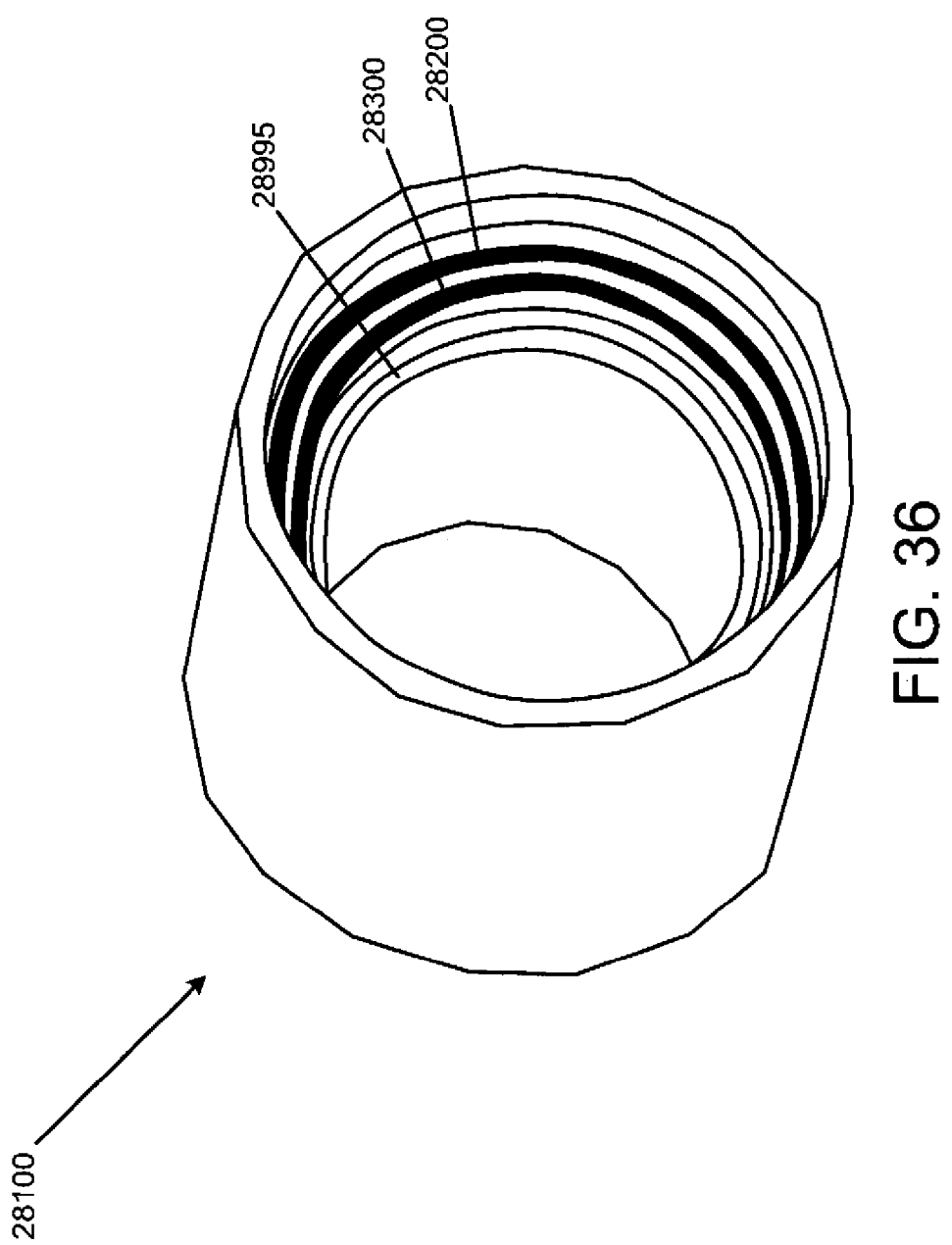

FIG. 36 is an illustration of an adapter, in accordance with a ninth embodiment of the present disclosure.

Figure 37:
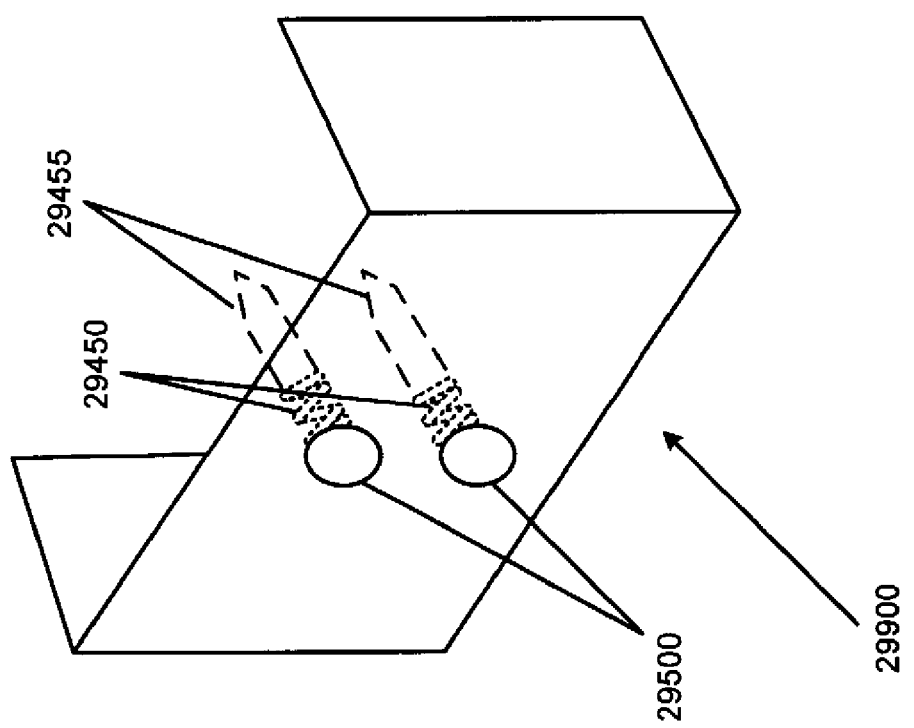

FIG. 37 is an illustration of an end piece, in accordance with the ninth exemplary embodiment of the present disclosure.

FIG. 38 is an illustration of the pipe having a reserve portion, in accordance with the ninth exemplary embodiment of the present disclosure.

FIG. 38A is an illustration of a conductive shield and a wire pair, in accordance with a tenth exemplary embodiment of the present disclosure.

Figure 38B:
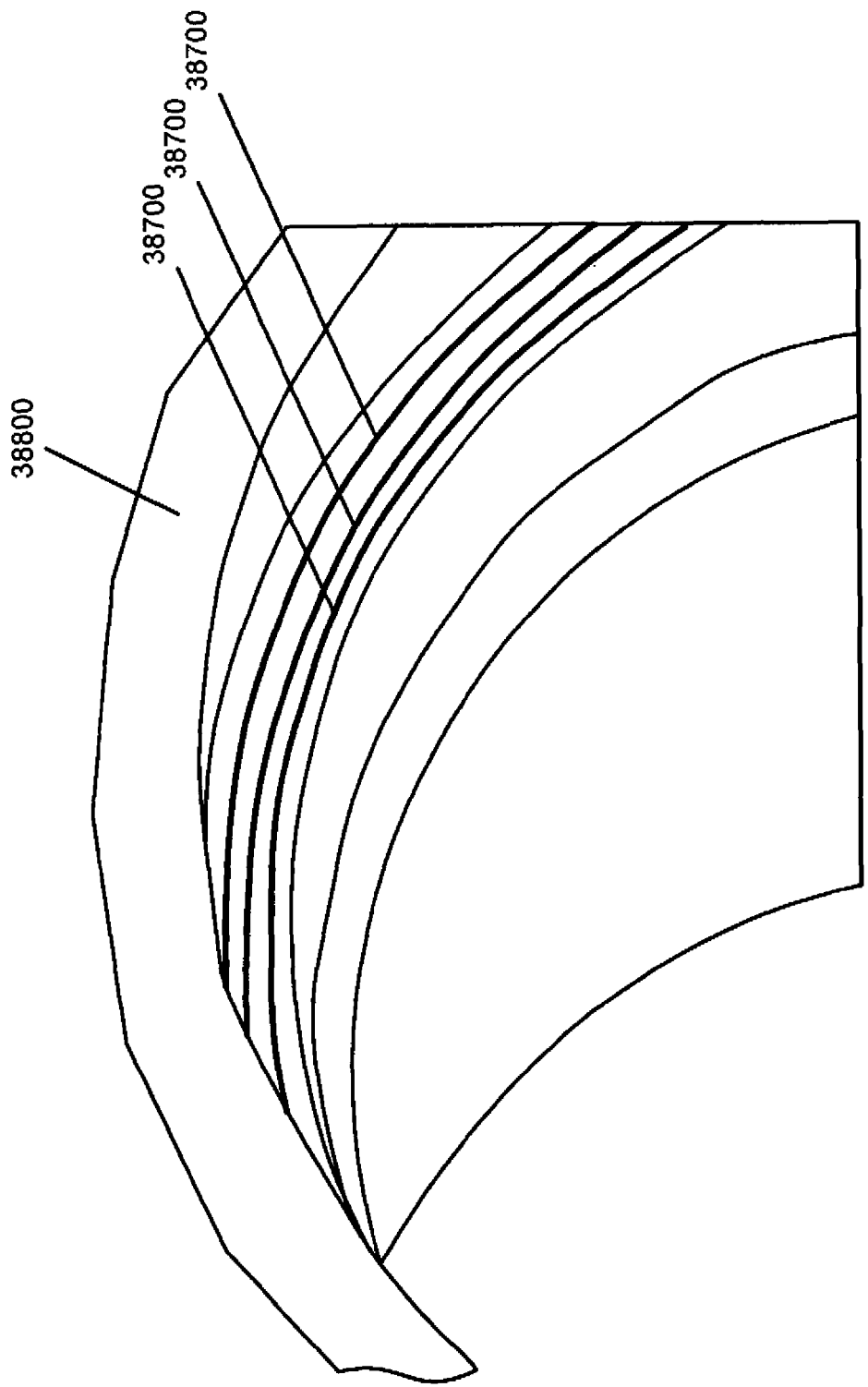

FIG. 38B is an illustration of a coupler having at least two slip rings, in accordance with the tenth exemplary embodiment of the present disclosure.

Figure 38C:
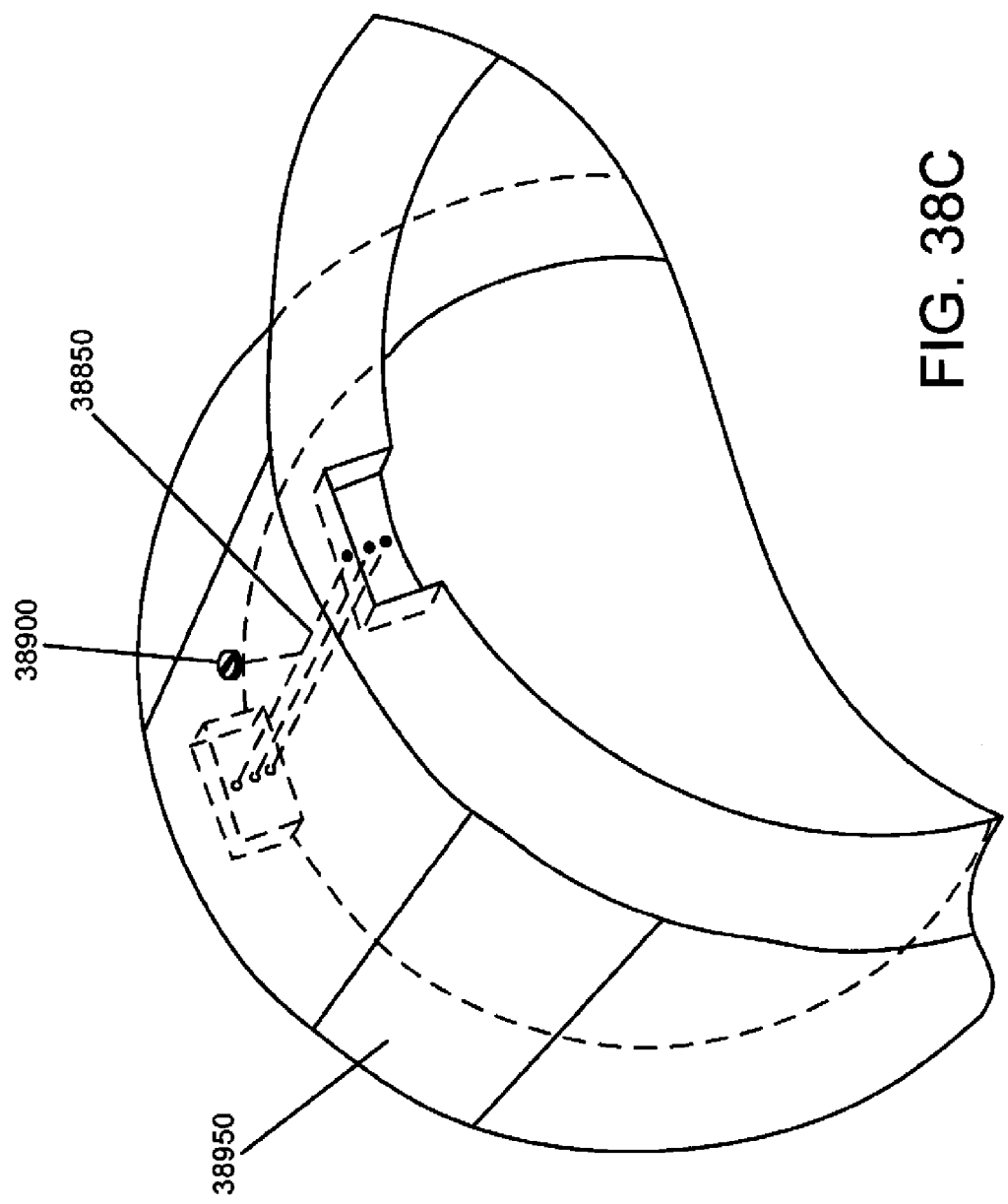

FIG. 38C is an illustration of an adapter having an external connector, in accordance with the tenth exemplary embodiment of the present disclosure.

Figure 39:
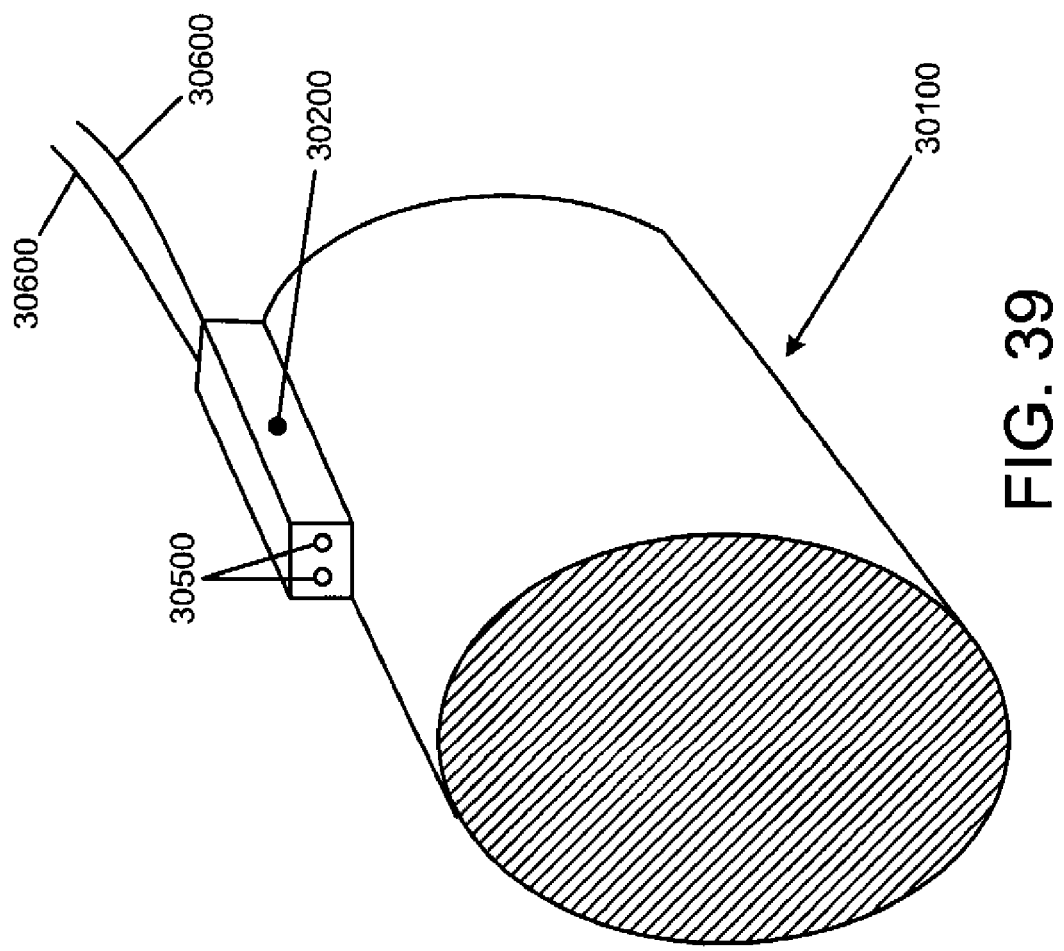

FIG. 39 is an illustration of a solid pipe segment, in accordance with an eleventh exemplary embodiment of the present disclosure.

Figure 40:
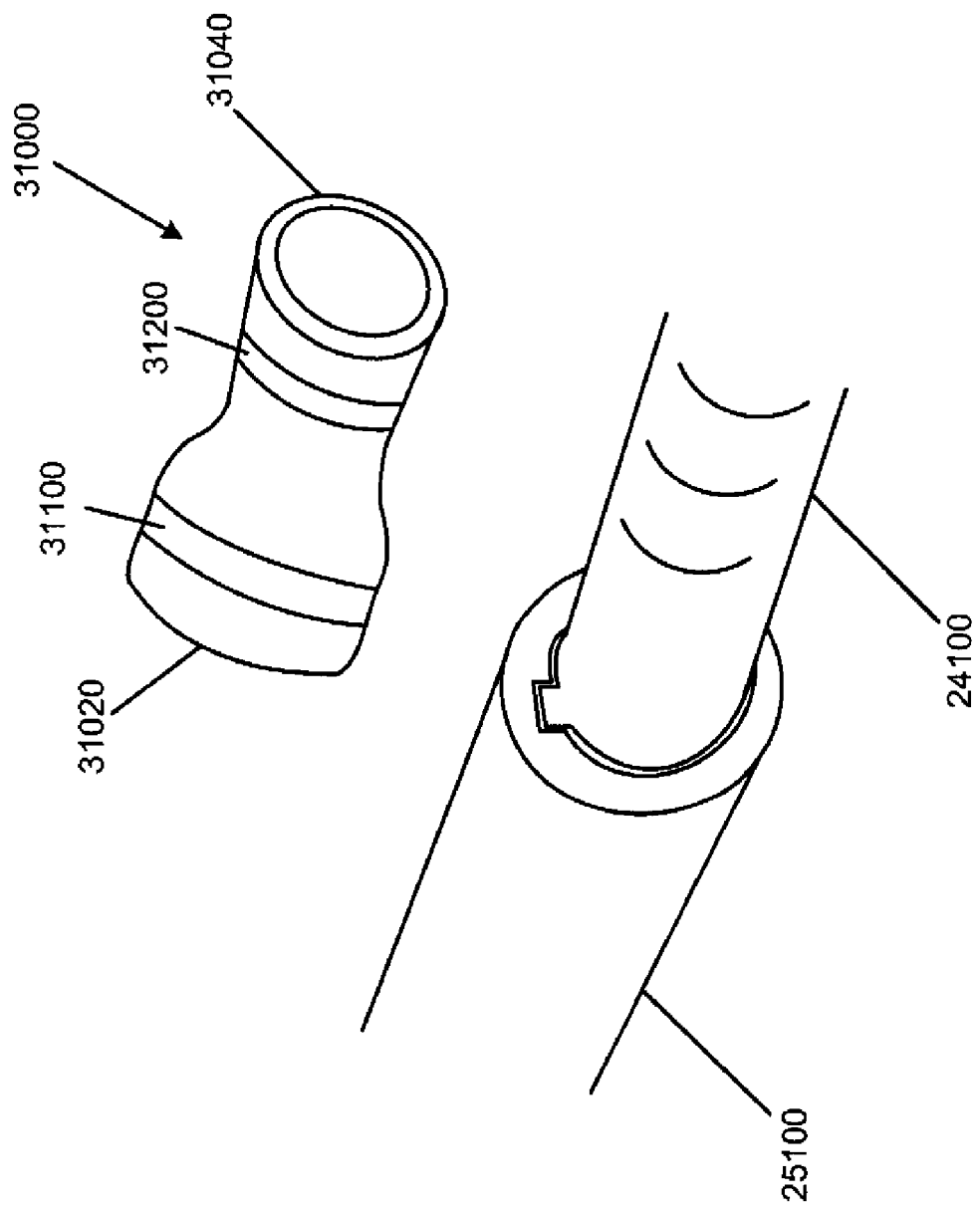

FIG. 40 is an illustration of a waterproof jacket, in accordance with a twelfth embodiment of the present disclosure.

Figure 41:
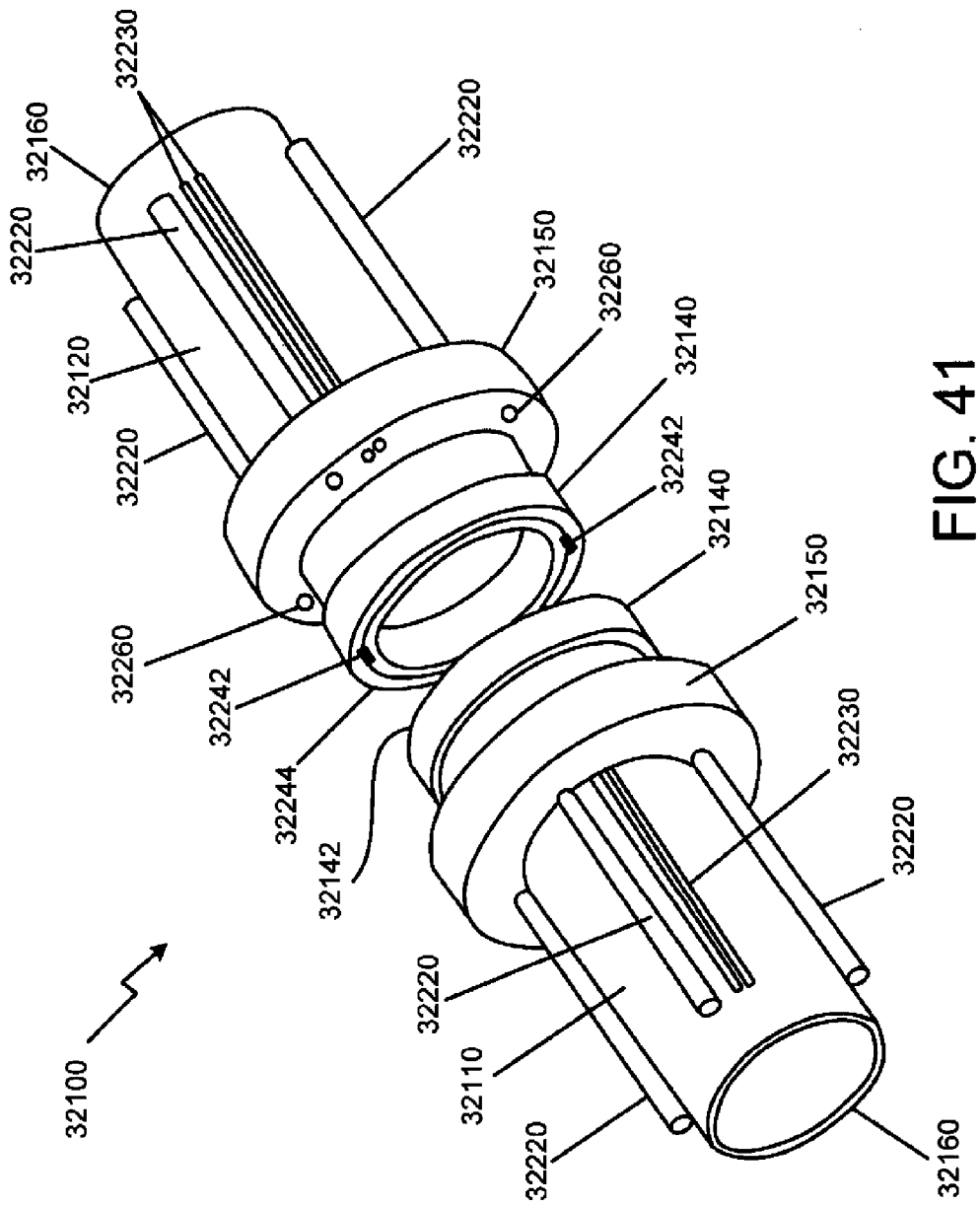

FIG. 41 is a plan view illustration of a coupler assembly, in accordance with a thirteenth embodiment of the present disclosure.

Figure 42:
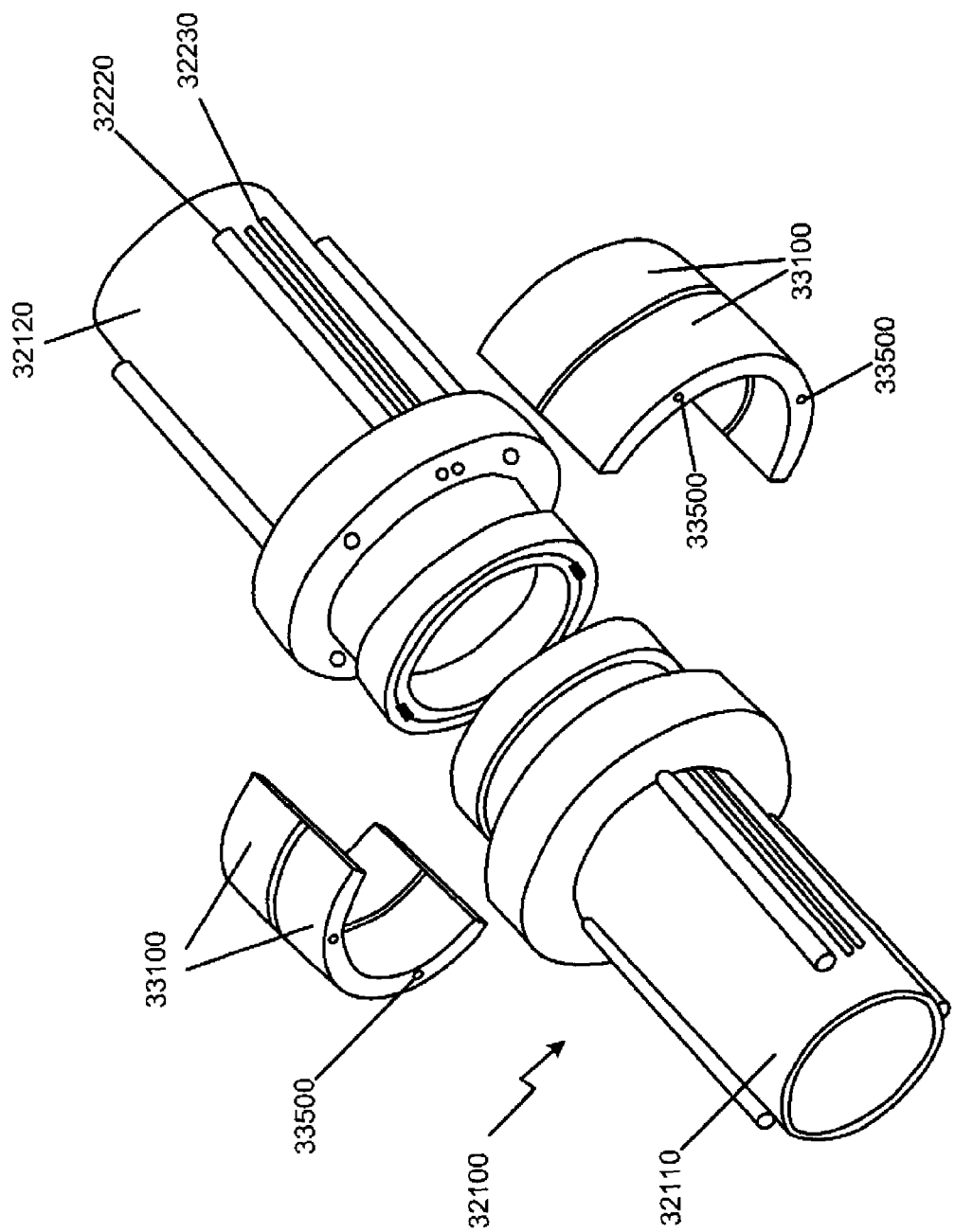

FIG. 42 is an exploded plan view of the coupler assembly with plurality of plates, in accordance with the thirteenth embodiment of the present disclosure.

Figure 43:
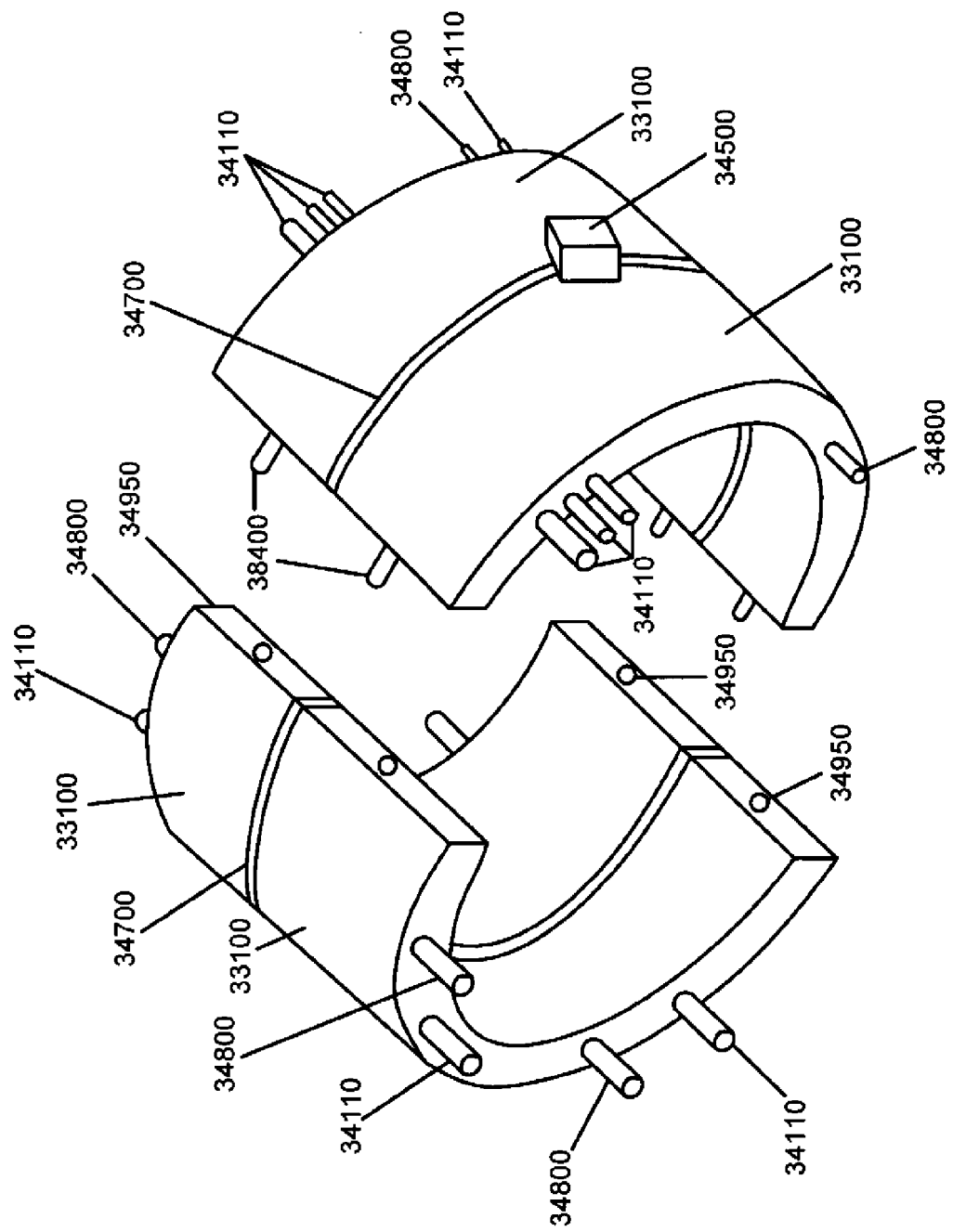

FIG. 43 is an exploded plan view of the plates of the coupler assembly, in accordance with the thirteenth embodiment of the present disclosure.

DETAILED DESCRIPTION

FIG. 1A is an illustration of a cross-section of a conduit, in accordance with a first exemplary embodiment of the present disclosure. FIG. 1A shows a cross section of a conduit, such as a fire hose or a rigid or semi-rigid pipe, combined with insulated electrical power wires 120 and communication wires 130, which will be referred to hereinafter as a wired fluid conduit (wfc) 100. The wired fluid conduit 100 can take the form of a wired fluid hose (wfh) 101 (Shown in FIG. 1B), or a wired pipe 102 (Shown in FIG. 1C), each of which are defined by the material and characteristics of the conduit. FIG. 1A shows a cross-section of the wired fluid hose 101 when it is full of water and in its expanded mode. FIG. 1A also shows a cross-section of the rigid or semi-rigid wired pipe. Three power wires 120 supply three-phase electrical power and a fourth wire supplies a ground wire 125, although single-phase power may be similarly provided. The communication wires 130 may be used to support an Ethernet type of data network and/or provide a low voltage system. The wires 120, 125, 130 may be located between an inner conduit surface 110 and an outer conduit surface 140.

FIG. 1B is an illustration of a cross-section of a conduit 101, in accordance with a second exemplary embodiment of the conduit shown in FIG. 1A. FIG. 1B shows a cross-section of a length of wired fluid hose 101 when the wired fluid hose 101 is not under pressure and is able to assume a more flat shape suitable for storage.

FIG. 1C is an illustration of a cross-section of a conduit, in accordance with a third exemplary embodiment of the conduit shown in FIG. 1A. FIG. 1C shows one of many possible alternate configurations of the wired fluid conduit 100. A maximum temperature tolerated by the insulation on the insulated electrical power wires limits the amount of current carried by insulated electrical power wires. In FIG. 1C, the power conductors 160 and ground conductor 170, are shown to be four separate flexible, flat stranded conductors that are covered with insulation 165, 175 and are located between an outer boundary 185 and an inner boundary 180 of the wired fluid conduit 100. The wired fluid conduit 100 is constructed such that the fluid flowing through the wired fluid conduit 100 will cool the insulated electrical power. The cooling allows the insulated electrical power conductors 160 to carry more current without thermally damaging the insulation. The ground conductor 170 may be smaller than the three power conductors 160, as is common practice in power distribution, because less current flows through the ground conductor 170 in a three phase electrical system than through the other three power conductors 160.

Figure 1D:
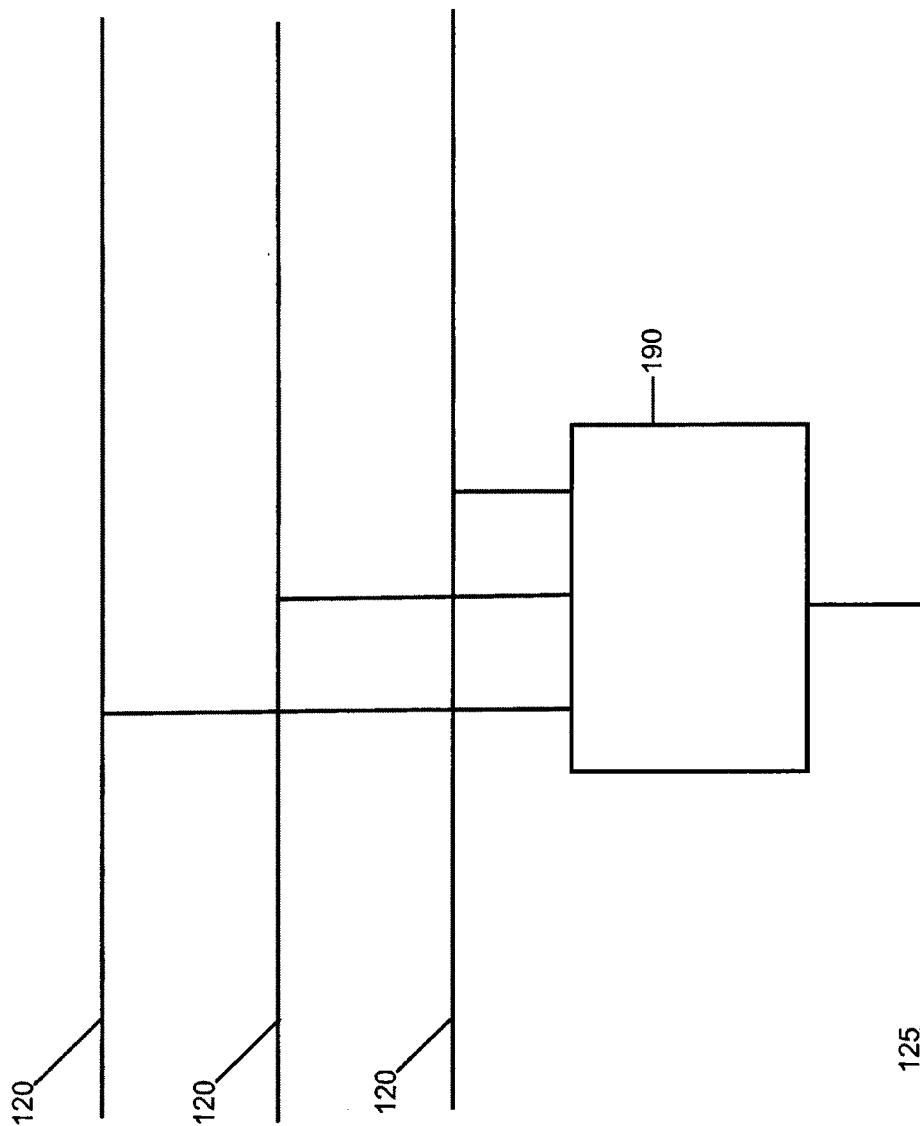
FIG. 1D is a schematic illustration of a ground fault interrupter for use with the conduit shown in FIG. 1A, in accordance with the first exemplary embodiment of the present disclosure.

FIG. 1D is a schematic illustration of a ground fault interrupter for use with the conduit shown in FIG. 1A, in accordance with the first exemplary embodiment of the present disclosure. In FIG. 1D, a Ground Fault Interrupter (GFI) 190 may be connected to the power conductors 160 (FIG. 1C) and to the ground conductor 170 (FIG. 1C) to prevent accidental shocks from the voltage on the wires. The use of GFI's is well known in the art.

FIG. 2A is a perspective illustration of the conduit 101 of FIG. 1B on a storage reel 220, in accordance with the first exemplary embodiment of the present disclosure. FIG. 2A shows a length of wired fluid hose 101 on a storage reel 220. The storage reel 220 can be placed on an off road vehicle so that the wired fluid hose 101 can be deployed to fight a wildfire. A wfc connector 230 (as shown in FIG. 2B) is attached to an end of the wired fluid hose 101. The wfc connector 230 is kept fixed at the beginning of a wired fluid hose 101 run. A vehicle carries the reel 220 and the wired fluid hose 101 is deployed onto the ground from the storage reel 220. Trucks with long cargo areas can deploy lengths of wired pipe 102 (FIG. 1C).

FIG. 2B is an illustration of a perspective view of a wfc connector 230 for the conduit 100 of FIG. 1A, in accordance with the first exemplary embodiment of the present disclosure. FIG. 2B shows a perspective view of the wfc connector 230 that attaches to both ends of a length of wired fire conduit 100. The wfc connector 230 may include a plurality of power pins 240 and a ground pin 245, and at least one communication pin 250 that attach to the corresponding conductors 160, 170, and communication wires 130 in the wired fluid conduit 100. The wfc connectors 230 may be designed to connect to the corresponding pins in a mating connector on an end of another length of wired fluid conduit 100. The communication wires 130 may be attached to a network connector 252 (shown in FIG. 4) that enables attachment of external networking capable devices to the network.

Figure 3B:
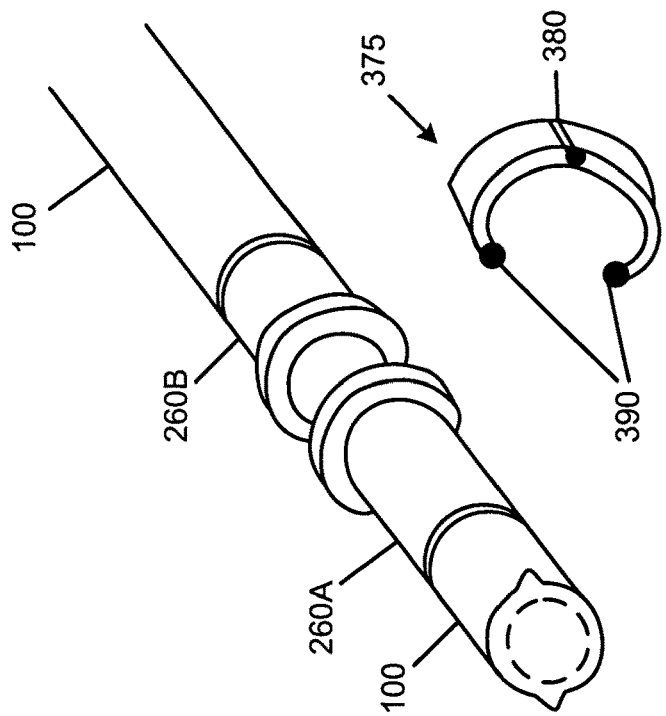
FIG. 3B is an illustration of an exploded view of the mated connectors of FIG. 3A, in accordance with the first exemplary embodiment of the present disclosure.
Figure 3A:
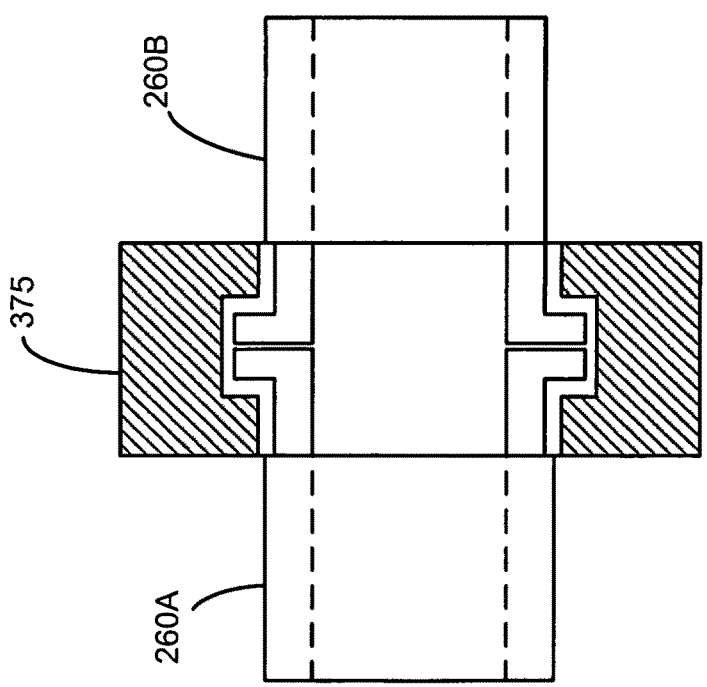
FIG. 3A is an illustration of a cross-sectional side view of two conduit connectors mated with a clamp, in accordance with the first exemplary embodiment of the present disclosure.

FIG. 3A is an illustration of a cross-sectional side view of two conduit connectors mated with a clamp, in accordance with the first exemplary embodiment of the present disclosure. FIG. 3A shows a side view of a first wfc connector 260A being urged to mate to a second wfc connector 260B via a wfc connector clamp 375.

FIG. 3B is an illustration of an exploded view of the mated connectors of FIG. 3A, in accordance with the first exemplary embodiment of the present disclosure. FIG. 3B shows a perspective view of the wfc connector 260A being urged to mate with the wfc connector 260B via the wfc connector clamp 375, as shown in FIG. 3A. Clamp 375 has a hinge 380 and a lock 390 which allows it to at least temporarily clamp together the two wfc connectors 260A, 260B. This connector technique is well known to those having ordinary skill in the art.

Figure 4:
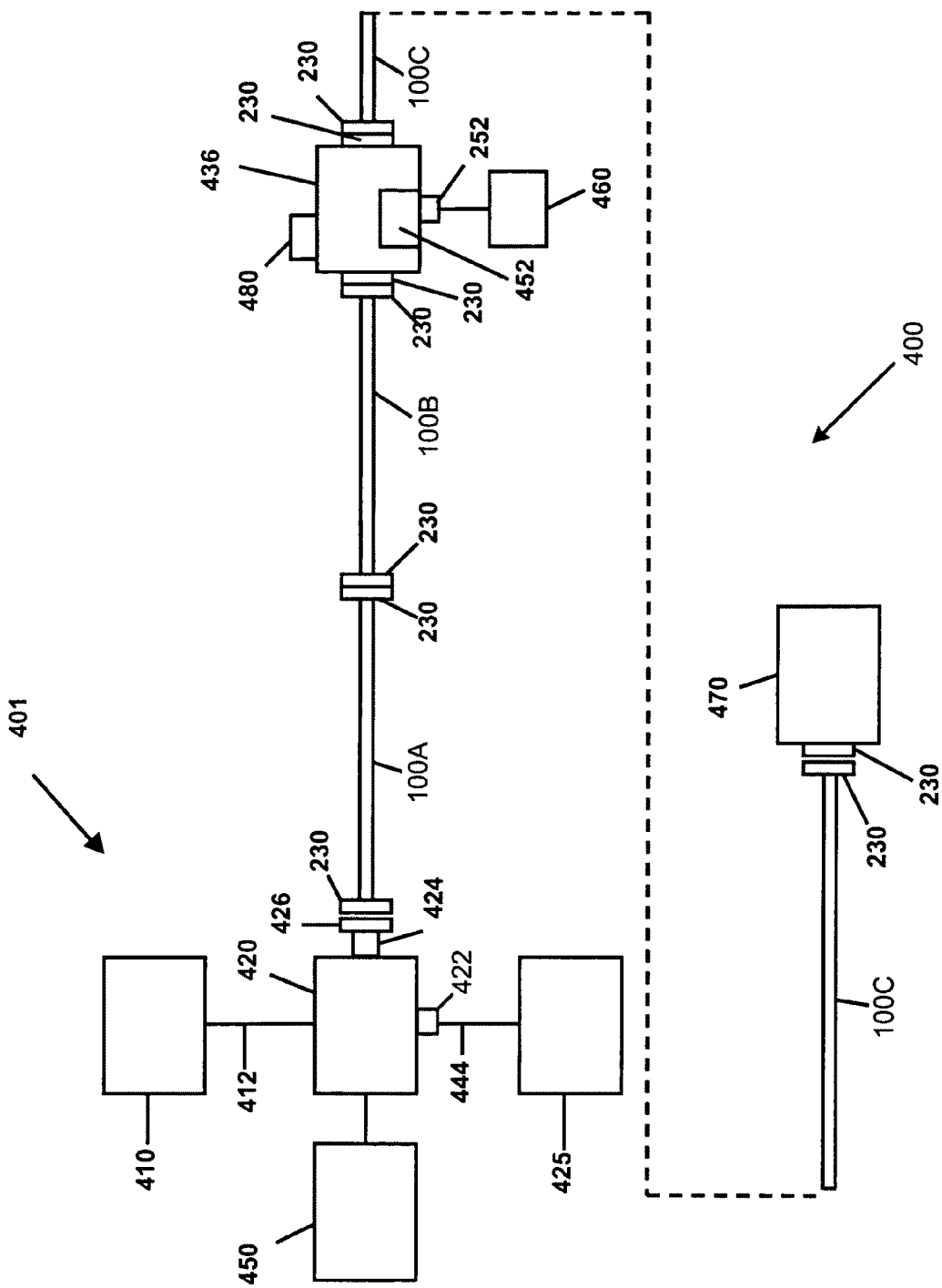
FIG. 4 is an illustration of a pipeline of the conduit shown in FIG. 1A, in accordance with the first exemplary embodiment of the present disclosure.

FIG. 4 is an illustration of a pipeline 400 of the conduit shown in FIG. 1A, in accordance with the first exemplary embodiment of the present disclosure. FIG. 4 shows a base unit 401. The base unit 401 includes an electric power source 410 that supplies electric power via a wire 412 to an electric base pump 420. The electric base pump 420 draws water from a water supply 425 and pumps the water into a first wired fire conduit 100A which further connects to a second wired fire conduit wired fluid conduit 100B via at least one wfc connector 230. The second wired fire conduit 100B further connects to an electric booster pump 436 via at least one wfc connector 230. The electric booster pump 436 may have a connector on each end that is compatible with a wfc connector 230. The electric booster pump 436 is further connected to a third wired fluid conduit 100C via at least one wfc connector 230. The electric booster pump 436 continues the power and communication paths between the two adjacent wired fluid conduits 100.

The electric booster pump 436 may contain a network device 452 that enables the data network to monitor and control the motors and apparatus in the electric booster pump 436. The vehicles that carry the reels 220 may carry the electric booster pumps 436.

An arrangement of one or more lengths of wired fluid conduit 100 that have a base unit 401 and one or more electric booster pumps 436 is hereinafter called a pipeline 400. The electric booster pump 436 may have an auxiliary power connector, auxcon 480, which allows electric power to be added to the wired fluid hose 101 portion of a pipeline 400 from additional power sources 480 that are located at locations other than the beginning of the pipeline 400 where the first base pump 420 is located. The technique of adding an additional power source 480 within a generic power system is well known in the art.

The electric base pump 420 differs from the electric booster pump 436. Pump input 422 of electric base pump 420 may attach to a conventional fire hose 444, which draws water from water supply 425. No electrical wires are associated with the conventional fire hose 444. The input of base pump 420 has hose connections that are compatible with the industry standards that are well known in the industry.

A preinstalled pipeline 400 using mostly large diameter wired pipe 102 can be installed alongside roads and highways and can be pre-charged with water. This pipeline can be the water supply 425. The electric base pump 420 may further have a conventional data network connection to a network computer 450. The base pump 420 may further have industry standard electrical connections to the power source 410. The pump output 424 may have a connector 426 that is mateable with the wfc connector 230.

An Ethernet type of data network operates on the communication wires 130. In a pipeline 400 arrangement, there can be many electric booster pumps 436 that are connected to wired fluid conduits 100. The data network enables the network computer 450 to communicate with each electric booster pump 436 network device 452 that is located in each electric booster pump 436. The data network may be used to remotely measure and control each of the individual parameters of each electric booster pump 436 in the pipeline 400. The base pump 420 can be replaced by a pumper fire truck, which can become the water supply 425 and the power source 410. The power source 410 can be a local power line, or a diesel or gasoline generator.

Global Positioning System (GPS) units 460 can be used by firefighters to determine the latitude, longitude and the elevation of each device (e.g., electric booster pump 436) to which they are proximate. Wherever there is a network connector 252, the location data from the GPS units 460 can be sent to the network computer 450 via the data network. The GPS location data is sent to the network computer 450 which may contain algorithms that determine where a electric booster pump 436 must be inserted to compensate for elevation differences and distances from the previous pump. The network computer 450 can also determine when a pump 420, 436 must be added to compensate for pressure drops associated with the length of the arrangement. Each device in the network may have a unique network address so that the network computer 450 can automatically determine whether the most recent section of the pipeline 400 is a wired fluid hose 101 or a wired pipe 102. The wired fluid hose 101 and the wired pipe 102 have different pressure drops per unit of length and the network computer 450 must account for the difference before it can do its calculations for where the next electric booster pump 436 must be placed.

The data network allows for a multiplicity of parameters to be monitored by the network computer 450. A network device 452 may be attached to one or both of the connectors 230, 252, 426 on each of the wired fluid conduit 100. The temperature of the electric power wires 120 can be monitored, via the data network, to insure that the electric power wires 120 don't overheat their insulation 165.

A test box 470 has an attached connector which mates with the wfc connector 230. The test box 470 is mated to the wfc connector 230 at the right end of third wired fluid conduit 100C, as shown in FIG. 4. The test box 470 measures the resistance of the electric power wires 120 from end to end of the pipeline 400 in order to confirm that all of the electric power wires 120 and connections are functioning properly. The test box 470 also communicates with the network computer 450 in order to insure that the communication wires 130 and connections are working properly.

Firemen can use the data network in the pipeline 400 to send and receive voice and data with firemen at other locations. This feature is useful in locations where radio communication is impaired.

FIG. 5A is an illustration of a cross-section of a conduit, in accordance with a fourth exemplary embodiment of the conduit shown in FIG. 1A. FIG. 5A shows a cross section of a wired spray conduit (wsc) 500 whose function is to spray water into the air to fight fires. The wired spray conduit 500 can take the form of a flexible wired spray hose (wsh) or it can take the form of a rigid or semi rigid wired spray pipe (wsp). The two bottom wired spray conduit sections 502 and 504 transport the water and they create a wide and flat profile that urges the wired spray conduit 500 to lie flat when placed on the ground. Electric power wires 516, 518, 520, and a ground wire 522, and communication wires 524 are shown inside the wired spray conduit 500 in FIG. 5A.

Spray nozzles may be associated with a left hose section 506, a center hose section 508, and a right hose section 510 of the wired spray conduit 500. The left hose section 506 aims a spray in a leftward direction, relative to the view in FIG. 5A. The center hose section 508 aims a spray in a vertical direction. The right hose section 510 aims a spray in a rightward direction. The spray nozzles are placed a predetermined distance apart along a length of the wired spray conduit 500 and their orifice diameter may change to compensate for pressure drops along the hose. A nozzle far from a pump may need a large orifice in order to spray the desired volume of water. The different spray directions allow the firemen to select a desired spray direction to compensate for ground slope and wind conditions. When the wired spray conduit 500 are deployed on a steep slope, they can be staked into the ground to prevent slippage or twisting.

FIG. 5B is an illustration of a perspective view of a wsc connector 530 for the conduit 500 of FIG. 5A, in accordance with the fourth exemplary embodiment of the conduit shown in FIG. 1A. FIG. 5B shows an end view of a wsc connector 530 placed on each end of a length of wired spray conduit 500 (shown in FIG. 5A). The wsc connector 530 has a left section orifice 536 that connects to the left hose section 506. The wsc connector 530 has a center section orifice 538 connected to the center hose section 508 and a right section orifice 540 connected to the right hose section 510. Ground pin 552 connects to a wsc ground wire 522. A first power pin 550 connects to the first electric power wire 520, a second power pin 548 connects to the second electric power wire 518, and a third power pin 546 connects to the third electric power wire 516. Communication pins 554 connect to the communication wires 524. Two lengths of wired spray conduit 500 can be connected together via a clamp similar to clamp 375 in FIG. 3B allowing spray conduit sections 502, 504 to mate with two connector ports 532, 534. The corresponding power and communication wires 516, 518, 520, 522, 524 in each length of the wired spray conduit 500 are connected together by the wsc connectors 530.

Figure 6A:
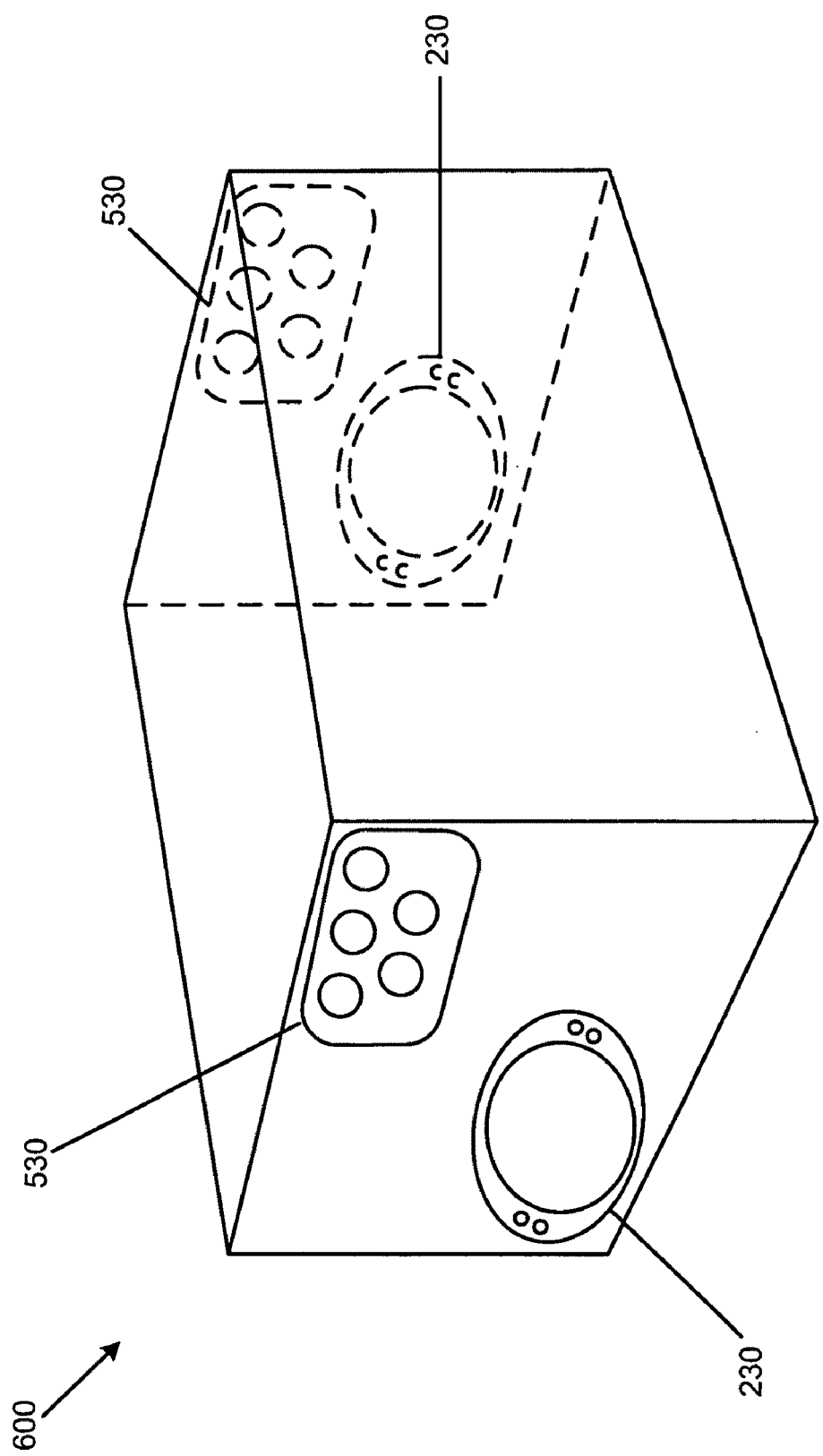
FIG. 6A is an illustration of a perspective view of an adapter for connection to the conduit shown in FIG. 1A, FIG. 1B, FIG. 1C, and FIG. 5A, in accordance with the first exemplary embodiment of the present disclosure.

FIG. 6A is an illustration of a perspective view of an adapter 600 for connection to the various conduits shown in FIG. 1A, FIG. 1B, FIG. 1C, and FIG. 5A, in accordance with the first exemplary embodiment of the present disclosure. The wired fluid conduit 100 and the wired spraying conduit 500 may be compatible with the wfc connector 230 on multiple sides of the adapter 600. Adapter 600 may also have connectors compatible with the wsc connector 530 on multiple sides.

Figure 6B:
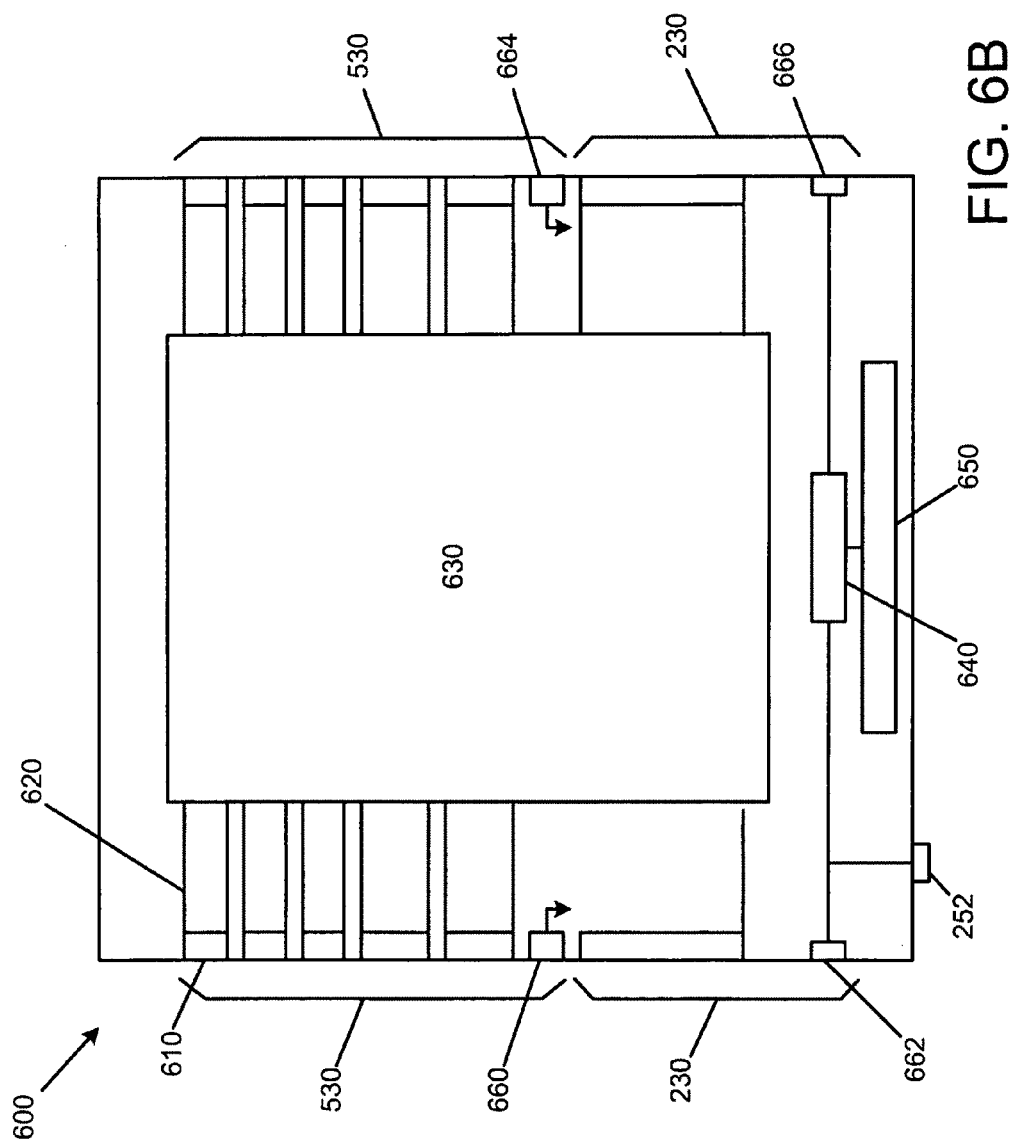
FIG. 6B is an illustration of a cross-sectional side view of the adapter shown in FIG. 6A, in accordance with the first exemplary embodiment of the present disclosure.

FIG. 6B is an illustration of a cross-sectional side view of the adapter 600 shown in FIG. 6A, in accordance with the first exemplary embodiment of the present disclosure. FIG. 6B shows a side view of the adapter 600. On each side is a connector compatible with the wfc connector 230 and the wsc connector 530. A valve 620 is shown inserted between a water path 610 in the wsc connector 530 and the container 630. The valve 620 enables or disables water flow between the wsc connector 530 and container 630. The valve 620 is controlled by an adapter controller 650 that receives commands from a network device 640 that is connected to the data network by the communication wires 252, 524 which are located in wfc connector 230 and wsc connector 530. All of the water paths 610 on the wfc connector 230 and the wsc connector 530 connect to valves that enable or disable water flow to the container 630. The adapter controller 650 may control all of the valves.

The electrical and communication wires 660, 662, 664, 666 are connected to the adapter controller 650, the network device 640, the network connector 252 and to the corresponding connections in the other connectors 230, 530 such that the power and communication wires 120, 130, 160, 170, 516, 518, 520, 522, 524 are passed between different segments of wired fluid conduit 100 and wired spraying conduit 500. The valves 620 in the adapter 600 allow for a plurality of interconnections between wired fluid conduits 100 and wired spraying conduits 500. The valves 620 allow water to flow in either direction, so that any connector 230, 252, 530 can be an input or an output for water flow.

Figure 6C:
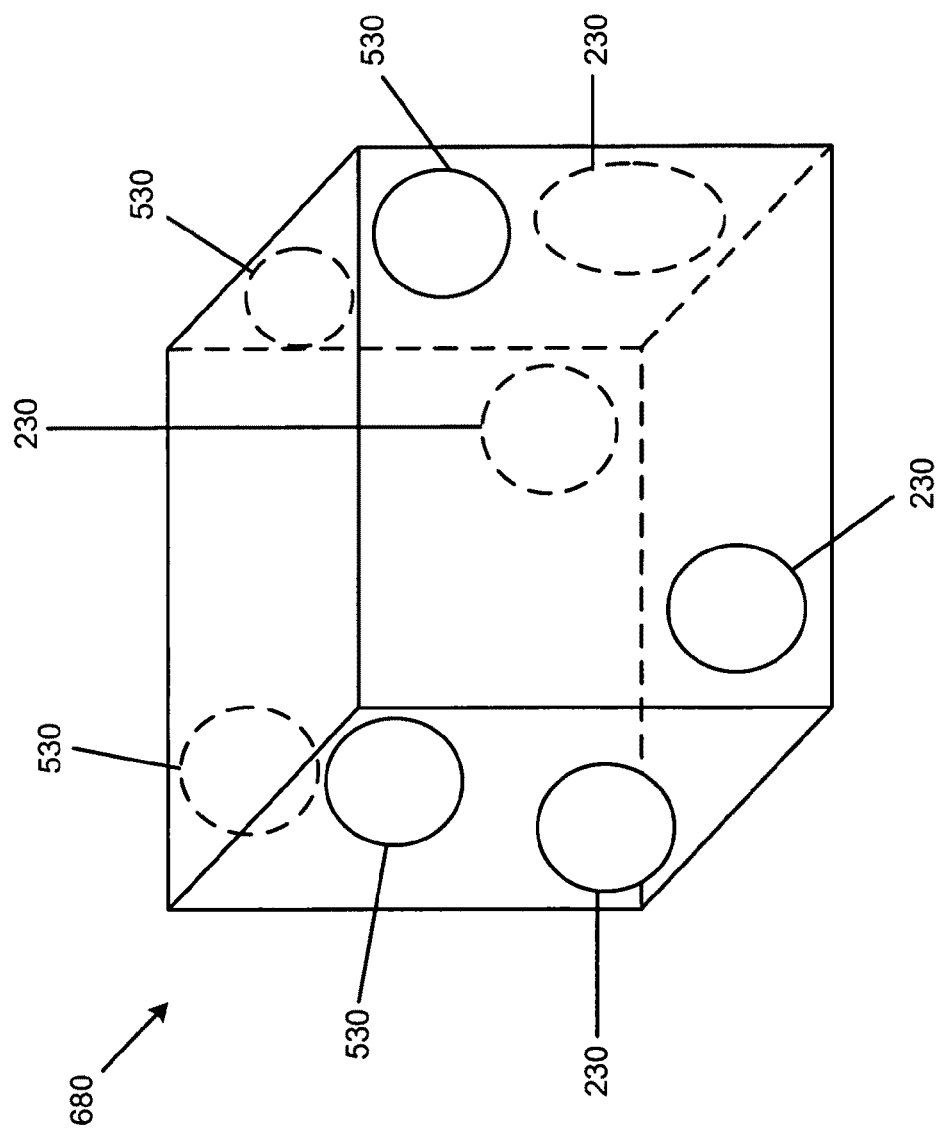
FIG. 6C is an illustration of a perspective view of another adapter for connection to the conduit shown in FIG. 1A, FIG.

FIG. 6C is an illustration of a perspective view of another adapter for connection to the conduits 100, 500 shown in FIG. 1A, FIG. 1B, FIG. 1C, and FIG. 5A, in accordance with the first exemplary embodiment of the present disclosure. FIG. 6C shows a perspective view of a multiport adapter 680 that is similar to adapter 600 and has additional connectors with the same functionality. The multiport adapter 680 allow for additional topological arrangement of wired fluid conduit 100 as will be described in following sections.

FIG. 7A is an illustration of a pipeline 400, in accordance with the first exemplary embodiment of the present disclosure. FIG. 7A shows an example of interconnecting different lengths of wired fluid conduit 100 and wired spraying conduit 500 using adapters 600. Base pump 420 supplies water under pressure to a first wired fluid conduit 100A which supplies water to a second wired fluid conduit 100B, which delivers the water to a first electric booster pump 436A. First electric booster pump 436A boosts the pressure and sends the water into a third wired fluid conduit 100C which delivers the water to the connector on a first adapter 600A. The water exits the first adapter 600A from a connector compatible with the wsc connector 530, and enters the first wired spraying conduit 500A. The first wired spraying conduit 500A delivers water to the second wired spraying conduit 500B which delivers water to a second adapter 600B. The second adapter 600B delivers the water to a second electric booster pump 436B which boosts the pressure and further delivers the water to a third adapter 600C. The third adapter 600C delivers water to the third wired spraying conduit 500C, which delivers the water to a fourth adapter 600D. The fourth adapter 600D, which further delivers the water to a fourth wired fluid conduit 100D.

FIG. 7B is an illustration of an exploded view of an interconnection of the conduit 500 of FIG. 5A and a pump 700, in accordance with the first exemplary embodiment of the present disclosure. FIG. 7B shows a wsc pump 700 that contains a wsc connector 530 on each end. The wsc pump 700 allows lengths of a wired spraying conduit 500 to be connected together without the use of the adapters 600.

FIG. 7C is an illustration of a perspective view of a fire hose adapter 710, in accordance with the first exemplary embodiment of the present disclosure. A hose adapter 710 allows fire hoses to connect to a first end connector 715. A second end connector 712 mates with the wfc connector 230 on an end of the wired fluid conduit 100 and is held in contact by the clamp 375.

FIG. 7D is an illustration of a perspective view of a flow stop 720, in accordance with the first exemplary embodiment of the present disclosure. A wsc flow stop 720 connected to the wired spraying conduit 500 via a clamp similar to wfc connector clamp 375. In order to improve the pressure in the spray nozzles 512 at the end of a wired spraying conduit 500 pipeline, the water must not be allowed to exit the end of the pipeline. The wsc flow stop 720 prevents water from exiting the wsc connector 530.

FIG. 8 is an illustration of a portion of a pipeline 400, in accordance with the first exemplary embodiment of the present disclosure. FIG. 8 shows a topology that can fight a fire by remote control and adapt as the fire conditions change. Base pump 420 pumps water into a fifth wired fluid conduit 100E, which supplies water to a first adapter 680A, which further supplies water to a sixth wired fluid conduit 100F and a seventh wired spraying conduit 500H. The sixth wired fluid conduit 100F supplies water to a second adapter 680B which further supplies water to an eighth wired fluid conduit 100G and an eighth wired spraying conduit 500G. The eighth wired fluid conduit 100G supplies water to a third adapter 680C which further supplies water to the sixth wired spraying conduit 500F. The sixth, seventh and eight wired spraying conduit 500F, 500G, 500H are attached to the wsc flow stops 720.

FIG. 8 shows a fire 810 which is near the sixth wired spraying conduit 500F. The firemen can use the data network to direct the water from base pump 420 to flow only to the sixth wired spraying conduit 500F. If the fire passes the sixth wired spraying conduit 500F, the firemen can direct the water only to the eighth wired spraying conduit 500G, or the seventh wired spraying conduit 500H. The ability to spray water on a fire using a wired spraying conduit 500, and the ability to have remote control of water flow, will lower the risk of death and injury for firemen.

FIG. 9 is an illustration of a portion of a pipeline 400, in accordance with the first exemplary embodiment of the present disclosure. Base pump 420 pumps water into a fifth wired fluid conduit 100E, which supplies water to a first adapter 680A, which further supplies water to a sixth wired fluid conduit 100F and a seventh wired spraying conduit 500H. The sixth wired fluid conduit 100F supplies water to a second adapter 680B which further supplies water to an eighth wired fluid conduit 100G and an eighth wired spraying conduit 500G. The eighth wired fluid conduit 100G supplies water to a third adapter 680C which further supplies water to the sixth wired spraying conduit 500F.

FIG. 9 shows a fourth, fifth, and sixth supplemental adapters 680D, 680E, 680F replacing wsc flow stops 720 (as compared to FIG. 8). A ninth, tenth, and eleventh wired spraying conduit 500I, 500J, 500K are added to the supplemental adapters 680D, 680E, 680F. A ninth and tenth wired fluid conduit 100 interconnect the supplemental adapters 680D, 680E, 680F in order to give redundant paths for the water to flow if there is a failure in any of the first, second and third adapters 680A, 680B, 680C. The wsc flow stops 720 are placed at the end of the ninth, tenth, and eleventh wired spraying conduit 500I, 500J, 500K.

FIG. 10 is an illustration of a portion of a pipeline 400, in accordance with the first exemplary embodiment of the present disclosure. FIG. 10 shows a system of water spray conduit 500 that have been deployed to surround an area of a fire 1000. The base pump 420 urges water into the wired fluid conduit 100 which delivers the water to electric booster pump 436 which further delivers water to adapter 680. Adapter 680 supplies water to wired spraying conduit 500A which further supplies water to wired spraying conduit 500B. Adapter 680 supplies water to wired spraying conduit 500C which further supplies water to wired spraying conduit 500D. On the ends of wired spraying conduit 500B, 500D are wsc flows stops 720. The wired spraying conduit 500 can be used to surround and protect a cluster of homes from a wildfire rather than surround the fire 1000. If there are swimming pools in the home cluster, the pools might be used as a water source. A community without swimming pools might decide to invest in a large portable pool to store an emergency water supply.

Controlled burns are fires that are intentionally set by firemen to clear combustible material that collects on the ground. Firemen also use controlled burns to consume combustible material before a larger wildfire arrives. Sometimes the controlled burns get out of control and become large fires. The topology of FIG. 10 can help control the controlled burns by surrounding them with pipes and hoses that can spray water on any nearby fires.

FIG. 11 is an illustration of a portion of a pipeline 400, in accordance with the first exemplary embodiment of the present disclosure. FIG. 11 shows base pump 420 taking water from water supply 425 via a conduit 446. The base pump 420 gets its electric power from an electric power source 410 through conductors 412 and the base pump 420 pumps water into a first wired fluid conduit 100A, which further delivers the water to a first electric booster pump 436A. The first electric booster pump 436A urges water into a second wired fluid conduit 100B which further delivers the water to a second electric booster pump 436B, which urges water into a third wired fluid conduit 100C which delivers the water into a portable pool 1105. A portable pool 1105 is commonly used by firemen to store water, and is typically a plastic swimming pool type liner that is supported by a foldable metallic structure.

In FIG. 11, a third electric booster pump 436C draws water out of the portable pool 1105 and urges the water into a fourth wired fluid conduit 100D which further carries the water to a fourth electric booster pump 436D which further pumps the water into a fifth wired fluid conduit 100E.

In FIG. 11, the portable pool supplies a technique for pumping water a longer distance than would normally be possible. The electric current for the base pump 420 comes directly through the conductors 412 from the power source 410 and therefore the electric current for the base pump 420 does not travel through any power wires in a wired fluid conduit 100 or a wired spraying conduit 500.

If all of the electric booster pumps 436A, 436B, 436C, 436D are turned on at once, the electric current traveling in the electric power wires 120 (shown in FIG. 1A) in the first wired fluid conduit 100A will be the total of the currents required by each of the group of electronic booster pumps 436A, 436B, 436C, 436D. If only the first and second electric booster pumps 436A, 436B are turned on, the water will be delivered only into the portable pool 1105. There will be no current flowing to power the third and fourth electric booster pumps 436C, 436D and the current in the first wired fluid conduit 100A will be diminished accordingly. If only the third and fourth electric booster pumps 436C, 436D are turned on, the water in the portable pool 1105 will be delivered to the fifth wired fluid conduit 100E. There will be no current flowing to power the first and second electric booster pumps 436A, 436B.

Only half of the water may be delivered to the fourth wired fluid conduit 100D in a given period of time, but the water can be delivered approximately twice as far for a predetermined maximum current capacity of the power wires in the wired fluid conduit 100. More portable pools 1105 can be added to a pipeline in order to extend the maximum length, but the amount of water delivered per period of time will be reduced each time a portable pool 1105 is added.

Another way to increase the current handling capabilities of the pipeline 400 is to have different gauge wires in different sections. The first wired fluid conduit 100A might have the thickest power wires because it must handle the current for all of the electric booster pumps 436A, 436B, 436C, 436D. The second wired fluid conduit 100B might have a lesser thickness in the wires due to the fact that it does not have to supply the same current as the first wired fluid conduit 100A, although it must supply more current than the third and fourth wired fluid conduit 100C, 100D. The third and fourth wired fluid conduit 100C, 100D might have the least thick wires because fewer electric booster pumps 436 require current flow through them.

FIG. 12 is an illustration of a perspective view of a detail of the pipeline 400 of FIG. 11, in accordance with the first exemplary embodiment of the present disclosure. FIG. 12 shows a technique for separating the water flow path from the electric power and communication path when a portable pool 1105 is added to the topology. The third wired fluid conduit 100C delivers water to a pool hose 1210A. A first wfc connector 230A mates with a pool hose connector 1230A. The water passes through the pool hose 1210A (also shown in FIG. 11) and exits from the hose end 1235A into the portable pool 1105.

The electric power wires 120 and communication wires 130 (shown in FIG. 1A) must not come into contact with the water in the portable pool 1105. The wires 120, 130 exit a first pool hose connector 1230A via a first pool connector 1245A and mates with wire bundle 1240 via a first bundle end connector 1242A.

A second pool hose 1210B is similar to the first pool hose 1210A, but is used to withdraw water from the portable pool 1105. The pool hoses 1210A, 1210B may be reinforced such that they can tolerate suction as well as pressure. Water is drawn into the second pool hose 1210B at a second hose end 1235B and travels through a second pool hose connector 1230B into electric booster pump 436 which further pumps the water into a second wired fluid conduit 100B.

The wire bundle 1240 attaches via a second end connector 1242B to a second pool connector 1245B which further connects the power and communication pins on a second pool hose connector 1230B which further mates with a compatible connector on electric booster pump 436. The wire bundle 1240 enables the power wire 120 and communication wires 130 (shown in FIG. 1A) to bypass the portable pool 1105.

If an electric booster pump 436 fails, the failure is detected by the network computer 450, and the network computer 450 can command the adjacent electric booster pumps 436 to incrementally increase their pressure to compensate for the failure. The communication wires 130 may support TV cameras, microphones, motion detectors, and thermometers along the pipeline 400. The multiple sections of the wired spraying conduit 500 improve system reliability because the spray function from a failed section can be replace by the spray function of another section. If, because of some system failure, the data network cannot control a particular device, a manual (local) method of controlling the particular device may be desirable. The electric power wires 120 may be made from an electrical conducting material that has superior strength in order to diminish a possibility of breakage of the electric power wires 120.

The proposed wildfire fighting system requires that electric power be sent to pumps 436 placed at intervals along a significant length of wired fluid conduit 100. FIG. 1 shows an exemplary arrangement of associating the electric power wires 120 with the wired fluid conduit 100. An electric power wire 120 might be a normal bundle of copper strands, or it might be a flat woven conductive fabric which is embedded into the walls of the wired fluid conduit 100. The electric power wires 120 might be concentric layers in the walls of the wired fluid conduit 100.

Another possibility is to have the electric power wires 120 attached by wire-ties to the outside of the wired fluid conduit 100. This possibility would allow fire companies to keep their current stock of conduit and to simply attach bundles of electric power wires 120 to selected conduit. Another possibility is to keep the electric power wires 120 separate from the conduit. The electric power wires 120 and conduit can be put on different reels on the back of a vehicle that would be deployed concurrently as the vehicle drives along the terrain.

FIG. 13A is an illustration of a side view of an aerial vehicle (e.g., a helicopter 1301) carrying reels of conduit, in accordance with the first exemplary embodiment of the present disclosure. FIG. 13A shows a plurality of aerial reels 1350A, 1350B, 1350C which store interconnected lengths of aerial hose or helicopter hose (hh) 1300. The helicopter hose 1300 is similar in function to the wired fluid hose 101, but is designed to be delivered to a fire site by an aerial vehicle such as a helicopter 1301. The helicopter hose 1300 has wfc connectors 230.

A base pump 420, on the ground, supplies water, electric power, and communication signals to the helicopter hose 1300. The helicopter hose 1300 may be wrapped around and stored on a first aerial reel 1350A. At the center of the first aerial reel 1350A is a reinforced hose 1366. The reinforced hose 1366 connects via wfc connectors 230 to another length of helicopter hose 1300 stored on a second aerial reel 1350B which is similarly connected to another length of helicopter hose 1300 on a third aerial reel 1350C.

A reel of conventional hose 1384 with a conventional nozzle 1381 is also attached to the helicopter 1301. The non-nozzle end of the helicopter hose 1300 has a connector that allows water transmission, but does not receive the electric power wires 120 or the communication wires 130. The firemen use the conventional hose 1384 to fight the fires. A winch 1388 is attached to the helicopter 1301 and is capable of lowering and raising the aerial reels 1350A, 1350B, 1350C and the conventional hose reel 1384.

FIG. 13B is an illustration of a perspective view of a reel support bracket 1302 for supporting the aerial reels 1350A, 1350B, 1350C shown in FIG. 13A, in accordance with the first exemplary embodiment of the present disclosure. FIG. 13B shows a reel support bracket 1302 that is designed to attach the reel support device 1320 to the helicopter 1301. The reel support bracket 1302 has vertical sections 1310, long horizontal sections 1312, short horizontal section 1314, long diagonal sections 1318, and short diagonal sections 1316. A plurality of release mechanisms 1319 are attached to the vertical sections 1310 and also to the helicopter 1301 and facilitate the release of the aerial reels 1350A, 1350B, 1350C from the helicopter 1301 at a predetermined time.

FIG. 13C is an illustration of a perspective view of a reel support device 1320 for supporting the aerial reels 1350A, 1350B, 1350C, 1350D shown in FIG. 13A, in accordance with the first exemplary embodiment of the present disclosure. FIG. 13C shows a perspective view of a reel support device 1320. Two reel troughs 1322A, 1322B are connected by reel trough supports 1326. A motor 1317 is attached to a first reel trough 1322A and can be used to force the aerial reel 1350 (as shown in FIG. 13E) to unwind or rewind the helicopter hose 1300 wrapped around the aerial reel 1350.

FIG. 13D is an illustration of a side view of a detail of the reel support device 1320 of FIG. 13C, in accordance with the first exemplary embodiment of the present disclosure. FIG. 13D shows a cross-section of the reel trough 1322. The reel troughs 1322 contains ball bearings 1330. The reel ends 1355A 1355B (shown in FIG. 13E) reside inside the reel troughs 1322A, 13226 and are supported by the ball bearings 1330 that are located within the reel troughs 1322A, 1322B.

FIG. 13E is an illustration of a perspective view of the aerial reel 1350 illustrated in FIG. 13A, in accordance with the first exemplary embodiment of the present disclosure. FIG. 13E shows an aerial reel 1350 storing a length of helicopter hose 1300, which has a wfc connector 1369 on an end hanging from the aerial reel 1350. The aerial reel 1350 has reel ends 1355A, 1355B that are connected by a hollow reel cylinder 1360. At the center of a second reel end 1355B is a cylindrical cavity that passes through the hollow reel cylinder 1360. The gear teeth 1358 on the second reel end 13558 engage with gear teeth 1358 on the motor 1317 (shown in FIG. 13C) and urge the aerial reel 1350 to rotate.

FIG. 13F is an illustration of a perspective view of a helicopter electrical booster pump 1364, in accordance with the first exemplary embodiment of the present disclosure. FIG. 13F shows a helicopter electrical booster pump 1364 located in the cavity in the center of the aerial reel 1350. The helicopter electrical booster pump 1364 is similar in function to the electric booster pump 436, but it may differ in size and shape so as to fit inside the aerial reel 1350. The end of helicopter electrical booster pump 1364 located at reel end 1355B is the pump output 1380. The helicopter electrical booster pump 1364 has a pump input port 1368 attached to the reel cylinder 1360.

FIG. 13G is an illustration of a cross-sectional view of the aerial reel 1350 shown in FIG. 13E, in accordance with the first exemplary embodiment of the present disclosure. The helicopter electrical booster pump 1364 is attached to a slip ring assembly 1372. The slip ring assembly 1372 is attached to a wfc connector 230 that is attached to a reinforced hose 1366. The reinforced hose 1366 has wfc connectors 230 on each end that carry along all of the electric power wires 120 and the communication wires 130 (as shown in FIG. 1A) used in helicopter hose 1300. The reinforced hose 1366 may bend only in an elbow type motion so that the electric power wires 120 and the communication wires 130 inside will not be twisted. The electrical booster pump 1364 is fixedly attached to the reel cylinder 1360 by at least one bracket 1374.

The slip ring assembly 1372 allows the reinforced hose 1366 to rotate freely with respect to helicopter electrical booster pump 1364 while the flow of the water and electrical power and the data communications are not interrupted. A slip ring is a method of making an electrical connection through a rotating assembly. Slip rings, also called rotary electrical interfaces, rotating electrical connectors, collectors, swivels or electrical rotary joints, are commonly found in electrical generators for AC systems and alternators. Slip ring construction is known to those having ordinary skill in the art.

FIG. 14 is an illustration of a cross-sectional view of the slip ring assembly 1372 shown in FIG. 13G, in accordance with the first exemplary embodiment of the present disclosure. A plurality of slip ring bands 1440 are mounted on the pump output shaft 1380. A plurality of brushes 1410 run in contact with the slip band rings 1440 and pass current through the wires 120, 130 in the wfc connector 230 and a cable box 1460. The electric power wires 120 and the communication wires 130 continue along the wire bundle 1462 and into a conduit 1376 where the electric power wires 120 are connected to the pump input port 1368 and to wfc connector 230. The electric power wires 120, the communication wires 130, and the water that enter the aerial reel 1350 are thus passed along to the helicopter electrical booster pump 1364.

A plurality of band wires 1451 are connected to the slip ring bands 1440 and to the corresponding pins on the wfc connector 230 on the end of pump input port 1368. The slip ring assembly 1372 has an outer shell 1373 fixedly attached to the helicopter electrical booster pump 1364. The outer shell 1373 cannot rotate relative to the aerial reel 1350 because the helicopter electrical booster pump 1364 is fixedly attached to the reel 1350. The pump output shaft 1380 is rotationally attached to the outer shell 1373 by a plurality of roller bearings 1420.

A plurality of watertight seals 1450 prevents water exiting a pump output 1430 from coming into contact with the brushes 1410. The free rotation of the reinforced hose 1366 is useful. When the first aerial reel 1350A, shown in FIG. 13A, is rotating and releasing the helicopter hose 1300, the helicopter hose 1300 segment between the first aerial reel 1350A and the second aerial reel 1350B will be fixed. The slip ring assembly 1372 is required to separate the motion of the first aerial reel 1350A and the second aerial reel 1350B. The conduit 1376 has a hose input port 1378 that is attached to the wfc connector 230. The other end of the conduit 1376 connects to a pump input 1382.

A plurality of pressure sensors 1370 is used to detect when the helicopter hose 1300 is at a last section of the aerial reel 1350. The helicopter hose 1300 will apply pressure on the pressure sensors 1370 until the helicopter hose 1300 is removed from the aerial reel 1350. When the aerial reel 1350 is almost empty, the aerial reel 1350 is released from the helicopter 1301 via the release mechanisms 1319 and allowed to fall towards the ground with the adjacent lengths of helicopter hose 1300. The aerial reel 1350 offers impact protection to the helicopter electrical booster pump 1364 that is located at its center.

From FIG. 13A, the group of aerial reels 1350A, 1350B, 1350C comprises a continuous pipeline 400 which has helicopter electrical booster pump 1364 to boost the water pressure such that water can be pumped for the entire length of the pipeline 400. A continuous length of electric power wires 120 delivers power to the helicopter electrical booster pump 1364 and a continuous length of communication wires 130 allow for monitoring and control of the helicopter electrical booster pump 1364.

The group of aerial reels 1350A, 1350B, 1350C is attached to the helicopter 1301 and a loose end of the first aerial reel 1350A is attached to the base pump 420. The helicopter 1301 flies toward a fire location and pays out the helicopter hose 1300. When the first aerial reel 1350A is almost empty, it is detached, via a first release mechanism 1319A, from the helicopter 1301 and is lowered towards the ground by remaining attached to the helicopter hose 1300 on the second aerial reel 1350B, which is deploying. When the second aerial reel 1350B is almost empty, the second aerial reel 1350B is released from the helicopter 1301 by a second release mechanism 1319B and is lowered towards the ground by its connection to helicopter hose 1300 on the third aerial reel 1350C, which is being deployed.

If the helicopter 1301 arrives at its destination and is still carrying the third aerial reel 1350C and the reel of the conventional hose 1384, it releases them with a third and fourth release mechanism 1319C, 1319D and lowers to the ground these remaining reels 1350C by cables attached to the winch 1388. The firemen on the ground then unspool as much of helicopter hose 1300 as needed and attach it to a distal end 1369 of the conventional hose 1384. The conventional hose 1384 is used to fight the fire using the conventional nozzle 1381.

The helicopter 1301 might hover and spray water onto the fire. It is possible that the helicopter 1301 might be piloted by remote control. An onboard GPS device might send back the exact location of the helicopter 1301 via the communication wires 130 in the helicopter hose 1300. A remote controlled helicopter 1301 might be used to drop supplies to firemen, or even rescue firemen, in a smoky or windy zone that is too dangerous for a piloted helicopter to enter.

A test box similar to the test box 470 can be used to insure the integrity of the entire length of the wire circuits on the helicopter hose 1300 before and during a flight. Breakable bolts may be used to attach the aerial reels 1350A, 1350B, 1350C to the helicopter 1301. These bolts would break if the tension became excessively large on the helicopter hose 1300 and posed a safety risk to the helicopter 1301.

In order to avoid excessive twisting of the helicopter hose 1300, it may be necessary to place a slip ring assembly 1372 to both ends of the aerial reel 1350. The need will depend on exactly how the aerial reels 1350 move through the air when they are released from the helicopter 1301.

FIG. 15 is a perspective view of a portable water tent 1500, in accordance with the first exemplary embodiment of the present disclosure. The electric power wires 120 that are part of the pipeline 400 can be used to power a variety of devices that can be used to filter and purify the air breathed by firemen at the scene of a fire. These devices may have to be designed to handle the voltages that are used in the pipeline 400. Firefighters often carry lightweight portable tents that have a metallic coating so as to reflect the heat of a fire away from their bodies. They enter this tent when they are at risk of being burned and when there is no safe escape route. Since the pipeline 400 carries water, the firemen have access to water if they are near the pipeline 400.

A portable water tent 1500 is a reflective tent that can be partially filled with water and which gives extra protection from heat to the firemen inside. The water will absorb much of the heat of a fire. It has a tent hose 1510 that can be connected to a wired fire hose 100 (shown in FIG. 1A) and which will allow portions of the water tent 1500 to be filled with water. The portable water tent 1500 may be constructed from a plurality of interconnected chambers which fill with water. The chambers form the sides 1530A, 1530C of the water tent 1500, the top 1530B of the water tent 1500, a pair of entry chambers 1530D, 1530E for the water tent 1500, and a distal end 1530F of the water tent 1500.

FIG. 16 is an illustration of a cross-section of a fluid conduit 16100, in accordance with a fifth exemplary embodiment of the present disclosure. The fluid conduit 16100, which will be referred to hereinafter as a fluid conduit with wires (fcw) 16100, may be a hose or a rigid or semi-rigid pipe with a plurality of communication wires 16130. Accordingly, the fluid conduit with wires 16100 that takes the form of a hose with wires (hww), or a pipe with wires (pww), will each be defined by the material and characteristics of the conduit. The communication wires 16130 may be used to support an Ethernet-type of data network, provide a low voltage system or facilitate another type of communication system. The communication wires 16130 may be located between an inner conduit surface 16110 and an outer conduit surface 16140. If the fluid conduit 16100 is formed of an adequately flexible material, it may deflate and flatten without fluid inside, similar to a fire hose, allowing for more convenient storage than a rigid conduit.

FIG. 17 is an illustration of a cross-sectional view of a connector 16200 for the fluid conduit 16100 shown in FIG. 16, in accordance with the fifth exemplary embodiment of the present disclosure. Connectors 16200 attach to both ends of a length of the fluid conduit 16100, which have the communication wires 16130. There is at least one communication pin 16250 embedded in each connector 16200 that attaches to the corresponding conductors of the communication wires 16130 in the fluid conduit 16100. The connectors 16200 may be designed to connect to the corresponding pins 16250 within a mating connector (not shown) on an end of another length of the fluid conduit 16100.

FIG. 18 is an illustration of a cross-sectional side view of two connectors 16200 mated with a clamp 16375, in accordance with the fifth exemplary embodiment of the present disclosure. FIG. 18 shows a side view of a first connector 16200A being urged to mate to a second connector 16200B via a connector clamp 16375. FIG. 19 is an illustration of an exploded perspective view of the mated connectors 16200A, 16200B of FIG. 18, in accordance with the fifth exemplary embodiment of the present disclosure. The first connector 16200A is urged to mate with the second connector 16200B via the connector clamp 16375, as shown in FIG. 18. The clamp 16375 has a hinge 16380 and a lock 16390 which allows it to at least temporarily clamp together the two connectors 16200A, 16200B formed at the end of the conduits 16100. This, and many other connector techniques are well known to those having ordinary skill in the art and all such means of connecting conduit are considered to be within the scope of the present disclosure.

FIG. 20 is an illustration of a cross-section of a spray conduit 20100, in accordance with a sixth exemplary embodiment of the present disclosure. The spray conduit 20100 functions to transport water and to spray water. The spray conduit 20100 includes one or more spray nozzles 20110 located at least partially along an exterior surface of the spray conduit 20100. Spraying fluid out of the one or more spray nozzles 20110 in the spray conduit 20100 may be more efficient than using separate sprinkler heads.

The spray conduit 20100 may be a flexible spray or a rigid or semi-rigid spray pipe. Two lower conduit chambers 20102 and 20104 transport water and provide a wide, flat profile that urges the spray conduit 20100 to spread in a wide oblong shape when placed on the ground. The two lower conduit chambers 20102 and 20104 may have uninterrupted sidewalls, thereby providing a substantially enclosed path for fluid transportation. Various other profiles and shapes may also be included to configure the spray conduit 20100 in alternative positions, all of which are considered within the scope of this disclosure. Communication wires 20130 are contained inside the spray conduit 20100.

Spray nozzles 20110 may be associated with one or more upper conduit chambers 20106. The location of an upper conduit chamber 20106 may provide a predetermined spraying direction. For example, an upper conduit chamber 20106 located on a left side of the spray conduit 20100 may spray in a leftward direction, an upper conduit chamber 20106 located in the center of the spray conduit 20100 may spray in a vertical direction, and an upper conduit chamber 20106 located on a right side of the spray conduit 20100 may spray in a rightward direction. The spray nozzles 20110 may be placed a predetermined distance apart along a length of the spray conduit 20100, whereby sufficient and adequate spray coverage is achieved. The spray nozzles may include an orifice with a changing diameter, wherein the diameter may change to compensate for pressure drops along the spray conduit 20100. A spray nozzle 20110 far from a pump may need a larger orifice to spray a desired volume of water. The different spray directions allow for the selection of a desired spray direction to compensate for various environmental conditions, such as ground slope and wind conditions. The spray conduit 20100 may also include anchoring devices for anchoring the spray conduit 20100 to the ground to prevent slippage or twisting. This may be particularly useful when the spray conduit 20100 is deployed on a steep slope.

FIG. 21 is an illustration of a perspective view of a connector 20530 for the conduit 20100 of FIG. 20, in accordance with the sixth exemplary embodiment. FIG. 21 shows a connector 20530 placed on each end of a length of spray conduit with wires 20100 (shown in FIG. 20). The connector 20530 has a left section orifice 20536 that connects to the upper conduit chamber 20106 on the left side of the spray conduit 20100. The connector 20530 has a center section orifice 20538 that connects to the upper conduit chamber 20106 in the center of the spray conduit 20100 and a right section orifice 20540 connected to the upper conduit chamber 20106 on the right side of the spray conduit 20100. Communication pins 20554 may connect to the communication wires 20130. Two lengths of spray conduit 20100 may be connected together via a clamp, such as the connector clamp 16375 of FIG. 19. This may allow lower conduit chambers 20102 and 20104 to mate with two connector ports 20532 and 20534, respectively. The corresponding communication wires 20130 in each length of the spray conduit 20100 may be connected together by the connectors 20530.

FIG. 22 is an illustration of a perspective view of an adapter 21600 for connecting conduits, in accordance with the sixth exemplary embodiment of the present disclosure. The connectors for the fluid conduit 16100 and the spray conduit 20100 may be compatible with connectors on any of the multiple sides of the adapter 21600. For example, the connectors 21230 may be compatible with the connector 16200 in FIG. 17. Similarly, connector 21530 may be compatible with the connector 20530 in FIG. 21.

FIG. 23 is an illustration of a cross-sectional view of the adapter 21600 shown in FIG. 22, in accordance with the sixth exemplary embodiment of the present disclosure. On each side of the adapter 21600 is a connector 21230 compatible with the connector 16200, and a connector 21530 that is compatible with the connector 20530. One or more valves 21620 may be located between a water path 21610 in the connector 21530 and the container 21630. The valve 21620 enables or disables water flow between the connector 21530 and container 21630. The valve 21620 may be controlled by an adapter controller 21650 that may receive commands from a network device 21640 connected to a data network by the communication wires 16250 and 20554, located in connector 16200 and connector 20530, respectively. All of the water paths on the connector 21230 and the connector 21530 may connect to valves that enable or disable water flow to the container 21630. The adapter controller 21650 may control all of the valves or any portion thereof.

One or more communication wires 21660, 21662, 21664 and 21666 are connected to at least one of the adapter controller 21650, the network device 21640, a network connector 21252 and to any other connectors 16200 and 21530. The communication wires 16130 and 20130 may be passed between different segments of fluid conduit 16100 and spray conduit 20100. The valves 21620 in the adapter 21600 may allow for a plurality of interconnections between fluid conduit 16100 and the spray conduits 20100. The valves 21620 allow water or another fluid to flow in either direction, wherein any of the connectors 21230, 21530 may be an input or an output for water flow.

The adapter 21600 may include a power supply, preferably a rechargeable battery 21700, which is connected to any of the communication wires 21660, 21662, 21664 and 21666. The communication wires 21660, 21662, 21664 and 21666 are typically a small diameter of wire that is suited for data communications, but may not be suited for supplying sufficient energy to actuate the valve 21620 or another mechanical component. However, the adapter 21600 may use capacitors to slowly build up charge from small currents in the communication wires 21660, 21662, 21664 and 21666. The capacitors may quickly release a stored charge as a large instantaneous current sufficient to actuate a valve 21620. Additionally, the rechargeable battery 21700 may be charged by small currents in the small diameter communication wires 21660, 21662, 21664 and 21666 may build up to a charge sufficient to actuate the valve 21620. This is commonly called, "trickle charged", and allows the battery to supply large instantaneous current to the one or more valves 21620.

If more than one rechargeable battery 21700 is present, the data network may control which rechargeable battery 21700 or batteries 21700 should be trickle charged first. A system computer on the data network may read the voltage of each battery in the system and determine the state of charge of each battery. The system computer may select one or more batteries to be charged by a trickle charging process.

FIG. 24 is an illustration of a perspective view of a multiport adapter 21680 for connection to the conduits, in accordance with the sixth exemplary embodiment of the present disclosure. The adapter 21680 may connect to any of the conduits discussed herein, including fluid conduit 16100 and spray conduit 20100. The multiport adapter 21680 may be similar to adapter 21600 of FIG. 23, but may have an additional number of connectors, including a plurality of connectors 21230 and 21530. Accordingly, the multiport adapter 21680 may allow for additional topological arrangements of the fluid conduit 16100.

FIG. 25 is an illustration of a fluid distribution arrangement 22000, in accordance with the first exemplary embodiment of the present disclosure. The fluid distribution arrangement 22000 includes at least one pump 22420 situated to pump fluid into a network of fluid conduits 16100, which supplies water to a multiport adapter 21680. The multiport adapter 21680 may supply water to any number of additional fluid conduits 16100 and any number of spray conduits 20100 within the network in any arrangement or configuration. For example, a first fluid conduit 16100 may supply water to a first multiport adapter 21680, which further supplies water to a second fluid conduit 16100 and/or a first spray conduit 20100. The second fluid conduit 16100 may then supply water to a second multiport adapter 21680, which further supplies water to a second spray conduit 20100. As one having ordinary skill in the art can see, any arrangement or combinations of arrangements may be used, all of which are within the scope of the present disclosure.

The fluid distribution arrangement 22000 may also include one or more computers 22200, which communicates with the one or more adapters 21680 via a data network utilizing the communication wires in the fluid conduits 16100 and the spray conduits 20100. The computer 22200 may also communicate with the pump 22420 or any other component of the fluid distribution arrangement 22000 via one or more additional communication wires 22210.

FIG. 25 also illustrates numerous additional adapters 21680 located between a number of fluid conduits 16100 and spray conduits 20100. This arrangement of adapters 21680, fluid and spray conduits 16100, 20100 may create redundant paths for the water to flow if there is a failure in any one adapter 21680 by facilitating the flow of water in an alternate path. At an endpoint of the fluid distribution arrangement 22000, a flow stop 22720 are used to block the flow out of the ends of the spray conduits 20100. Flow stops are further discussed with reference to FIG. 7D.

In addition, multiple pumps 22420 may be used, dependent upon the design of the system. If a larger diameter wire pair is extruded with the fluid or spray conduits 16100, 20100, it is possible to use this wire to deliver electric power for pumps 22420 that are deployed remote from an initial starting location of the fluid. This may provide for a sufficiently high-pressure level at all locations along a fluid distribution system. Interference between the data network signals and the wires to power the pumps may be prevented through techniques that are well known within the art.

FIG. 26 is a schematic diagram of a two-wire irrigation system 23000, in accordance with the seventh exemplary embodiment of the present disclosure. The two-wire irrigation system 23000 includes two wires 23210 attached to irrigation pipes 23110. The two wires 23210 may be a pair of low voltage wires, or another wire customarily used with irrigation systems. The irrigation pipes 23110 may include any type of irrigation pipe, such as the fluid conduit 16100 or the spray conduit 20100 discussed previously. The system 23000 includes a pump 23010, which delivers a quantity of fluid 23020 from a fluid source to an irrigation pipe 23110. The irrigation pipe 23110 has the two wires 23210 extruded within the irrigation pipe 23110.

One or more irrigation pipes 23110 may be connected together with a plurality of tee connectors 23310, elbows 23340 and cross connectors 23350. The tee adapters 23310, elbows 23340 and cross connectors 23350 may also connect the two wires 23210 between any number of irrigation pipes 23110. One or more valves 23330 may also be connected to the irrigation pipes 23110 and the two wires 23130. As can be seen, any quantity of fluid and power may be delivered throughout the system 23000, and at least up to a valve 23330. The system 23000 further includes a computer and data network 23030 attached to the two wires 23210.

The computer 23030 may control the flow of fluid in the valve 23330 via the two wires 23210. A sensor 23500 may be connected to any part or component of the system 23000 with a wire pair 23410. The sensor 23500 may include any type of sensor, sensing any environmental condition, including air temperature, air humidity, ground temperature, ground moisture, alkalinity, the presence of a chemical or element such as nitrogen, a fluid flow rate, a fluid flow direction, a fluid pressure, or any other environmental condition that is capable of being sensed. As is shown in this exemplary configuration, the system 23000 may deliver water and a power control to any number of valves 23330. In addition, a fluid dispersion device may be connected to the valve 23330 to disperse a quantity of fluid into an environment. For example, the valve 23330 may be connected to a sprinkler head, which is capable of dispersing the fluid to the ground.

FIG. 27 illustrates a pipe 24100 with integral wires, in accordance with an eighth embodiment of the present disclosure. The pipe 24100 may include any variety of pipe, including the conduits disclosed in other embodiments or another type of pipe. The pipe 24100 has a reserved portion 24200, which contains at least one embedded wire 24300. The reserved portion 24200 may be a portion of the pipe 24100 that is primarily housing the at least one embedded wire 24300, and may be proximate to a thicker portion of the pipe 24100 sidewall than the overall pipe 24100 sidewall, which may prevent pipe 24100 failures from weakened sections of the pipe 24100. The reserve portion 24200 may contain any type of wire, having any transmission properties. The pipe 24100 may be any length and will have a first end 24101 and a second end 24102. The pipe 24100 may be rigid, semi-rigid or flexible and may include substantially linear dimensions, curved dimensions, or any combination thereof.

As is shown in FIG. 27, the pipe 24100 may include the reserve portion 24200 along the top of the pipe 24100, wherein the reserve portion 24200 is substantially parallel with an elongated axis of the pipe 24100. However, any other configuration of the pipe 24100 and reserve portion 24200 may also be included. The wires 24300 are fully contained within the reserve portion 24200 and protected from being damaged by an outside object. The reserve portion 24200 may run the length of the pipe 24100 or may be slightly shorter than the length of the pipe 24100, which allows an internal gasket to be kept at a distance from the wires 24300 thereby preventing fluid from contacting the wires 24300 and causing damage. FIG. 27 illustrates the reserve portion 24200 as slightly less than the length of the pipe 24100. A conductive device (not shown) may be included at an open portion of the reserve portion 24200 to conduct an electric signal carried by the wires 24300, as is discussed with reference to FIGS. 27A, 28 and 28A.

FIG. 27A is an illustration of a conductive device 24400, in accordance with the eighth embodiment of the present disclosure. The conductive device 24400 may be any device that conducts an electric current from the wires 24300. FIG. 27A illustrates the conductive device 24400 as a sharp conductive structure that may be inserted to contact the wires 24300 within the reserve portion 24200. The conductive device 24400 may be pushed or biased into the wire 24300 thereby contacting the sharp point 24420 of the conductive device 24400 with the wire 24300. A conductive pad 24410 may be included with the conductive device 24400 to conduct the electric current to another device or structure, such as the conductive surface 25300 located in the chamber 25200 in FIG. 29. As one having ordinary skill in the art can see, many variations may be used with the conductive device 24400 to conduct the electric signal from the wire 24300, all of which are considered within the scope of this disclosure.

FIG. 28 is a plan view of the conductive device 24400 within a conductive device guide 24460, in accordance with the eighth exemplary embodiment of the present disclosure. The conductive device guide 24460 may be used to guide the conductive device 24400 on an open end of the reserve portion 24200. The conductive device guide 24460 may be made from any non-conducting material, such as rubber or a plastic composite. The conductive device guide 24460 may be used with any number of conductive devices 24400, wherein the conductive device 24400 electrically engages the wires 24300 within the reserve portion 24200. Once the conductive device 24400 is contacted with the wires 24300 within the reserve portion 24200, the conductive device guide 24460 may be affixed with one or more holes 24401 located on the sides 24600 of the conductive device guide 24460. This may provide an attachment between the conductive device guide 24460 and the reserve portion 24200.

As is illustrated in FIGS. 27A and 28, the conductive device 24400 may have a sharp point 24420. The sharp point 24420 may be any sharp point, or any pointed structure that provides for a better connection to the wire 24300. The sharp point 24420 may be best used with a stranded wire, although a variety of other types of wires may be used. When a stranded wire is used, the sharp ends 24420 may make a successful contact between the spaces of the different strands of the wires 24300. When non-stranded wires 24300 are used, the sharp point 24420 may not be necessary, and another type of conductive device 24400 may be used with success.

FIG. 28A is an exploded plan view of a pair of solid wires 28500 embedded in the reserve portion 24200 of the pipe 24100, in accordance with the eighth exemplary embodiment of the present disclosure. The pair of solid wires 28500 may be similar to the wires 24300 shown in FIG. 27, but may include one or more solid conducting materials. For example, the pair of solid wires 28500 may include conducting materials made from extruded copper or another metallic alloy. A connection to the pair of solid wires 28500 may be made with a conductive device 28600. The conductive device 28600 may be similar to the conductive device 24400 of FIGS. 27A and 28, with the exception of the omission of the sharp points on the conductive device 28600. The conductive device 28600, may include any variation of design, such as a hollow or semi-hollow design, and may be forced into the reserve portion 24200 and made to surround the pair of solid wires 28500. The conductive device 28600 may be crimped or compressed to the pair of solid wires 28500 within the reserve portion 24200, which may insure a successful connection to the pair of solid wires 28500. The conductive device 28600 may include other features to enhance conductivity, such as a slip ring or spring-like devices, all of which are considered within the scope of this disclosure.

FIG. 29 is a plan view illustration of an adapter 25100, in accordance with the eighth exemplary embodiment of the present disclosure. The adapter 25100 is engagable with the pipe 24100 whereby the reserve portion 24200 of the pipe 24100 may engage with a chamber 25200 in the adapter 25100. As is shown, the adapter 25100 may include two chambers 25200 to facilitate connections between two pipes 24100. The adapter 25100 includes two conductive surfaces 25300 that contact the pads 24410 (FIG. 27A) or 24500 (FIG. 28), when the pipe 24100 is engaged with the adapter 25100. The conductive surface 25300 (FIG. 29) may be biased, such as with a spring-loaded device, as discussed in FIG. 30. When the pipe 24100 is engaged within the adapter 25100, the first end 24101 of the pipe 24100 may abut a wall 25995 within the adapter 25100.

FIG. 30 is an illustration of the conductive surfaces 25300 within the chamber 25200 of the adapter 25100, in accordance with the eighth embodiment of the present disclosure. As shown, conductive surfaces 25300 may be biased with a spring 25301 or another type of biasing device. This ensures a reliable connection between the conductive pads 24410 and the wherein the conduit connection element further comprises a fluid chamber connecting portion and an electric wire connecting portion, resulting in a reliable connection between multiple lengths of wire 24300. This reliable connection may be accomplished independent of the surface of the first end 24101 of the pipe 24100. The biasing mechanism 25301, which may include a spring, ensures that there is a reliable connection even when the pipe 24101 or the reserve portion 24200 is not cut square, or does not fit perfectly into the chamber 25200. This may occur when a pipe 24100 or the reserve portion 24200 is cut by in way that results in a non-perfect fit. This may be a common occurrence when a pipe 24100 is cut within the field, although a fixture can be used to assist in the cutting of the extrusion 24200 so that the cutting can be done in the field in a manner that produces quality connections. Furthermore, various other designs and configurations may also be used, and the actual shape and material properties of the pins and pads can be determined by well known techniques that are commonly known with in the art.

FIG. 31 is a plan view of a gasket 25900 for use in the adapter 25100, in accordance with the eighth embodiment of the present disclosure. The gasket 25900 may be placed between the first or second end, 24101, 24102 or the pipe 24100 and the wall 25995 of the adapter 25100. The gasket 25900 may prevent fluids from leaking within the adapter 25100, thereby preventing a loss of pressure or fluid contact with electrical components. As one having ordinary skill in the art can see, many types and sizes of gaskets may be used, all of which are considered within the scope of this disclosure.

FIG. 32 is an illustration of the adapter 25100 having internal wiring connection, in accordance with the eighth exemplary embodiment of the present disclosure. As can be seen, the pins 25300 on either side of the adapter 25100 may be attached by internal wires 25700 in the body of the adapter 25100. The adapter 25100 enables the embedded wires 24300 in one section of pipe 24100 to connect to their corresponding embedded wires 24300 in another section of pipe 24100. Thus, both the fluid connection and the electrical circuit connection between two sections of pipe 24100 are achieved.

A monitor port cavity 25500 provides an alternate way of gaining access to the wire connections and the internal wires 25700. Access to the wires may be needed for diagnosing problems with connections or for gaining information about the performance of the wiring system within a series of pipes 24100. The monitor port cavity 25500 may have a port gasket 25650 and a port cover (not shown) to prevent dirt and moisture from entering the monitor port cavity 25500.

FIG. 33 is an illustration of a monitoring system connection 25700, in accordance with the eighth embodiment of the present disclosure. The monitoring system connection may attach to the wire pair 24300 and allow the wiring system to be monitored or accessed. The monitoring system connection 25700 includes two attachment wires 25701 that pass through a port electrical connector 25600 and attach to pins 25702. The pins 25702 may make contact with pads attached to internal wires 25700. One or more port gaskets, similar to the port gaskets discussed with reference to FIG. 34, may be used to keep out dirt and moisture.

The attachment wires 25701 may be used to attach a number of devices to the electrical system. For example, the attachment wires 25701 may be used to attach surge suppressors to the wire pairs 24300. The opposite end of a surge suppressor is typically connected to a stake in the ground or another grounding location. These surge suppressors may be placed at selected intervals, and are added to protect the system electrical components from the large voltages generated by lightning strikes or other causes of voltage spikes. Additionally, the attachment wires 25701 may be used to attach the sensor 23500 (FIG. 26).

FIG. 34 is an illustration of a cross adapter 26100, in accordance with the eighth exemplary embodiment of the present disclosure. The cross adapter 26100 is similar to the adapter 24100 of FIG. 29, but includes a multiplicity of fluid ports with chambers 26200 that are identical to the chamber 25200. Each chamber 26200 may include one or more conductive surfaces 25300 (Shown in FIG. 30) that contacts to the conductive pads 24410 shown in FIGS. 27A, 28. Accordingly, a plurality of pipes 24100 with a plurality of pins 24300 may be connected to all of the other pins that correspond to the pins within the chambers 26200. This arrangement allows more than two pipes 24100 to be connected at one junction, thereby allowing fluid and electrical connections between two or more pipes 24100.

FIG. 35 is a cross-sectional illustration of a multi-chamber adaptor 27500, in accordance with the eighth exemplary embodiment of the present disclosure. The multi-chamber adaptor 27500 may have a chamber 27510 at various positions along the perimeter of the multi-chamber adaptor 27500, such as at every 90 degrees, as is shown in FIG. 35. The multi-chamber adaptor 27500 may be included with any number of different pipe joints, including an elbow joint, a T-joint, a U-joint, or any other joint known within the art. The multi-chamber adaptor 27500 may allow a pipe 24100 to be connected in several angular orientations relative to the multi-chamber adapter. The multiple chambers of the multi-chamber adaptor 27500 may allow a single elbow to be configured in the different directions. For example, a multi-chamber adapter 27500 that is an elbow may allow for four different 90-degree orientations relative to the reserve portions 24200 on top of the pipe 24100.

Any connection employing the multi-chambered adapter 27500 may have any number of chambers 27510 on either side of the adapter 27500. For example, an elbow may have a single or multiple chambers on its opposite ends. In all cases, the conductor pins 25300 that correspond to pads 24500 will be respectively connected together via wires inside the multi-chambered adapter 27500. Similarly, all of the conductor pins 25300 that correspond to pads 24500 may be respectively connected together via wires inside of other types of adapters such as cross adapter, a side outlet ell, a tee, and any other type of adapter within the field.

FIG. 36 is an illustration of a slip ring adapter 28100, in accordance with a ninth embodiment of the present disclosure. The slip ring adapter 28100 has at least a first slip ring 28200, but may also have a second slip ring 28300. Either or both of the first and second slip ring 28200, 28300 may allow unlimited rotation between objects while providing a continuous electric circuit between them. The first and second slip rings 28200, 28300 may provide for a continuous contact with pads 29500 on slip ring pad guide 29900 described in FIG. 37, similar to the conductive device guide 24460 (FIG. 28) of the eighth exemplary embodiment of the present disclosure.

The adapter 28100 may have any shape that provides for attachment to a pipe or conduit. As is shown in FIG. 36, the adapter 28100 has the shape of an octadecagon (18-sided polygon), but any shape, size or configuration is possible. Additionally, the adapter 28100 may include a specific shape or design on an inner portion and a different shape or design on an outer portion, depending on the design chosen. The adapter 28100 may also include a backstop 28995 to abut the end of the pipe or conduit. Similar to the eight exemplary embodiments, a gasket may be placed between the pipe end and the backstop 28995 to prevent fluid leaks.

The slip rings 28200, 28300 are displaced radially from each other on the adapter 28100, and are designed to contact pads and wires that are also displaced radially. Accordingly, unlike the eighth embodiment, the ninth embodiment includes wires in a reserve portion that are displaced radially to one another. Likewise, an end piece that is located between the adapter 28100 and the reserve portion may also be designed with radially displaced pads, as is discussed further with respect to FIGS. 37 and 38. The inner and outer slip rings 28200, 28300 may be electrical conductors mounted on an insulating surface whereby they do not make electrical connection with each other. This allows the pipe to be inserted into the adapter 28100 at substantially any angle. The pipe can be rotated after being joined with the adapter 28100.

FIG. 37 is an illustration of a slip ring pad guide 29900, in accordance with the ninth exemplary embodiment of the present disclosure. FIG. 38 is an illustration of the pipe 29100 having a reserve portion 29200, in accordance with the ninth exemplary embodiment of the present disclosure. The reserve portion 29200 contains two or more conductors 29240 that are oriented approximately radially to each other. The slip ring pad guide 29900 may attach to the end of the reserve portion 29200 of the pipe 29100 and includes two pads 29500. Two conducting devices 29455 are affixed to the slip ring pad guide 29900 with a biasing element 29450, such as a spring. The conducting devices 29455 may include any device or structure that contacts the two wires 29240 within the reserve portion 29200. For example, the conducting devices 29455 may include male and female connectors, connectors with sharp or pointed ends, connectors with non-pointed ends, or any other connector that successfully contacts the two wires 29240. When the pipe 29100 with the slip ring pad guide 29900 is inserted into an adapter 28100, the pads 29500 may contact at least one of the inner and outer slip rings 28200, 28300. The pads 29500 are able to move relative to the conducting devices 29455 and are pressed outward by the biasing elements 29450 to make good, continuous contact with the inner and outer slip rings 28200, 28300. The conducting devices 29455 may be hammered or forced into the ends of the wire pair 29240. It may be necessary to hammer the conducting devices 29455 first, and then add the biasing elements 29450 and the pads 29500 after the hammering. This might be done to avoid damage to any of the components.

It is noted that the inner and outer slip rings 28200, 28300 may not be required to be formed as a complete circle or traverse along the entire circumference of the adapter 28100. The inner and outer slip rings 28200, 28300 may be formed as segments that are only portions of a circle or only traverse a portion of the circumference of the adapter 28100. Additionally, it is possible that the inner and outer slip rings 28200, 28300 may include segments that are placed on the slip ring pad guide 29900 directly, wherein the pads 29500 are fixedly placed inside the adapter 28100.

FIG. 38A is an illustration of a conductive shield 38300 and a wire pair 38400, in accordance with a tenth exemplary embodiment of the present disclosure. This configuration may be referred to as an embedded shielded wire pair, and may protect a wire pair 38400 from lightning by providing a grounding element to connect the conductive shield 38300 to ground. The conductive shield 38300 may surround the embedded wire pair 38400 within the reserve portion 38200 of a pipe segment 38100. The conductive shield 38300 may direct a large electric current, such as one created from a lightning strike, away from the wire pair 38400 and to a grounding location. The conductive shield 38300 may also require a second conductor path (not shown). One configuration for directing a large electric current to a grounding location would be with a triple conductor end piece 38600. The triple conductor end piece 38600 may include at least three connection pads to connect to the wire pair 38200 and the conductive shield 38300. The design and connection techniques may be similar to the design and techniques of connecting a simple wire pair to an end piece, as discussed with reference to FIGS. 27-28.

The triple conductor end piece 38600 may abut a coupler 38800 that has at least a third slip ring. FIG. 38B is an illustration of a coupler 38800 having at least two slip rings 38700, in accordance with the tenth exemplary embodiment. The coupler 38800 may be similar to the adapter 28100 discussed in FIG. 36, but the coupler 38800 includes at least two slip rings 38700. The at least two slip rings 38700 are preferably employed as three slip rings 38700, which includes an a first slip ring 38700 and a second slip ring 38700 for connection to the wire pair 38400, and a third slip ring 38700 for connection to the conductive shield 38300. The third slip ring 38700 may make contact with one of the three conductor pads on the triple conductor end piece 38600 (FIG. 38A). The third slip ring 38700 may be connected to a grounding location, thereby transferring any large electric currents received in the conductive shield 38300 to ground. Each of the slip rings 38700 may have a connection to a corresponding slip ring 38700 in another chamber of the coupler 38800. For example, each of the slip rings 38700 may have a wire embedded in the coupler 38800 connecting it to all other corresponding slip rings in the other chambers on the coupler 38800.

FIG. 38C is an illustration of an adapter 38950 having an external connector 38900, in accordance with the tenth exemplary embodiment. The third conductor pad of the triple conductor end piece 38600 (FIG. 38A) may connect to transfer wire 38850 to contact an external connector 38900 on the adapter 38950, as is shown in FIG. 38C. The external connector 38900 may be connected to a grounding location or a grounding device, such as a metallic stake driven in the ground. As one having skill in the art can see, the external connector 38900 may include a variety of devices, such as screw terminal or grounding fastener.

FIG. 39 is an illustration of a solid pipe segment 30100, in accordance with an eleventh exemplary embodiment of the present disclosure. The solid pipe segment 30100 may be an additional way to connect wire pairs 24300 to other electrical components. The solid pipe segment 30100 may generally be a short segment with the exterior shape of the pipes and conduits discussed in other embodiments, but it does not have an internal cavity for fluid flow. As with the other pipes and conduits within this disclosure, the solid pipe segment 30100 may include any length, shape or configuration.

The solid pipe segment 30100 has a wire pair 30600 that exits from the reserve portion 30200. This wire pair 30600 is attached to pads 30500, thereby making a compatible connection to the various adapters that may be used. The solid pipe segment 30100 allows an external wire pair 30600 to be connected to a network, such as the wire pair network 23110 of the seventh exemplary embodiment, by inserting the solid pipe segment 30100 into any port on any type of adapter. This allows for proper installation without an installer having to learn any new techniques. The pads 30500 may use a conventional end piece with biasing elements and conducting portions, as discussed in other embodiments. Furthermore, the assembly may be done in a factory and not in the field.

FIG. 40 is an illustration of a fluid-proof jacket 31000, in accordance with a twelfth embodiment of the present disclosure. The fluid-proof jacket 31000 may provide an additional layer of fluid-proofing to protect the electrical components used in the system. The fluid-proof jacket 31000 may be made from a flexible and fluid resistant material, such as a plastic or rubber. The fluid-proof jacket 31000 has a larger diameter end 31020 that may fit over an adapter, and a smaller diameter end 31040 that may fit over a pipe or conduit. Once in place, the fluid-proof jacket 31000 may be secured by a large strap 31100 at the large diameter end 31020 and a small strap 31200 at the small diameter end 31040. The fluid-proof jacket 31000 may include any design to securely fit over any junction within the system, and may use alternative securing devices, all of which are considered within the scope of the present disclosure.

FIG. 41 is a plan view illustration of a coupler assembly 32100, in accordance with a thirteenth embodiment of the present disclosure. For illustration purposes only, FIG. 41 depicts the coupler assembly 32100 without an exterior surface, although an exterior surface would be included in practice. The coupler assembly 32100 includes a first coupler unit 32110 and a second coupler unit 32120. The first and second coupler units 32110, 32120 are each connected to a conduit segment 32160, which may be accomplished through a removable connection or an integral connection between the first and second coupler units 32110, 32120 and the conduit segments 32160. The first and second coupler units 32110, 32120 may be any type of coupler, such as the well-known Storz type coupler. The first and second coupler units 32110, 32120 have a sexless mating design, wherein both the first and second coupler units 32110, 32120 are substantially identical. The first and second coupler units 32110, 32120 are mated with a plurality of plates 33100, as is described further with respect to FIG. 42.

The sexless mating design of the first and second coupler units 32110, 32120 allows for quick and convenient mating, as well as a universal use of parts. Each of the first and second coupler units 32110, 32120 includes at least one wire 32220 within the conduit 32160 and running along the length of the conduit 32160. The at least one wire 32220 may include any type of wire, such as a stranded wire or a solid extruded wire, which may carry any electrical signal or voltage, or act as a ground. At least one communication wire 32230 may also be included. In other perspective embodiments, the communication signals may be sent on any of the wires 32220.

The coupler assembly 32100 includes a collar 32150 attached to each of the first and second coupler units 32110, 32120. The collars 32150 may be any raised structure affixed along at least a portion of the circumference of each of the first and second coupler units 32110, 32120. The collars 32150 may be located proximate to a point where the first and second coupler units 32110, 32120 are connected. However, the faces of the collars 32150 proximal to the connection point of the coupler units 32110, 32120 may be offset from the connection point in order to insure that fluids in the coupler assembly 32100 are separated from the electrical portions of the collars 32150.

The collars 32150 may have one or more holes 32260 to allow the wires 32220 and the communication wires 32230 to be passed from the first coupler unit 32110 to the second coupler unit 32120. The holes 32260 may be designed to correspond between the first and second coupler units 32110, 32120, thereby permitting a successful electrical connection within the coupler assembly 32100. This may include the use of other designs and configurations, as is known in the art, all of which are considered within the scope of this disclosure. The holes 32260 may have recessed electrical connectors, or another type of connector, which are connected to the wires 32220 and communication wires 32230. The connectors may be recessed so as to minimize the chance of accidental electrical shock.

The first and second coupler units 32110, 32120 must be prevented from rotating relative to each other when connected. Rotation may cause the connection of the wires 32220 and communication wires 32230 within each of the first and second coupler units 32110, 32120 to become weakened, strained or severed, and subsequently fail. Rotation may be prevented with using one or more pins 32242 in the second coupler unit 32120 and corresponding receiving holes 32142 in the first coupler unit 32110. The one or more pins 32242 may be affixed to the second coupler unit 32120 and engage a corresponding receiving hole 32142 in the first coupler unit 32110. This type of engagement may be considered a male/female engagement, which may also be accomplished through a variety of other designs, all of which are considered within the scope of the present disclosure.

In connecting the first and second coupler units 32110, 32120, the pins 32242 in the second coupler unit 32120 may be aligned with the holes 32142 in the first coupler 32110. The pin and hole locations may be one that insures a tight fit necessary for proper connection of the fluid paths of the conduits 32160, the wires 32220 and the communication wires 32230. Preferably, only one configuration may be used to align the first and second coupler units 32110, 32120. The coupler assembly 32100 may include one or more outer rings 32140 to ensure a successful connection within the coupler assembly 32100. The outer rings may include a gasket 32244 between the first and second coupler units 32110, 32120 to provide a fluid-tight connection. The gasket 32244 may be a flexible gasket material that is attached to each of the first and second coupler units 32110, 32120, or a single gasket that is placed between the first and second coupler units 32110, 32120.

FIG. 42 is an exploded plan view of the coupler assembly 32100 with plurality of plates 33100, in accordance with the thirteenth embodiment of the present disclosure. For illustration purposes only, FIG. 42 depicts the coupler assembly 32100 without an exterior surface, although an exterior surface would be included in practice. The coupler assembly 32100 may include any number of plates 33100 for securing the connection between the first and second coupler units 32110, 32120. Preferably, four plates 33100 may be used, as is shown in FIG. 42. The plates 33100 may include wire-connecting elements 33500, to connect any of the wires 32220 or communication wires 32230. When the coupler assembly 32100 has a configuration where the first and second coupler units 32110, 32120 are connected, the wires 32220 and the communication wires 32230 may be connected to their corresponding wires via the wire-connecting elements 33500 within the plates 33100.

FIG. 43 is an exploded plan view of the plates 33100 of the coupler assembly 32100, in accordance with the thirteenth embodiment of the present disclosure. As can be seen the wire-connection elements 33500 of the plates 33100 may be one or more electrical connector pins 34110, which may connect to any of the wires 32220 or communication wires 32230. The electrical connector pins 34110 may be retracted and extended to and from within the plates 33100, which may be controlled by activating a control mechanism 34500. In FIG. 43, the control mechanism 34500 is illustrated as a square nut, which may be activated by rotation. When the control mechanism 34500 is activated, the electrical connector pins 34100 may be extended and the plates 33100 may be pushed apart a small distance to compress a gasket material (not shown) located between one or more faces of plates 33100. This gasket material may press against the faces of collars 32150 (FIG. 41) thereby creating a fluid-tight seal. Small gaps 34700 may be formed when the plates 33100 are pushed apart from activating the control mechanism 34500. Although the plates 33100 may be pushed apart, they are designed to slide past each other and create a fluid-proof barrier to fluid entering the inner regions of the volume that they create with the gasket material.

The plates 33100 may also include one or more stabilizing pins 34800 on plate 33100 which are situated to engage one or more holes. The holes may be the holes in the adjacent face of collar 32150 (FIG. 41), or holes in other components that are situated to receive the stabilizing pins 34800. The use of stabilizing pins 34800 may lessen or remove stresses from the electrical connector pins 34110. The stabilizing pins 34800 may be included along any of the sides of the plates 33100. For example, FIG. 43 illustrates the stabilizing pins 34800 located on the side of the plate 33100 that abuts a collar 32150, and on a side of the plate 33100 that abuts a second plate 33100. A plurality of stabilizing pins 34800 and connector pin receiving holes 34950 may be included on the plates 33100. Accordingly, each of the plates 33100 may have any number of stabilizing pins 34800 that are considered secondary, and are used to hold one or more plates 33100 to another plate 33100. Once the plates 33100 are connected, a clamp may be used to secure all of the plates 33100 in the connected configuration. However, a clamp may not be necessary if a sufficient number of stabilizing pins 34800 and holes 34950 are provided.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed is:

1. A supply line system for conveying a fluid, the system comprising:
    a first and a second conduit segment each having at least one inner conduit surface and an outer conduit surface;
    at least one fluid chamber within each of the first and second conduit segments and formed at least partially by the at least one inner conduit surface, thereby transporting a quantity of fluid along the length of each of said conduit segments;
    at least one electric wire located between the at least one inner conduit surface and the outer conduit surface and extending approximately the length of each of the first and second conduit segments, the electric wire sized to carry at least one electric current;
    a conduit connection element connecting the first and second conduit segments, the conduit connection element mating the fluid chamber and the at least one electric wire of the first conduit segment with the fluid chamber and the at least one electric wire of the second conduit segment, wherein at least a portion of the quantity of fluid and the at least one electric current is passed from the first conduit segment to the second conduit segment, wherein said conduit connection element is at least one of a conduit adapter, a conduit coupler assembly and a conduit multi-port device;
    a digital data network connected to the at least one electric wire, whereby the digital data network includes a Ethernet-type data network, wherein the digital data network routes at least one data communication to and from at least one electronic device; and
    at least one computer connected to the digital data network, wherein the at least one computer controls a movement of at least a portion of the quantity of fluid within the first and a second conduit segment.

2. The supply line system of claim 1, wherein the conduit connection element further comprises a fluid chamber connecting portion and an electric wire connecting portion, wherein the conduit connection element further comprises at least one rotatable slip ring within the electric wire connecting portion, thereby providing a constant electrical connection between the pipe segment and the conduit connection element.

3. The supply line system of claim 1, wherein the conduit connection element further comprises a fluid chamber connecting portion and an electric wire connecting portion, wherein the conduit connection element further comprises a plurality of electric wire connecting portions located at an end of the conduit connection element and spaced radially about a center axis of the conduit connection element, thereby providing flexibility in installation with the conduit segments to the conduit connection element.

4. The supply line system of claim 1, further comprising a conductive device attached to the at least one electric wire in said first and second conduit segments, wherein the conduit connection element further comprises a fluid chamber connecting portion and an electric wire connecting portion, wherein the conductive device facilitates a transfer of the electric current from the at least one electric wire to a conductor in the electric wire connecting portion of the conduit connection element.

5. The supply line system of claim 4, further comprising a conductive device guide positioning the conductive device, wherein the conductive device guide includes at least one biasing element sized to bias the conductive device to electrically engage the at least one electric wire and said conductor in the conduit connection element.

6. The supply line system of claim 1, wherein the at least one electric wire are sized to carry at least one communication signal current and one power-supplying current to the at least one electronic device.

7. The supply line system of claim 1, wherein the at least one electronic device further comprises a valve connected to the at least one fluid chamber and the at least one electric wire, whereby the valve receives at least one electric current from the control system via the at least one electric wire and controls a flow rate of the fluid within the first and second conduit segments based on the received electric current.

8. The supply line system of claim 1, wherein the at least one electronic device further comprises a sensor connected to the at least one wire, whereby the sensor senses at least one environmental condition proximate to the sensor.

9. The supply line system of claim 1, further comprising at least one rechargeable battery connected to the at least one electric wire and the at least one electronic device, thereby supplying power to the at least one electronic device, wherein the at least one electric wire delivers the electrical current to the at least one rechargeable battery thereby recharging the at least one rechargeable battery.

10. The supply line system of claim 9, further comprising a battery charging monitoring system in communication with the at least one rechargeable battery and the digital data network.

11. The supply line system of claim 10, further comprising a second rechargeable battery and a battery recharging prioritizing system, wherein the battery recharging prioritizing system is configured to prioritize a charging of the rechargeable batteries, whereby a first of the rechargeable batteries is supplied more electric current than the second rechargeable battery.

12. The supply line system of claim 1, wherein each of the first and second conduit segments further comprises a reserved portion integral with each of the first and second conduit segments and located interior to the outer surface of each of the first and second conduit segments, wherein the reserved portion houses the at least one electric wire.

13. The supply line system of claim 1, further comprising a fluid-tight gasket structure located between the conduit connection element and each of the first and second conduit segments.

14. The supply line system of claim 1, wherein the conduit connection element further comprises at least one of a cross conduit connection element, a side outlet conduit connection element, an ell conduit connection element and a tee conduit connection element.

15. The supply line system of claim 1, further comprising a first fluid chamber and a second fluid chamber, wherein a first spray nozzle is in fluid communication with the first fluid chamber and directed in a first direction and a second spray nozzle is in fluid communication with the second fluid chamber and directed in a second direction.

16. The supply line system of claim 1, further comprising a monitor port element within the conduit connection element, wherein the monitor port element allows access to the at least one electric current passed from the first conduit segment to the second conduit segment.

17. The supply line system of claim 1, wherein the conduit connection element further comprises an enclosure, the enclosure having at least a first orifice and a second orifice, wherein the first conduit segment is mated to the first orifice and the second conduit segment is mated to the second orifice, and wherein the enclosure includes at least one valve in a fluid path of the quantity of fluid passed from the first conduit segment to the second conduit segment.

18. The supply line system of claim 1, further comprising a fluid-proof jacket positioned exterior to the outer surface of the conduit connection element, wherein the fluid-proof jacket prevents fluid from accessing an interior portion of the conduit connection element.

19. The supply line system for conveying a fluid of claim 1, wherein the at least one electronic device is located proximate to the conduit connection element.

20. A supply line system for conveying a fluid, the system comprising:
a first and a second conduit segment each having at least one inner conduit surface and an outer conduit surface;
at least one fluid chamber within each of the first and second conduit segments and formed at least partially by the at least one inner conduit surface, thereby transporting a quantity of fluid along the length of each of said conduit segments;
at least one electric wire located between the at least one inner conduit surface and the outer conduit surface and extending approximately the length of each of the first and second conduit segments, the electric wire sized to carry at least one electric current; and
a conduit connection element connecting the first and second conduit segments, the conduit connection element mating the fluid chamber and the at least one electric wire of the first conduit segment with the fluid chamber and the at least one electric wire of the second conduit segment, wherein at least a portion of the quantity of fluid and the at least one electric current is passed from the first conduit segment to the second conduit segment, wherein said conduit connection element is at least one of a conduit adapter, a conduit coupler assembly and a conduit multi-port device, wherein the conduit connection element further comprises a fluid chamber connecting portion and an electric wire connecting portion, wherein the fluid chamber connecting portion is offset from the electric wire connecting portion, thereby the electric wire connecting portion is separated from the fluid in the fluid chamber connecting portion.

21. The supply line system for conveying a fluid of claim 20, further comprising a control system connected to the at least one electric wire and in communication with at least one device.

22. A supply line system for conveying a fluid, the system comprising:
a first and a second conduit segment each having at least one inner conduit surface and an outer conduit surface,
at least one fluid chamber within each of the first and second conduit segments and formed at least partially by the at least one inner conduit surface, thereby transporting a quantity of fluid along the length of each of said conduit segments, the at least one fluid chamber further comprising a first fluid chamber and a second fluid chamber, wherein a first spray nozzle is in fluid communication with the first fluid chamber and is directed to spray a first portion of the quantity of fluid in a first direction and the second fluid chamber having sidewalls is substantially parallel to the first fluid chamber and includes no interruptions in the sidewalls, thereby providing for transportation of a second portion of the quantity of fluid without spraying the second portion of the quantity of fluid;
at least one electric wire located between the at least one inner conduit surface and the outer conduit surface and extending approximately the length of each of the first and second conduit segments, the electric wire sized to carry at least one electric current; and
a conduit connection element connecting the first and second conduit segments, the conduit connection element mating the fluid chamber and the at least one electric wire of the first conduit segment with the fluid chamber and the at least one electric wire of the second conduit segment, wherein at least a portion of the quantity of fluid and the at least one electric current is passed from the first conduit segment to the second conduit segment, wherein said conduit connection element is at least one of a conduit adapter, a conduit coupler assembly and a conduit multi-port device.

23. The supply line system for conveying a fluid of claim 22, further comprising a control system connected to the at least one electric wire and in communication with at least one device.

* * * * *